United States Patent
Takeda et al.

(10) Patent No.: US 7,712,382 B2
(45) Date of Patent: May 11, 2010

(54) DOPPLER TYPE ULTRASONIC FLOWMETER, FLOW RATE MEASURING METHOD USING DOPPLER TYPE ULTRASONIC FLOWMETER AND FLOW RATE MEASURING PROGRAM USED IN THIS DOPPLER TYPE ULTRASONIC FLOWMETER

(75) Inventors: Yasushi Takeda, 12-21, Kitahachijo-Nishi 5-Chome, Kita-ku, Sapporo-Shi, Hokkaido (JP) 060-0808; Michitsugu Mori, Tokyo (JP)

(73) Assignees: The Tokyo Electric Power Company, Incorporated, Tokyo (JP); Yasushi Takeda, Sapporo-shi (JP)

( * ) Notice: Subject to any disclaimer, the term of this patent is extended or adjusted under 35 U.S.C. 154(b) by 1560 days.

(21) Appl. No.: 10/514,566

(22) PCT Filed: Jun. 3, 2003

(86) PCT No.: PCT/JP03/07030

§ 371 (c)(1),
(2), (4) Date: Dec. 1, 2004

(87) PCT Pub. No.: WO03/102513

PCT Pub. Date: Dec. 11, 2003

(65) Prior Publication Data

US 2005/0245827 A1    Nov. 3, 2005

(30) Foreign Application Priority Data

Jun. 4, 2002 (JP) ............................. 2002-163648
Jun. 4, 2002 (JP) ............................. 2002-163651
Jun. 5, 2002 (JP) ............................. 2002-164859
Jun. 5, 2002 (JP) ............................. 2002-164860

(51) Int. Cl.
*G01F 1/20* (2006.01)

(52) U.S. Cl. ................................................. 73/861.18
(58) Field of Classification Search ........ 73/861.25–31, 73/861.18, 861.06, 861.01–861.03; 702/45, 702/50, 54, 75, 100, 103, 106, 189, 87, 137; 367/87, 137
See application file for complete search history.

(56) References Cited

U.S. PATENT DOCUMENTS 4,391,149 A    7/1983    Herzl
(Continued)

FOREIGN PATENT DOCUMENTS

DE    196 33 558 A1    2/1998
(Continued)

OTHER PUBLICATIONS

U.S. Appl. No. 10/493,480, filed Sep. 20, 2004, Takeda, et al.
(Continued)

*Primary Examiner*—Jewel Thompson
(74) *Attorney, Agent, or Firm*—Oblon, Spivak, McClelland, Maier & Neustadt, L.L.P.

(57) ABSTRACT

A doppler ultrasonic flowmeter including: an ultrasonic transmission member for casting ultrasonic pulses onto the fluid within a fluid tube, which is to be measured, along a measurement line from an ultrasonic transducer, a flow-speed distribution measurement unit for receiving ultrasonic echoes reflected from the measurement region due to ultrasonic pulses cast onto the fluid to be measured so as to measure the flow-speed distribution of the fluid to be measured in the measurement region; a flow measurement unit for measuring the flow of the fluid to be measured; and a transducer position adjusting mechanism for adjusting the relative position of a pair of ultrasonic transducers serving as the ultrasonic transmission member, a first transducer and a second transducer, which are disposed away one from another along the axial direction of a fluid tube.

18 Claims, 27 Drawing Sheets

U.S. PATENT DOCUMENTS

| | | | | |
|---|---|---|---|---|
| 4,397,194 | A | * 8/1983 | Soltz | 73/861.28 |
| 4,484,478 | A | * 11/1984 | Harkonen | 73/861.06 |
| 5,540,230 | A | * 7/1996 | Vilkomerson | 600/454 |
| 5,831,175 | A | * 11/1998 | Fletcher-Haynes | 73/861.28 |
| 6,931,948 | B2 | * 8/2005 | Doi et al. | 73/864.18 |

FOREIGN PATENT DOCUMENTS

| | | |
|---|---|---|
| EP | 0 138 017 A1 | 4/1985 |
| GB | 1 314 521 | 4/1973 |
| JP | 49-112646 | 10/1974 |
| JP | 2000-97742 | 4/2000 |

OTHER PUBLICATIONS

U.S. Appl. No. 10/514,234, filed Nov. 19, 2004, Hishida, et al.
U.S. Appl. No. 12/161,422, filed Jul. 18, 2008, Mori, et al.
U.S. Appl. No. 10/584,263, filed Jun. 26, 2006, Mori et al.
U.S. Appl. No. 10/584,318, filed Jun. 23, 2006, Mori et al.

* cited by examiner

DOPPLER TYPE ULTRASONIC FLOWMETER, FLOW RATE MEASURING METHOD USING DOPPLER TYPE ULTRASONIC FLOWMETER AND FLOW RATE MEASURING PROGRAM USED IN THIS DOPPLER TYPE ULTRASONIC FLOWMETER

TECHNICAL FIELD

The present invention relates to a doppler ultrasonic flowmeter for measuring the flow-speed distribution of a fluid and the flow thereof using ultrasonic pulses, a flow measurement method with the doppler ultrasonic flowmeter, and a flow measurement program thereof, particularly to a doppler ultrasonic flowmeter having a function for measuring the flow-speed distribution of various fluids and flow thereof in a non-contact manner, a flow measurement method with the doppler ultrasonic flowmeter, and a flow measurement program thereof.

BACKGROUND ART

As a conventional technique, a doppler ultrasonic flowmeter using the ultrasonic pulsed doppler method has been known as disclosed in Japanese Unexamined Patent Application Publication No. 2000-97742.

The doppler ultrasonic flowmeter has a configuration wherein ultrasonic pulses are cast from a transducer onto a measurement line within a flow tube, ultrasonic echo signals, i.e., the reflected-wave signals from suspended fine particles in a fluid flowing in the fluid tube are analyzed so as to calculate the flow-speed distribution and the flow of the fluid flowing along the measurement line based upon the positions and velocities of the suspended fine particles. The measurement line is formed by an ultrasonic-pulse beam cast from the transducer.

The doppler ultrasonic flowmeter may be applied to an opaque fluid and an opaque-fluid tube, as well as having the advantage of measuring the flow of a fluid flowing a fluid tube in a non-contact manner. Furthermore, the doppler ultrasonic flowmeter has the advantage of measurement of the flow-speed distribution of an opaque fluid and the flow thereof, e.g., measurement of the flow of liquid metal such as mercury, sodium, and so forth, as well as having functions for measuring the flow-speed distribution and the flow of a fluid flowing in the flow tube with measurement along the measurement line.

The doppler ultrasonic flowmeter has the advantage of detecting change in the flow-speed distribution over time along the measurement line formed by the ultrasonic pulses cast onto the fluid from the transducer, and accordingly, it is hoped that the doppler ultrasonic flowmeter can be applied to measurement of a transient flow of a fluid flowing through the flow tube, and measurement of the flow-speed distribution and measurement of the flow in a turbulent situation.

An arrangement example of the ultrasonic flow-speed distribution meter and the ultrasonic flowmeter described above is disclosed in Japanese Unexamined Patent Application Publication No. 2000-97742.

Measurement with the conventional doppler ultrasonic flowmeters is made under the assumption of existence of reflected ultrasonic echoes due to reflection from bubbles or particles contained in a fluid which is to be measured. Accordingly, in some cases, extremely unstable flow of the fluid which is to be measured leads to irregularities in the measurement results of the flow-speed distribution due to irregularities in density of bubbles or the like. Furthermore, with the conventional doppler ultrasonic flowmeters, measurement of the flow is made based upon the measurement results of the flow-speed distribution. Accordingly, such irregularities in the flow-speed distribution affect computation of the flow, resulting in irregularities in the measurement results of the flow, as well.

Furthermore, the conventional doppler ultrasonic flowmeter has a function for receiving ultrasonic echoes at 128 positions at best, giving consideration to a tradeoff between responsibility of measurement of the flow which changes in a short period of time and the performance of the hardware of the conventional doppler ultrasonic flowmeter. In this case, the minimum interval (which will be referred to as "channel distance" hereafter) between the measurement points for measuring the ultrasonic echoes matches the value obtained by dividing the ultrasonic speed Cw in the fluid to be measured, by twice the basic frequency $f_0$ of the ultrasonic pulse.

Accordingly, with the conventional doppler ultrasonic flowmeter employing such a channel distance, the maximum distance of the measurement line matches 128 times the minimum channel distance, leading to a problem that measurement of the flow-speed distribution cannot be made over the entire tube in a case wherein the fluid tube is formed with a greater diameter than the aforementioned measurement line.

On the other hand, the ultrasonic speed Cw in the fluid which is to be measured, the basic frequency $f_0$ of the ultrasonic pulses, and the incident angle $\alpha$ of the ultrasonic pulse, are adjusted based upon the kind of the fluid which is to be measured, the thickness and material of the tube, so as to make optimum measurement. Accordingly, conventional doppler ultrasonic flowmeters require preliminary measurement for determining the optimum settings suitable for the object which is to be measured, which is troublesome. This leads to low evaluation of ease of use, although the conventional doppler ultrasonic flowmeter has the advantage of making measurement while suppressing error without "flow correction coefficients".

On the other hand, an arrangement may be made wherein the kind of the hardware is varied corresponding to the object to be measured and the measurement range, e.g., the doppler ultrasonic flowmeter may include multiple kinds of hardware so as to handle various tube size and various range of the maximum flow speed. However, such a configuration is undesirable from the perspective of design, costs, and the like.

On the other hand, an arrangement may be made wherein measurement is made at a greater number of measurement positions than with the aforementioned one so as to make measurement over a greater length than with the conventional one. However, such configuration is restricted by the performance of the hardware, costs, and so forth, from the perspective of responsibility of the measurement of the flow which changes in a short period of time. Even if the problems of the hardware performance and costs are solved in the future, such configuration is undesirable since such configuration is overspeced for the measurement range in which measurement can be made with the conventional doppler ultrasonic flowmeters.

On the other hand, the conventional doppler ultrasonic flowmeters have a configuration wherein measurement can be made even if a part of the fluid flows backward, i.e., a part of the fluid flows at a negative velocity. However, in actual measurement, in a case wherein the fluid flows at a sufficient flow speed, hardly any fluid flows backward. Accordingly, an arrangement may be made wherein only the forward flow is measured on the assumption that there is no backward flow in order to extend the measurement range of the flow speed.

However, such configuration has a problem that determination cannot be made whether or not a backward flow occurs.

Accordingly, it is an object of the present invention to provide a doppler ultrasonic flowmeter for making more correct measurement of the flow-speed distribution or measurement of the flow regardless of irregularities in the measurement results of the flow-speed distribution, a flow-measurement method using the doppler ultrasonic flowmeter, and a flow-measurement program employed for the doppler ultrasonic flowmeter.

Furthermore, it is another object of the present invention to provide a doppler ultrasonic flowmeter having a function for automatically calculating setting values corresponding to the properties of the object to be measured, a flow-measurement method using the doppler ultrasonic flowmeter, and a flow-measurement program employed for the doppler ultrasonic flowmeter.

Furthermore, it is another object of the present invention to provide a doppler ultrasonic flowmeter having a greater measurement range than with the conventional one without extending the performance of the hardware thereof, a flow-measurement method using the doppler ultrasonic flowmeter, and a flow-measurement program employed for the doppler ultrasonic flowmeter.

Furthermore, it is another object of the present invention to provide a doppler ultrasonic flowmeter having functions for extending the measurement range for the flow speed in a case wherein there is no flow at a negative velocity while detecting whether or not there is any flow at a negative velocity, a flow-measurement method using the doppler ultrasonic flowmeter, and a flow-measurement program employed for the doppler ultrasonic flowmeter.

DISCLOSURE OF INVENTION

In order to solve the aforementioned problems, a doppler ultrasonic flowmeter according to the present invention disclosed in Claim 1 comprises: an ultrasonic transmission member for casting ultrasonic pulses with a predetermined frequency onto the fluid within a tube, which is to be measured, along a measurement line from an ultrasonic transducer; a flow-speed distribution measurement unit for receiving ultrasonic echoes reflected from the measurement region due to ultrasonic pulses cast onto the fluid to be measured so as to measure the flow-speed distribution of the fluid to be measured in the measurement region; a flow measurement unit for measuring the flow of the fluid to be measured in the measurement region based upon the flow-speed distribution of the fluid to be measured; and a frequency selecting/setting member for automatically selecting the optimum frequency, i.e., the basic frequency $f_0$ which causes the resonant transmission phenomenon with regard to the tube wall of a fluid tube within which the fluid to be measured flows, with the ultrasonic transmission member having a configuration for emitting ultrasonic pulses with the optimum frequency selected by the frequency selecting/setting member.

In order to solve the aforementioned problems, a doppler ultrasonic flowmeter according to the present invention disclosed in Claim 2 comprises: an ultrasonic transmission member for casting ultrasonic pulses with a predetermined frequency onto the fluid within a fluid tube, which is to be measured, along a measurement line from an ultrasonic transducer; a flow-speed distribution measurement unit for receiving ultrasonic echoes reflected from the measurement region due to ultrasonic pulses cast onto the fluid to be measured so as to measure the flow-speed distribution of the fluid to be measured in the measurement region; a flow measurement unit for measuring the flow of the fluid to be measured in the measurement region based upon the flow-speed distribution of the fluid to be measured; and an incident angle adjusting/setting member for adjusting and setting the incident angle of the ultrasonic pulses cast from the ultrasonic transducer into the fluid to be measured, with the incident angle adjusting/setting member having a configuration for adjusting and setting the position and the direction of the ultrasonic transducer such that the ultrasonic pulses are cast onto the fluid tube with an incident angle which causes the resonant transmission phenomenon with regard to the tube wall of the fluid tube.

In order to solve the aforementioned problems, a doppler ultrasonic flowmeter according to the present invention disclosed in Claim 3 comprises: an ultrasonic transmission member for casting ultrasonic pulses with a predetermined frequency onto the fluid within a fluid tube, which is to be measured, along a measurement line from an ultrasonic transducer; a flow-speed distribution measurement unit for receiving ultrasonic echoes reflected from the measurement region due to ultrasonic pulses cast onto the fluid to be measured so as to measure the flow-speed distribution of the fluid to be measured in the measurement region; a flow measurement unit for measuring the flow of the fluid to be measured in the measurement region based upon the flow-speed distribution of the fluid to be measured; and a transducer position adjusting mechanism for adjusting the relative position of a pair of ultrasonic transducers serving as the ultrasonic transmission member, i.e., a first transducer and a second transducer, which are disposed away one from another along the axial direction of a fluid tube, with the transducer position adjusting mechanism having a configuration for adjusting the position of the pair of transducers while maintaining the positional relation thereof such that the ultrasonic pulse beam cast from the first transducer and the ultrasonic pulse beam cast from the second transducer are orthogonal one to another in the measurement region within the fluid tube.

In order to solve the aforementioned problems, a doppler ultrasonic flowmeter according to the present invention disclosed in Claim 4 comprises: a first reflected-wave receiver and a second reflected-wave receiver for receiving ultrasonic echoes, i.e., the reflected waves from the measurement region of the fluid tube due to ultrasonic pulses cast from the first transducer and the second transducer; a velocity-vector calculating member for calculating the velocity vectors in the direction of the ultrasonic measurement lines of the first reflected-wave receiver and the second reflected-wave receiver based upon the magnitude of ultrasonic echoes received by the first reflected-wave receiver and the second reflected-wave receiver, respectively; and a flow-speed vector calculating member for calculating the flow-speed vector of the fluid to be measured, by calculating the vector sum of the velocity vectors calculated by the velocity vector calculating member, with the flow-speed distribution measurement unit calculating the flow-speed distribution based upon the flow-speed vectors, and with the flow measurement unit computing the flow of the fluid to be measured, based upon the flow-speed distribution.

In order to solve the aforementioned problems, a doppler ultrasonic flowmeter according to the present invention disclosed in Claim 5 a comprises flow-speed distribution calculating member for calculating the flow-speed distribution of the fluid to be measured, within the measurement region, with the flow-speed distribution calculating member comprising: a flow-speed distribution calculating element for calculating the flow-speed distribution of the fluid to be measured, within the fluid tube; a center position-detecting element for detecting the center position of the fluid tube; and an area selecting element for selecting an area within the fluid tube where the flow-speed distribution is calculated, in units of division area; the area of the fluid tube being divided at the center position into two division areas, and with the flow-speed distribution measurement unit computing the flow-speed distribution for one of the division areas, which has been selected by the area selecting element, and estimate the flow-speed distribution of the fluid to be measured, in the measurement region, on the assumption that the flow-speed distribution is symmetrical with regard to the center position.

In order to solve the aforementioned problems, a doppler ultrasonic flowmeter according to the present invention disclosed in Claim 6 comprises a flow-speed distribution calculating member for calculating the flow-speed distribution of the fluid to be measured, within the measurement region, with the flow-speed distribution calculating member comprising: a flow-speed distribution calculating element for calculating the flow-speed distribution of the fluid to be measured, within the measurement; a center position detecting element for detecting the center position of the fluid tube; and an automatic area selecting element for automatically selecting an area within the fluid tube where the flow-speed distribution is calculated, in units of division area; the area of the fluid tube being divided at the center position into two division areas, and with the flow-speed distribution measurement unit computing the flow-speed distribution for one of the division areas, which has been selected by the automatic area selecting element, and estimate the flow-speed distribution of the fluid to be measured, in the measurement region, on the assumption that the flow-speed distribution is symmetrical with regard to the center position.

Note that the aforementioned automatic area selecting element selects an area where the flow-speed distribution of the fluid to be measured exhibits sufficient continuity over the area including the measurement points near the inner wall of the tube. Furthermore, the automatic area selecting element employs algorithm having a smoothing function such as spline processing, thereby selecting an area with a smooth boundary.

In order to solve the aforementioned problems, a doppler ultrasonic flowmeter according to the present invention disclosed in Claim 7 comprises: an ultrasonic transmission member for casting ultrasonic pulses with an emission frequency of $f_0$ from the ultrasonic transducer into the fluid to be measured, within the fluid tube, along the measurement line with an incident angle $\alpha$; a flow-speed distribution measurement unit for receiving ultrasonic echoes reflected from the measurement region due to ultrasonic pulses cast onto the fluid to be measured, with a pulse repetition frequency $f_{PRF}$, so as to measure the flow-speed distribution of the fluid to be measured within the measurement region; a flow measurement unit for computing the flow of the fluid to be measured, within the measurement region, based upon the flow-speed distribution of the fluid to be measured; and an optimum-value calculating member for automatically calculating the optimum value used for adjustment of measurement, which depends upon the properties of the object to be measured.

In order to solve the aforementioned problems, a doppler ultrasonic flowmeter according to the present invention disclosed in Claim 8 comprises: an ultrasonic transmission member for casting ultrasonic pulses with an emission frequency of $f_0$ from the ultrasonic transducer into the fluid to be measured, within the fluid tube, along the measurement line with an incident angle $\alpha$; a flow-speed distribution measurement unit for receiving ultrasonic echoes reflected from the measurement region due to ultrasonic pulses cast onto the fluid to be measured, with a pulse repetition frequency $f_{PRF}$, so as to measure the flow-speed distribution of the fluid to be measured within the measurement region; a flow measurement unit for computing the flow of the fluid to be measured, within the measurement region, based upon the flow-speed distribution of the fluid to be measured; and an optimum-value calculating member for automatically calculating the optimum value used for adjustment of measurement, which depends upon the properties of the object to be measured, with the optimum-value calculating member comprising: a data input element for inputting the tube diameter Di of the fluid tube, the ultrasonic wave speed Cw in the fluid to be measured, and the incident angle $\alpha$ of the ultrasonic pulses; a maximum flow-speed calculating element for calculating the maximum flow speed V based upon the flow-speed distribution calculated by the flow-speed distribution calculating member; a normalized-speed calculating element for calculating the normalized speed $V_0$ by dividing the calculated maximum flow speed V by the ultrasonic wave speed Cw in the fluid to be measured; a normalized-frequency calculating element for calculating the normalized frequency $F_0$ by dividing the pulse repetition frequency $f_{PRF}$ by the emission frequency $f_0$; and a frequency setting element for resetting the emission frequency to an emission frequency $f_1$ so as to satisfy the following expressions: $F_0 \geqq 4V_0 \cdot \sin \alpha$; and $f_{PRF} \leqq Cw/2Di$, with the flow-speed distribution measurement unit receiving ultrasonic echoes with the updated emission frequency $f_1$ so as to measure the flow-speed distribution.

In order to solve the aforementioned problems, a doppler ultrasonic flowmeter according to the present invention disclosed in Claim 9 comprises: an ultrasonic transmission member for casting ultrasonic pulses with an emission frequency of $f_0$ from the ultrasonic transducer into the fluid to be measured, within the fluid tube, along the measurement line with an incident angle $\alpha$; a flow-speed distribution measurement unit for receiving ultrasonic echoes reflected from the measurement region due to ultrasonic pulses cast onto the fluid to be measured, with a pulse repetition frequency $f_{PRF}$, so as to measure the flow-speed distribution of the fluid to be measured within the measurement region; a flow measurement unit for computing the flow of the fluid to be measured, within the measurement region, based upon the flow-speed distribution of the fluid to be measured; and an optimum-value calculating member for automatically calculating the optimum value used for adjustment of measurement, which depends upon the properties of the object to be measured, with the optimum-value calculating member comprising: a data input element for inputting the tube diameter Di of the fluid tube, the ultrasonic wave speed Cw in the fluid to be measured, and the incident angle $\alpha$ of the ultrasonic pulses; a maximum flow-speed calculating element for calculating the maximum flow speed V based upon the flow-speed distribution calculated by the flow-speed distribution calculating member; a normalized-speed calculating element for calculating the normalized speed $V_0$ by dividing the calculated maximum flow speed V by the ultrasonic wave speed Cw in the fluid to be measured; a normalized-frequency calculating element for calculating the normalized frequency $F_0$ by dividing the pulse repetition frequency $f_{PRF}$ by the emission frequency $f_0$; and an incident angle setting element for reset the incident angle of the ultrasonic pulses to an incident angle $\alpha 1$ so as to satisfy the following expressions: $F_0 \geqq 4V_0 \cdot \sin \alpha$; and $f_{PRF} \leqq Cw/2Di$, with the flow-speed distribution measurement unit receiving ultrasonic echoes due to ultrasonic pulses cast with the updated incident angle $\alpha 1$ so as to measure the flow-speed distribution.

In order to solve the aforementioned problems, a doppler ultrasonic flowmeter according to the present invention disclosed in Claim 10 comprises: an ultrasonic transmission member for casting ultrasonic pulses with a predetermined frequency onto the fluid within a fluid tube, which is to be measured, along a measurement line from an ultrasonic transducer; a flow-speed distribution measurement unit for receiving ultrasonic echoes reflected from the measurement region due to ultrasonic pulses cast onto the fluid to be measured so as to measure the flow-speed distribution of the fluid to be measured in the measurement region; a flow measurement unit for measuring the flow of the fluid to be measured in the measurement region based upon the flow-speed distribution of the fluid to be measured; a channel distance computing member for computing the minimum channel distance based upon the frequency of the ultrasonic pulses and the speed thereof; a measurement range display member for displaying the measurement range calculated based upon the minimum channel distance; and a channel distance change/setting member for changing the channel distance to a value obtained by multiplying the minimum channel distance by an integer according to instructions from the user, with the flow-speed distribution measurement unit making measurement of the flow-speed distribution with the channel distance thus determined.

In order to solve the aforementioned problems, a doppler ultrasonic flowmeter according to the present invention disclosed in Claim 11 comprises: an ultrasonic transmission member for casting ultrasonic pulses with a predetermined frequency onto the fluid within a fluid tube, which is to be measured, along a measurement line from an ultrasonic transducer; a flow-speed distribution measurement unit for receiving ultrasonic echoes reflected from the measurement region due to ultrasonic pulses cast onto the fluid to be measured so as to measure the flow-speed distribution of the fluid to be measured in the measurement region; a flow measurement unit for computing the flow of the fluid to be measured in the measurement region based upon the flow-speed distribution of the fluid to be measured; a channel distance computing member for computing the minimum channel distance based upon the frequency of the ultrasonic pulses and the speed thereof; and an automatic channel distance change/determination member for determining whether or not the channel distance is changed to a value obtained by multiplying the minimum channel distance by an integer, according to the required measurement range determined based upon the input data of the inner diameter of the fluid tube within which the fluid to be measured flows, and so forth, with the flow-speed distribution measurement unit making measurement of the flow-speed distribution with the channel distance thus determined.

In order to solve the aforementioned problems, a doppler ultrasonic flowmeter according to the present invention disclosed in Claim 12 comprises: an ultrasonic transmission member for casting ultrasonic pulses with a predetermined frequency onto the fluid within a tube, which is to be measured, along a measurement line from an ultrasonic transducer; a flow-speed distribution measurement unit for receiving ultrasonic echoes reflected from the measurement region due to ultrasonic pulses cast onto the fluid to be measured so as to measure the flow-speed distribution of the fluid to be measured in the measurement region; a flow measurement unit for computing the flow of the fluid to be measured in the measurement region based upon the flow-speed distribution of the fluid to be measured; a flow-speed distribution output member for outputting the relation between the flow-speed distribution of the fluid to be measured in the measurement region and the distance in the direction of the measurement line in the form of an image on a screen; a flow-speed zero-point display member for superimposing the zero points each of which represent the flow speed of zero, on the flow-speed distribution output by the flow-speed distribution output member, in the form of a continuous line; and a flow-speed measurement range switching member which allows the user to switch the measurement range between the normal measurement range and the double-measurement-range, thereby enabling measurement of the positive flow speed in a measurement range twice that of the normal measurement range, according to the selection of the user. With such a configuration, in the event that the user has requested the flow-speed measurement range switching member to switch the flow-speed measurement range, the flow-speed distribution output member outputs the flow-speed distribution in the positive range alone, as well as measuring the flow-speed distribution with a measurement range twice that of the normal measurement mode.

In order to solve the aforementioned problems, a doppler ultrasonic flowmeter according to the present invention disclosed in Claim 13 comprises: an ultrasonic transmission member for casting ultrasonic pulses with a predetermined frequency onto the fluid within a fluid tube, which is to be measured, along a measurement line from an ultrasonic transducer; a flow-speed distribution measurement unit for receiving ultrasonic echoes reflected from the measurement region due to ultrasonic pulses cast onto the fluid to be measured so as to measure the flow-speed distribution of the fluid to be measured in the measurement region; a flow measurement unit for computing the flow of the fluid to be measured in the measurement region based upon the flow-speed distribution of the fluid to be measured; a positive/negative determination member for determining whether or not the fluid-speed distribution of the fluid to be measured contains any negative flow-speed components in the measurement region; and a flow-speed measurement range switching member for switching the measurement range of the flow-speed distribution measurement unit to a measurement range twice that of the normal measurement mode, for measuring the positive flow speed, in the event that determination has been made that the flow-speed distribution contains no negative flow-speed components. With such a configuration, in the event that determination has been made that the flow-speed distribution contains no negative flow-speed components, the flow-speed distribution measurement unit make measurement of the flow-speed distribution with a measurement range twice that of the normal measurement mode.

In order to solve the aforementioned problems, a doppler ultrasonic flowmeter according to the present invention disclosed in Claim 14 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; and a flow measurement processing step for measuring the flow by further performing computation processing for the flow-speed distribution data of the fluid to be measured, with the flow-speed distribution measurement processing step comprising: a flow-speed distribution calculating step for calculating the flow-speed distribution data of the fluid to be measured, and the center position data of the fluid tube, by performing computation processing for the flow-speed distribution of the reflectors; a flow-speed distribution data output step for outputting the flow-speed distribution data and center position data thus obtained in the flow-speed distribution calculating step so as to be displayed on display; and an area determination step which allows the user to set a division area where the speed of the reflector groups is calculated in the flow-speed distribution calculating step; the area of the fluid tube being divided at the center position into two division areas.

In order to solve the aforementioned problems, a doppler ultrasonic flowmeter according to the present invention disclosed in Claim 15 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; and a flow measurement processing step for measuring the flow by further performing computation processing for the flow-speed distribution data of the fluid to be measured, with the flow-speed distribution measurement processing step comprising: a flow-speed distribution calculating step for calculating the flow-speed distribution data of the fluid to be measured, and the center position data of the fluid tube, by performing computation processing for the flow-speed distribution of the reflectors; an automatic area selecting step for automatically selecting a division area where the flow-speed distribution is calculated using the reflector groups; the area of the fluid tube being divided at the center position into two division areas; and a flow-speed distribution data output step for outputting the flow-speed distribution data and the center position data obtained in the flow-speed distribution calculating step and the automatic area selecting step, so as to be displayed on display.

In order to solve the aforementioned problems, a doppler ultrasonic flowmeter according to the present invention disclosed in Claim 16 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; an optimum-value setting step for calculating the optimum values of the basic frequency $f_0$, the pulse repetition frequency $f_{PRF}$, and the incident angle $\alpha$; and a flow measurement processing step for measuring the flow by further performing computation processing for the flow-speed distribution data of the fluid to be measured, with the reflector-group-speed calculating step comprising: an initial value acquisition step for receiving the initial values of the basic frequency $f_0$, the pulse repetition frequency $f_{PRF}$, the incident angle $\alpha$, at the start of measurement; and a reflector-group-speed calculating step for receiving ultrasonic echoes due to ultrasonic pulses cast onto the fluid to be measured, so as to calculate the speed of each of the number of reflectors contained in the fluid to be measured, and with the optimum-value setting step including an emission frequency reset step for resetting the emission frequency to an emission frequency $f_1$ so as to satisfy the following expressions: $F_0 \geqq 4V_0 \cdot \sin \alpha$; and $f_{PRF} \leqq Cw/2Di$.

In order to solve the aforementioned problems, a doppler ultrasonic flowmeter according to the present invention disclosed in Claim 17 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; an optimum-value setting step for calculating the optimum values of the basic frequency $f_0$, the pulse repetition frequency $f_{PRF}$, and the incident angle $\alpha$; and a flow measurement processing step for measuring the flow by further performing computation processing for the flow-speed distribution data of the fluid to be measured, with the reflector-group-speed calculating step comprising: an initial value acquisition step for receiving the initial values of the basic frequency $f_0$, the pulse repetition frequency $f_{PRF}$, the incident angle $\alpha$, at the start of measurement; and a reflector-group-speed calculating step for receiving ultrasonic echoes due to ultrasonic pulses cast onto the fluid to be measured, so as to calculate the speed of each of the number of reflectors contained in the fluid to be measured, and with the optimum-value setting step including an incident angle reset step for resetting the incident angle to $\alpha 1$ so as to satisfy the following expressions: $F_0 \geqq 4V_0 \cdot \sin \alpha$; and $f_{PRF} \leqq Cw/2Di$.

In order to solve the aforementioned problems, a doppler ultrasonic flowmeter according to the present invention disclosed in Claim 18 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; a channel distance computing step for computing the minimum channel distance based upon the frequency of the ultrasonic pulses and the speed thereof; a measurement range display steps for displaying a GUI which allows the user to determine whether or not the channel distance is set to a value obtained by multiplying the minimum channel distance by an integer, thereby allowing the user to set the measurement region to a value obtained by multiplying the minimum measurement region by an integer; a channel distance changing step for changing the channel distance to a value obtained by multiplying the minimum channel distance by an integer, according to instructions of the user; and a flow measurement processing step for measuring the flow by further performing computation processing for the flow-speed distribution data of the fluid to be measured.

In order to solve the aforementioned problems, a doppler ultrasonic flowmeter according to the present invention disclosed in Claim 19 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; a channel distance computing step for computing the minimum channel distance based upon the frequency of the ultrasonic pulses and the speed thereof; a measurement range calculating step for calculating the measurement range based upon the minimum channel distance thus computed; a channel distance changing step having a function for determining whether or not the channel distance is to be set to a value obtained by multiplying the minimum channel distance by an integer, thereby allowing the system to automatically change the channel distance; and a flow measurement processing step for measuring the flow by further performing computation processing for the flow-speed-distribution data of the fluid to be measured.

In order to solve the aforementioned problems, a doppler ultrasonic flowmeter according to the present invention disclosed in Claim 20 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; a flow-speed distribution output step for outputting the relation between the flow-speed distribution of the fluid to be measured and the distance in the direction of the measurement line ML, in the form of an image on a screen; a flow-speed zero-line display step for superimposing a fluid-speed zero line on the flow-speed distribution output in the form of an image on a screen in the flow-speed distribution output step; a flow-speed measurement range switching determination step which allows the user to determine whether or not the flow-speed measurement range is switched; a flow-speed measurement range switching step for switching the flow-speed measurement range to twice that of the normal measurement range, for measuring the positive flow speed according to the instructions of the user; and a flow measurement processing step for measuring the flow by further performing computation processing for the flow-speed distribution data of the fluid to be measured.

In order to solve the aforementioned problems, a doppler ultrasonic flowmeter according to the present invention disclosed in Claim 21 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; a flow-speed range switching determination step which allows the user to determine whether or not the flow-speed measurement range is switched; a flow-speed distribution output step for outputting the relation between the flow-speed distribution of the fluid to be measured, and the distance in the direction of the measurement line ML, in the form of an image on a screen; a flow-speed zero-line display step for superimposing a flow-speed zero line on the flow-speed distribution output in the form of an image on a screen in the flow-speed distribution output step; a flow-speed measurement range switching step for switching the flow-speed measurement range to twice that of the normal measurement mode according to the instructions of the user for measuring the positive flow speed; and a flow measurement processing step for measuring the flow by further performing computation processing for the flow-speed distribution data of the fluid to be measured.

In order to solve the aforementioned problems, a doppler ultrasonic flowmeter according to the present invention disclosed in Claim 22 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; a flow measurement processing step for measuring the flow by further performing computation processing for the flow-speed distribution data of the fluid to be measured, with the flow-speed distribution measurement processing step comprising: a flow-speed distribution calculating step for calculating the flow-speed distribution data of the fluid to be measured, and the center position data of the fluid tube, by performing computation processing for the flow-speed distribution of the reflectors; a flow-speed distribution data output step for outputting the flow-speed distribution data and center position data thus obtained in the flow-speed distribution calculating step so as to be displayed on display; and an area determination step which allows the user to set a division area where the speed of the reflector groups is calculated in the flow-speed distribution calculating step; the area of the fluid tube being divided at the center position into two division areas, and with a computer executing the reflector-group-speed calculating step, the flow-speed distribution measurement processing step, and the flow measurement processing step, according to the program.

In order to solve the aforementioned problems, a doppler ultrasonic flowmeter according to the present invention disclosed in Claim 23 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; and a flow measurement processing step for measuring the flow by further performing computation processing for the flow-speed distribution data of the fluid to be measured, with the flow-speed distribution measurement processing step comprising: a flow-speed distribution calculating step for calculating the flow-speed distribution data of the fluid to be measured, and the center position data of the fluid tube, by performing computation processing for the flow-speed distribution of the reflectors; an automatic area selecting step for automatically selecting a division area where the flow-speed distribution is calculated using the reflector groups; the area of the fluid tube being divided at the center position into two division areas; and a flow-speed distribution data output step for outputting the flow-speed distribution data and the center position data obtained in the flow-speed distribution calculating step and the automatic area selecting step, so as to be displayed on display, and with a computer executing the reflector-group-speed calculating step, the flow-speed distribution measurement processing step, and the flow measurement processing step, according to the program.

In order to solve the aforementioned problems, a doppler ultrasonic flowmeter according to the present invention disclosed in Claim 24 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; an optimum-value setting step for calculating the optimum values of the basic frequency $f_0$, the pulse repetition frequency $f_{PRF}$, and the incident angle $\alpha$; and a flow measurement processing step for measuring the flow by further performing computation processing for the flow-speed distribution data of the fluid to be measured, with the reflector-group-speed calculating step comprising: an initial value acquisition step for receiving the initial values of the basic frequency $f_0$, the pulse repetition frequency $F_{PRF}$, the incident angle $\alpha$, at the start of measurement; and a reflector-group-speed calculating step for receiving ultrasonic echoes due to ultrasonic pulses cast onto the fluid to be measured, so as to calculate the speed of each of the number of reflectors contained in the fluid to be measured, and with the optimum-value setting step including an emission frequency reset step for resetting the emission frequency to an emission frequency $f_1$ so as to satisfy the following expressions: $F_0 \geq 4V_0 \cdot \sin \alpha$; and $f_{PRF} \leq Cw/2Di$, and with a computer executing the reflector-group-speed calculating step, the flow-speed distribution measurement processing step, the optimum-value setting step, and the flow measurement processing step, according to the program.

In order to solve the aforementioned problems, a doppler ultrasonic flowmeter according to the present invention disclosed in Claim 25 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; an optimum-value setting step for calculating the optimum values of the basic frequency $f_0$, the pulse repetition frequency $f_{PRF}$, and the incident angle $\alpha$; and a flow measurement processing step for measuring the flow by further performing computation processing for the flow-speed distribution data of the fluid to be measured, with the reflector-group-speed calculating step comprising: an initial value acquisition step for receiving the initial values of the basic frequency $f_0$, the pulse repetition frequency $f_{PRF}$, the incident angle $\alpha$, at the start of measurement; and a reflector-group-speed calculating step for receiving ultrasonic echoes due to ultrasonic pulses cast onto the fluid to be measured, so as to calculate the speed of each of the number of reflectors contained in the fluid to be measured, and with the optimum-value setting step including an incident angle reset step for resetting the incident angle to $\alpha 1$ so as to satisfy the following expressions: $F_0 \geq 4V_0 \cdot \sin \alpha$; and $f_{PRF} \leq Cw/2Di$, and with a computer executing the reflector-group-speed calculating step, the flow-speed distribution measurement processing step, the optimum-value setting step, and the flow measurement processing step, according to the program.

In order to solve the aforementioned problems, a doppler ultrasonic flowmeter according to the present invention disclosed in Claim 26 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; a channel distance computing step for computing the minimum channel distance based upon the frequency of the ultrasonic pulses and the speed thereof; a measurement range display step for displaying a GUI which allows the user to determine whether or not the channel distance is set to a value obtained by multiplying the minimum channel distance by an integer, thereby allowing the user to set the measurement region to a value obtained by multiplying the minimum measurement region by an integer; a channel distance changing step for changing the channel distance to a value obtained by multiplying the minimum channel distance by an integer, according to instructions of the user; and a flow measurement processing step for measuring the flow by further performing computation processing for the flow-speed distribution data of the fluid to be measured, with a computer executing the steps according to the program.

In order to solve the aforementioned problems, a doppler ultrasonic flowmeter according to the present invention disclosed in Claim 27 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; a channel distance computing step for computing the minimum channel distance based upon the frequency of the ultrasonic pulses and the speed thereof; a measurement range calculating step for calculating the measurement range based upon the minimum channel distance thus computed; a channel distance changing step having a function for determining whether or not the channel distance is to be set to a value obtained by multiplying the minimum channel distance by an integer, thereby allowing the system to automatically change the channel distance; and a flow measurement processing step for measuring the flow by further performing computation processing for the flow-speed distribution data of the fluid to be measured, with a computer executing the steps according to the program.

In order to solve the aforementioned problems, a doppler ultrasonic flowmeter according to the present invention disclosed in Claim 28 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; a flow-speed distribution output step for outputting the relation between the flow-speed distribution of the fluid to be measured and the distance in the direction of the measurement line ML, in the form of an image on a screen; a flow-speed zero-line display-step for superimposing a fluid-speed zero line on the flow-speed distribution output in the form of an image on a screen in the flow-speed distribution output step; a flow-speed measurement range switching determination step which allows the user to determine whether or not the flow-speed measurement range is switched; a flow-speed measurement range switching step for switching the flow-speed measurement range to twice that of the normal measurement range, for measuring the positive flow speed according to the instructions of the user; and a flow measurement processing step for measuring the flow by further performing computation processing for the flow-speed distribution data of the fluid to be measured, with a computer executing the steps according to the program.

In order to solve the aforementioned problems, a doppler ultrasonic flowmeter according to the present invention disclosed in Claim 29 comprises: a reflector-group-speed calculating step for receiving ultrasonic echoes due to ultrasonic pulses cast onto the fluid to be measured, so as to calculate the speed of each of a number of reflector groups contained in the fluid to be measured; a flow-speed distribution measurement processing step for measuring the flow-speed distribution of the fluid to be measured, based upon the flow-speed distribution data of the reflector groups obtained in the reflector-group-speed calculating step; a flow-speed range switching determination step which allows the user to determine whether or not the flow-speed measurement range is switched; a flow-speed distribution output step for outputting the relation between the flow-speed distribution of the fluid to be measured, and the distance in the direction of the measurement line ML, in the form of an image on a screen; a flow-speed zero-line display step for superimposing a flow-speed zero line on the flow-speed distribution output in the form of an image on a screen in the flow-speed distribution output step; a flow-speed measurement range switching step for switching the flow-speed measurement range to twice that of the normal measurement mode according to the instructions of the user for measuring the positive flow speed; and a flow measurement processing step for measuring the flow by further performing computation processing for the flow-speed distribution data of the fluid to be measured, with a computer executing the steps according to the program.

Figure 1:
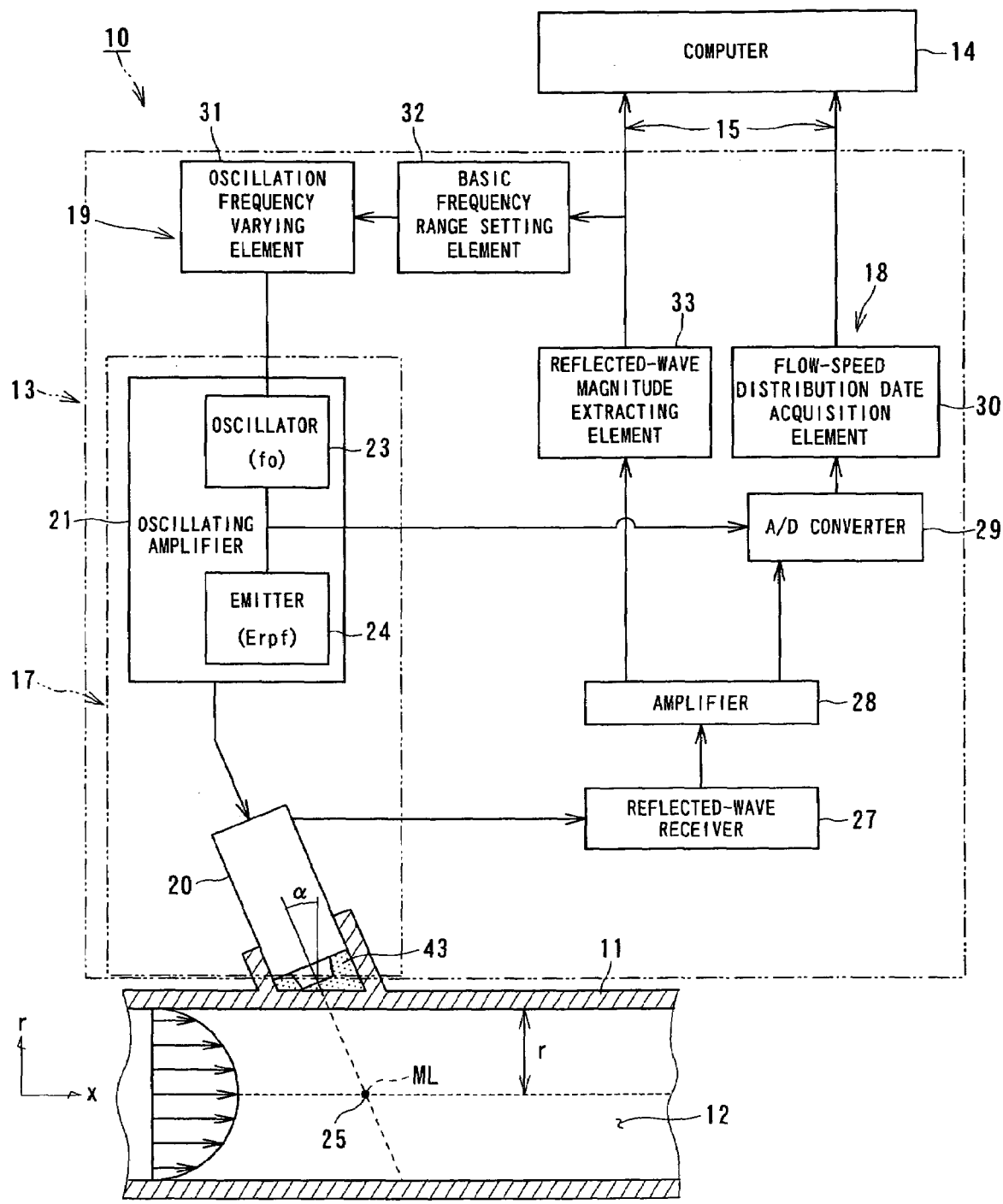
FIG. 1 is a schematic diagram which shows a configuration of a doppler ultrasonic flowmeter according to a first embodiment of the present invention.

REFERENCE NUMERALS 10, 10A, 10B, 10C, 10D, 10E doppler ultrasonic flowmeter
11 fluid tube
12 fluid to be measured
13 ultrasonic flow-speed distribution data acquisition unit (Udflow unit)
14 computer
15 signal transmission cable
17 ultrasonic transmission member
18 flow-speed distribution data acquisition member
19 frequency selecting/setting member
20 ultrasonic transducer
21 oscillating amplifier
23 oscillator
24 emitter
25 ultrasonic reflector (reflector)
27 reflected-wave receiver
28 amplifier
29 A/D converter
30 flow-speed distribution data acquisition element
31 oscillation frequency varying element
32 basic frequency range setting element
33 reflected-wave magnitude extracting element
35 computation processing member
36 memory
37 storage member
38 input member
39 display monitor
40 interface member
41, 41A, 41B, 41C, 41D, 41E, 41F, 41G, 41H flow-measurement PG
43 contact medium
50, 50A doppler ultrasonic flowmeter
51 incident angle adjusting/setting member
52 incident angle adjusting mechanism
53 incident angle range setting member
54 reflected-wave magnitude extracting member
56 stepping motor
60 doppler ultrasonic flowmeter
61 ultrasonic transducer position adjusting mechanism
62 velocity-vector calculating member
63 flow-velocity vector calculating member
67, 67A flow-speed distribution-calculating member
68 flow calculating member
70 flow-speed distribution calculating element
71 center position detecting element
72 area selecting element
73 center line
74 area selection GUI
75 automatic area selecting element
77, 77A optimum value calculating member
78 data input element
79 maximum flow-speed calculating element
80 normalized flow-speed calculating element
81 normalized frequency calculating element
82 frequency setting element
84 incident angle setting element
87 channel distance computing member
88 measurement range display member
89 channel distance change/setting member
91 measurement range bar
92 flow-speed distribution display portion
93 channel distance change/determination dialog box
94 channel distance setting window
95 vertical cursor
97 channel distance automatic change/determination member
99 flow-speed distribution output member
100 flow-speed zero-point display member
101 flow-speed measurement range switching member
103 flow-speed zero line
104 flow-speed range switching GUI
106 positive/negative determination member
107 automatic flow-speed range switching member

BEST MODE FOR CARRYING OUT THE INVENTION

Description will be made regarding a doppler ultrasonic flowmeter according to an embodiment of the present invention with reference to the accompanying drawings.

First Embodiment

FIG. 1 is a schematic diagram which shows a schematic configuration of a doppler ultrasonic flowmeter 10 according to a first embodiment of the present invention.

The doppler ultrasonic flowmeter 10 has a configuration for measuring the flow-speed distribution of a fluid 12 (liquid or gas) which is to be measured, flowing within a fluid tube 11, thereby enabling real-time measurement of the flow over time. The doppler ultrasonic flowmeter 10 comprises an ultrasonic flow-speed distribution data acquisition unit (which will be referred to as "Udflow unit" hereafter) 13 for making measurement of the flow speed of the fluid 12 to be measured, flowing within the fluid tube 11, in a non-contact manner, and a computer 14 for computing the flow-speed distribution of the fluid 12 to be measured based upon the electric signals (data) received from the Udflow unit 13 in order to calculate the flow of the fluid 12 to be measured, and displaying the measurement results thus obtained over time. Note that the Udflow unit 13 is electrically connected to the computer 14 through a signal transmission cable 15.

The Udflow unit 13 comprises an ultrasonic transmission member 17 for transmitting ultrasonic pulses with a predetermined frequency (basic frequency $f_0$) along the measurement line ML within the fluid 12 to be measured, an flow-speed distribution data acquisition member 18 for receiving ultrasonic echoes reflected from the measurement region due to the ultrasonic pulses cast onto the fluid 12 to be measured, and calculating the flow-speed distribution of the fluid 12 which is to be measured in the measurement region in the form of the flow-speed distribution data, and an frequency selecting/setting member 19 for automatically selecting the ultrasonic frequency (which will be referred to as "optimum frequency" hereafter) which allows measurement of the flow-speed distribution of the fluid 12 to be measured, flowing within the fluid tube 11 or measurement of the flow thereof, with optimum efficiency.

The ultrasonic transmission member 17 comprises an ultrasonic transducer 20 for oscillating ultrasonic pulses with a predetermined frequency, and an oscillating amplifier 21 serving as ultrasonic oscillation signal generating means for oscillating the ultrasonic transducer 20. The oscillating amplifier 21 includes an oscillator 23 for generating electric signals with a predetermined basic frequency $f_0$, and an emitter 24 for outputting pulse-shaped electric signals (which will be referred to as "ultrasonic oscillation signals" hereafter) at predetermined time intervals ($1/F_{rpf}$) according to the electric signals received from the oscillator 23.

At the time of measurement of the flow-speed distribution of the fluid 12 to be measured or measurement of the flow thereof, the ultrasonic transducer 20 receives ultrasonic oscillation signals with the predetermined basic frequency $f_0$ from the oscillating amplifier 21 serving as ultrasonic oscillation signal generating means. Upon reception of the pulse-shaped ultrasonic oscillation signals, the ultrasonic transducer 20 oscillates ultrasonic pulses with the basic frequency $f_0$, and casts the ultrasonic pulses thus oscillated onto the fluid 12 to be measured, along the measurement line ML. Note that the ultrasonic pulses are cast with the pulse width of around 5 mm, for example, in the form of a straight beam with an extremely small divergence angle.

The ultrasonic transducer 20 has the functions serving as ultrasonic receiving means as well as the ultrasonic transmission member 17. With the present embodiment, the ultrasonic transducer 20 receives ultrasonic echoes due to reflection of incident ultrasonic pulses from one of a great number of ultrasonic reflectors (which may be simply referred to as "reflector" hereafter) 25 contained in the fluid 12 which is to be measured. Note that examples serving as reflectors 25 include: bubbles, fine particles of a material such as aluminum or the like having different acoustic impedance from that of the fluid 12 to be measured, i.e., a foreign material, which are contained with high uniformity in the fluid 12 to be measured.

The ultrasonic echoes received by the ultrasonic transducer 20 are transmitted to a reflected-wave receiver 27 included in the Udflow unit 13. The reflected-wave receiver 27 converts the ultrasonic echoes into electric signals. The electric signals (which will be referred to as "ultrasonic echo signals" hereafter) converted from the ultrasonic echoes are input to an amplifier 28 from the reflected-wave receiver 27. The electric signals are amplified by the amplifier 28, following which the electric signals are input to an analog-to-digital (which will be referred to as "A/D" hereafter) converter 29.

Furthermore, the A/D converter 29 receives electric signals (which will be referred to as "basic frequency signals" hereafter) with a basic frequency $f_0$ from the oscillating amplifier 21. Accordingly, the A/D converter 29 converts the ultrasonic echo signals and the basic frequency signals in the form of analog signals into those in the form of digital signals. Then, the digitized ultrasonic echo signals and the digitized basic frequency signals are input to a speed-distribution data acquisition element 30.

The speed-distribution data acquisition element 30 includes a processor for performing computation processing, and has a function for calculating change in the position corresponding to the doppler shift based upon the digitized ultrasonic echo signals and the digitized basic frequency signals received from the A/D converter 29, each of which are time-series data, more specifically, based upon the difference in the frequency between both the aforementioned signals, thereby calculating the speed of a number of reflectors (which will be expediently referred to as "reflectors" or "reflector group" hereafter) 25 contained in the fluid 12 to be measured, along the measurement line ML. The measurement results are corrected with regard to the tilt angle α, thereby measuring the flow-speed distribution of the reflectors 25 on the cross-section of the fluid tube 11.

The speed of the reflectors 25 contained in the fluid 12 to be measured is assumed to be the same as the flow speed of the fluid 12 to be measured. Accordingly, measuring the speed of the reflectors 25 contained in the fluid 12 to be measured means measuring the flow speed of the fluid 12 to be measured. The flow-speed data of the reflectors 25 thus obtained by computation processing is output from the flow-speed distribution data acquisition element 30, and is input to the computer 14 serving as flow-speed distribution calculating member and flow calculating member through the signal transmission cable 15.

The computer 14 performs computation processing for the flow-speed data of the reflectors 25 received from the flow-speed distribution data acquisition element 30. First, the computer 14 performs flow-speed distribution measurement processing step for calculating the flow-speed distribution of the fluid 12 to be measured, and displaying the calculation results on display included in the computer 14. Then, the computer 14 further performs flow measurement processing step for computing the flow thereof based upon the flow-speed distribution of the fluid 12 to be measured thus obtained, and displaying the calculation results.

The frequency selecting/setting member 19 comprises an oscillation frequency varying element 31 for inputting control signals to the oscillating amplifier 21 for controlling the oscillation frequency of the oscillating amplifier 21, a basic frequency range setting element 32 for operating the oscillation frequency varying element 31 in a predetermined frequency range, e.g., in a frequency range of 200 kHz to 4 MHz, the reflected-wave receiver 27 for receiving the ultrasonic echoes which are the reflected waves from the reflector 25 within the fluid tube 11, and outputting the ultrasonic echo signals converted from the ultrasonic echoes, the amplifier 28 for amplifying the ultrasonic echo signals received from the reflected-wave receiver 27, and a reflected-wave magnitude extracting element 33 for extracting the magnitude of the ultrasonic echo signals received from the amplifier 28, and storing the extracted signal magnitude in memory included in the reflected-wave magnitude extraction element 33.

The frequency selecting/setting member 19 repeats processing for extracting and selecting the ultrasonic oscillation frequency by actions of the reflected-wave magnitude extracting element 33, the oscillation frequency varying element 31, and the like, thereby outputting control signals for automatically selecting and setting the optimum ultrasonic oscillation frequency suitable for the measurement. Then, the control signals output from the frequency selecting/setting member 19 is input to the oscillating amplifier 21 in the form of feedback signals. The oscillating amplifier 21 automatically selects and adjusts the oscillation frequency according to the control signals thus received.

In this case, the frequency selecting/setting member 19 automatically selects the optimum frequency, e.g., the basic frequency $f_0$ at which resonant transmission occurs in the tube wall of the fluid tube 11 within which the fluid 12 to be measured flows, for example, thereby allowing the ultrasonic transducer 20 to oscillate the ultrasonic pulses with the optimum frequency. Specifically, the frequency selecting/setting member 19 automatically selects the optimum frequency such that the value obtained by multiplying the half wavelength of the ultrasonic pulses by an integer matches the tube thickness of the fluid tube 11 within which the fluid 12 to be measured flows. The aforementioned method has been proposed based upon the fact that the fluid tube 11 formed with the wall thickness matching the value obtained by multiplying the half wavelength of the selected ultrasonic pulse having the basic frequency of $f_0$ by an integer exhibits extremely high transmissivity with regard to the ultrasonic pulses.

Figure 2:
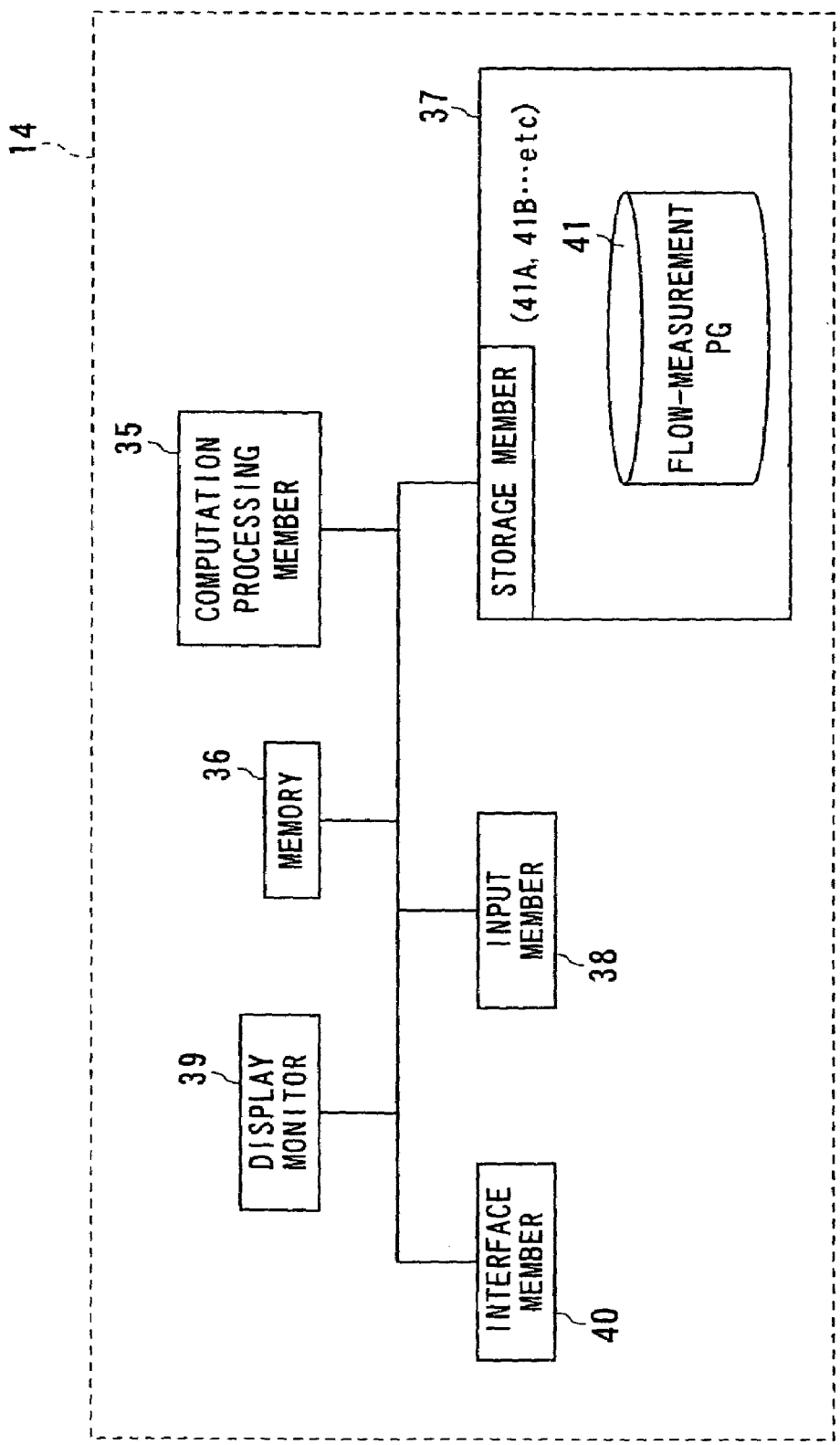
FIG. 2 is a schematic diagram which shows a basic configuration of a computer included in a doppler ultrasonic flowmeter according to the present invention.

FIG. 2 is a schematic diagram which shows a basic schematic configuration of the computer 14. The computer 14 comprises a computation processing member 35 such as a CPU, an MPU, or the like, for performing computation processing, a memory 36 for temporarily storing electronic data, a storage member 37 for recording and storing the electronic data, a input member 38 which allow the user to input instructions, a display monitor 39 for displaying the computation results, and an interface (which will be abbreviated to "I/F" hereafter) member 40 for electric connection between the computer 14 and external devices. Note that the storage member 37 stores a flow measurement program ("program" will be abbreviated to "PG" hereafter) 41 for allowing the computation processing member 35 to execute computation processing (including accessory computation processing) for calculating the flow-speed distribution of the fluid 12 to be measured and the flow thereof.

With the doppler ultrasonic flowmeter 10, the computer 14 executes the flow measurement PG 41. As a result, the computer 14 performs flow-speed distribution measurement processing step, or a series of flow-speed distribution measurement processing step and the flow measurement processing step, according to the flow measurement PG 41, and displays the measurement results of the flow-speed distribution of the fluid 12 to be measured or the measurement results of the flow thereof on the display monitor 39.

Note that in FIG. 1, reference numeral 43 denotes a contact medium for smoothly transmitting the ultrasonic waves cast from the ultrasonic transducer 20 into the fluid tube 11. That is to say, the contact medium 43 is provided for reducing the acoustic impedance for improving transmission of the ultrasonic pulses cast into the fluid tube 11 from the ultrasonic transducer 20, thereby improving acoustic switching.

While description has been made regarding the doppler ultrasonic flowmeter 10 having a configuration wherein the Udflow unit 13 is electrically connected to the computer 14 through the signal transmission cable 15, the present invention is not restricted to the aforementioned arrangement, rather, the Udflow unit 13 is connected to the computer 14 via wireless communication.

While description has been made regarding an arrangement wherein the Udflow unit 13 includes the reflected-wave receiver 27 and the ultrasonic transducer 20, an arrangement may be made wherein the ultrasonic transducer 20 further has the functions serving as the reflected-wave receiver 27. While description has been made regarding an arrangement wherein the Udflow unit 13 includes the flow-speed distribution data acquisition element 30, the present invention is not restricted to the aforementioned arrangement, rather, an arrangement may be made wherein the computer 14 has the functions serving as the flow-speed distribution data acquisition element 30 according to software instructions.

With the doppler ultrasonic flowmeter 10 having a configuration as shown in FIG. 1, the fluid tube 11 is formed with the wall thickness matching the value obtained by multiplying the half wavelength of the ultrasonic pulses by an integer exhibits extremely improved transmissivity with regard to the ultrasonic waves at the interface of the fluid tube 11 due to the resonant effects. The improved ultrasonic transmissivity with regard to the ultrasonic waves improves ultrasonic echo signals due to reflection from the reflectors contained in the fluid 12 to be measured. Accordingly, with the doppler ultrasonic flowmeter 10 according to the present embodiment, the ultrasonic transducer 20 oscillates the ultrasonic pulses with the optimum basic frequency $f_0$ suitable for the wall thickness of the fluid tube 11 according to instructions from the frequency selecting/setting member 19. this matter reduces decay of the ultrasonic pulses along the ultrasonic path (path along the measurement line ML), as well as improving the ultrasonic transmissivity at the interface of the fluid tube 11, thereby achieving sufficient magnitude of the reflected waves.

Second Embodiment

Figure 3:
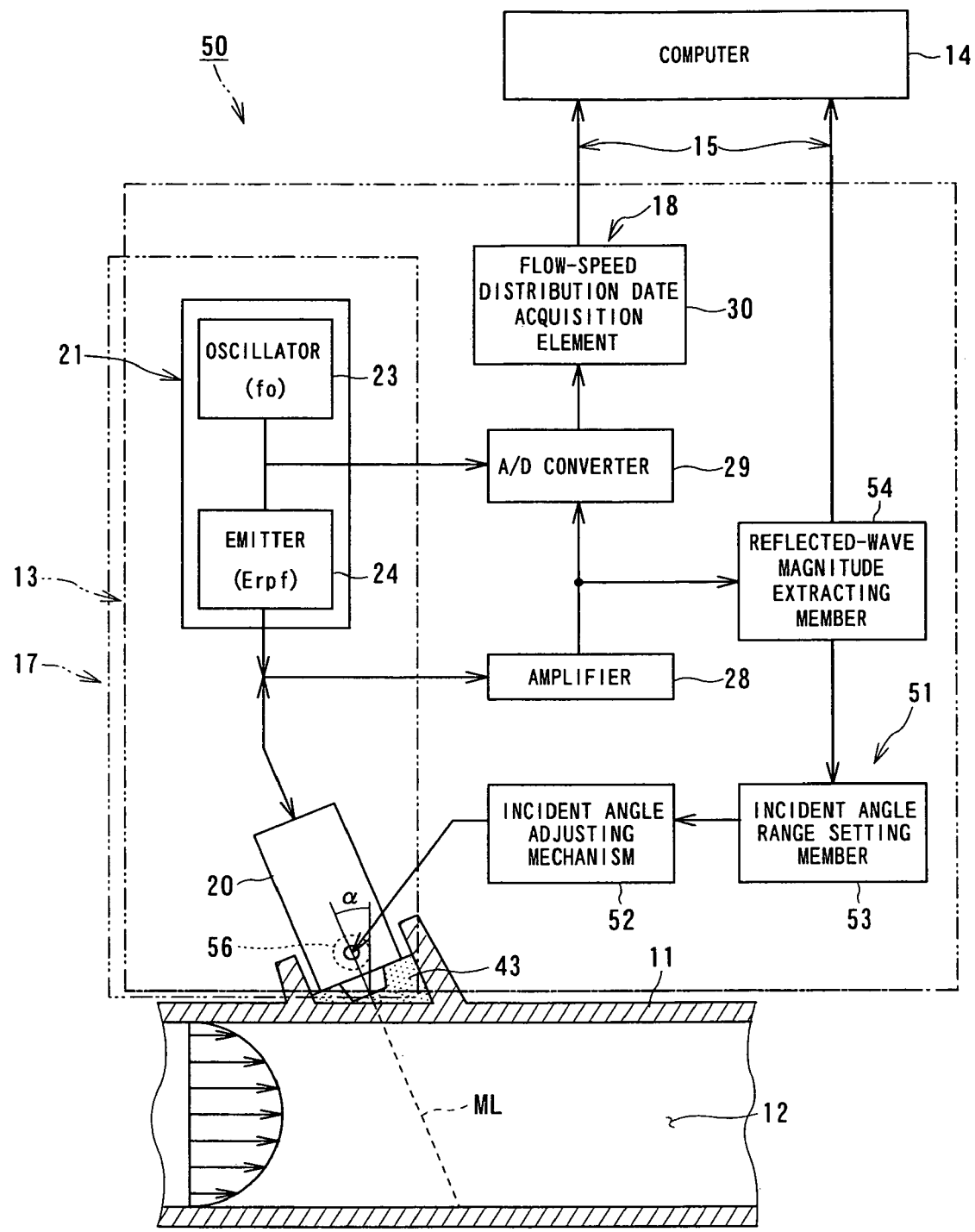
FIG. 3 is a schematic diagram which shows a configuration of a doppler ultrasonic flowmeter according to a second embodiment of the present invention.

FIG. 3 is a schematic diagram which shows a schematic configuration of a doppler ultrasonic flowmeter 50 according to a second embodiment of the present invention.

The doppler ultrasonic flowmeter 50 has a configuration for improving the signal-to-noise (which will be abbreviated to "S/N" hereafter) ratio of the reflected waves, but having no function for selecting and setting the optimum frequency of the ultrasonic pulses cast into the fluid tube 11.

In order to improve the S/N ratio of the reflected waves, an arrangement may be made wherein the wall thickness of the fluid tube 11 is adjusted such that resonant transmission occurs. However, such a configuration for adjusting the wall thickness of the fluid tube 11 is far from practical. With the present embodiment, the mounting angle of the ultrasonic transducer 20 is adjusted, thereby achieving the same effects as with the aforementioned configuration for adjusting the wall thickness of the fluid tube 11.

The doppler ultrasonic flowmeter 50 has a function for adjusting the incident angle α of the ultrasonic pulses emitted from the ultrasonic transducer 20, according to instructions received from an incident angle adjusting/setting member 51, thereby automatically adjusting the incident angle of the ultrasonic pulses suitable for the wall thickness of the fluid tube 11. Note that the same components as with the doppler ultrasonic flowmeter 10 described in the first embodiment are denoted by the same reference numerals, and description thereof will be omitted.

The doppler ultrasonic flowmeter 50 shown in FIG. 3 includes the incident angle adjusting/setting member 51, instead of the frequency selecting/setting member 19.

The incident angle adjusting/setting member 51 comprises the ultrasonic transducer 20 mounted on the fluid tube 11 from the outside with an adjustable mounting angle, an incident angle adjusting mechanism 52 for adjusting the incident angle α of the ultrasonic pulses cast from the ultrasonic transducer 20, an incident angle range setting member 53 for operating the incident angle adjusting mechanism 52 in a predetermined angular range, e.g., in a range of an incident angle α of 5° to 45°, and a reflected-wave magnitude extracting member 54 for extracting the magnitude of the ultrasonic echoes from the ultrasonic echoes reflected from the measurement region within the aforementioned fluid tube 11, and storing the extracted results. Note that the magnitude of the ultrasonic echoes thus extracted and stored by the reflected-wave magnitude extracting member 54 is input to the computer 14, and is displayed on the display monitor 39.

The aforementioned incident angle adjusting/setting member 51 has the incident angle adjusting mechanism 52 for adjusting the incident angle α of the ultrasonic pulses in a range approximately 5° to 45°. Specifically, the incident angle adjusting mechanism 52 outputs control signals for automatically adjusting the mounting angle of the ultrasonic transducer 20 to be the optimum value. More specifically, the mounting angle of the ultrasonic transducer 20 is adjusted by driving a mounting angle adjusting mechanism such as a stepping motor 56 or the like, for example, according to the control signals output from the incident angle adjusting mechanism 52.

The incident angle α of the ultrasonic pulses cast from the ultrasonic transducer 20 matches the angle between the ultrasonic pulse beam and the line or the plane orthogonal to the tube surface of the fluid tube 11. The incident angle of the ultrasonic pulses cast from the ultrasonic transducer 20 is adjusted by the incident angle adjusting/setting member 51 such that resonant transmission occurs with regard to the wall thickness of the fluid tube 11, i.e., the optimum incident angle is selected.

The incident angle adjusting/setting member 51 has the functions for extracting the magnitude of the reflected waves by actions of the reflected-wave magnitude extracting member 54 while varying the incident angle of the ultrasonic pulse cast from the ultrasonic transducer 20 in an incident angular range of approximately 5° to 45° according to the control signals output from the incident angle adjusting mechanism 52, and storing the measurement results. The magnitude of the reflected waves stored in the reflected-wave magnitude extracting member 54 is input to the incident angle adjusting/setting member 51 for repeating extracting/selecting processing so as to automatically selecting the optimum incident angle of the ultrasonic pulses, as well as being displayed on the display monitor 39.

The doppler ultrasonic flowmeter 50 according to the present embodiment has a configuration wherein the incident angle adjusting/setting member 51 adjusts the incident angle of the ultrasonic pulses cast from the ultrasonic transducer 20 to be the optimum incident angle, thereby achieving the same effects as with an arrangement wherein the wall thickness of the fluid tube 11 is changed, and thereby enabling high-precision measurement of the flow-speed distribution of the fluid 12 to be measured, which flows within the fluid tube 11, and measurement of the flow thereof, using the ultrasonic pulses cast from the ultrasonic transducer 20.

The distance of the propagation path within a material, i.e., the distance of the ultrasonic propagation path within the fluid tube 11, is controlled by adjusting the incident angle (emission angle) of the ultrasonic pulses cast from the ultrasonic transducer 20. With the present embodiment, the incident angle is adjusted such that the distance of the ultrasonic propagation path matches a value obtained by multiplying the half wavelength of the ultrasonic pulses by an integer. This causes the resonant transmission phenomenon with regard to the wall thickness of the fluid tube 11, thereby achieving the sufficient S/N ratio of the reflected waves, and thereby achieving the sufficient magnitude of the ultrasonic echoes due to reflection. Thus, the doppler ultrasonic flowmeter 50 according to the present embodiment has the advantage of enabling measurement of the flow-speed distribution of the fluid to be measured, which flows within the fluid tube 11, and the measurement of the flow thereof, with high precision in a non-contact-manner.

While description has been made regarding an arrangement wherein the doppler ultrasonic flowmeter 50 includes the incident angle adjusting/setting member 51, instead of the frequency selecting/setting member 19, an arrangement may be made wherein a single doppler ultrasonic flowmeter includes a combination of the frequency selecting/setting member 19 and the incident angle adjusting/setting member 51. Such a configuration including a combination of the frequency selecting/setting member 19 and the incident angle adjusting/setting member 51 allows the doppler ultrasonic flowmeter to automatically select and set the optimum frequency and the optimum incident angle in a simple manner.

The doppler ultrasonic flowmeters 10 and 50 shown in FIG. 1 and FIG. 3 have a configuration for measuring the flow of the fluid to be measured, with the line measurement method for the flow-speed distribution using the doppler shift between the incident ultrasonic pulses and the reflected ultrasonic echo. Accordingly, in order to improve the measurement precision, there is the need to increase the number of the measurement lines ML, i.e., the number of the ultrasonic transducers 23.

In order to improve the measurement precision, an arrangement may be made wherein the N ultrasonic transducers 20 are disposed on the tube 11 at a predetermined pitch along the circumferential direction. Furthermore, each of the ultrasonic transducers 20 are tilted at a tilt angle α such that all the measurement lines pass through the axis of the tube 11, for example. Such a configuration enables real-time measurement of the flow of the fluid 12 to be measured, thereby enabling real-time display of the flow thereof over time. In this case, the display monitor 39 displays the flow-speed distribution of the fluid 12 to be measured, along each measurement line ML within the fluid tube 11, the flow-speed distribution thereof on the cross-section of the tube, or measurement results of the flow.

Third Embodiment

Figure 4:
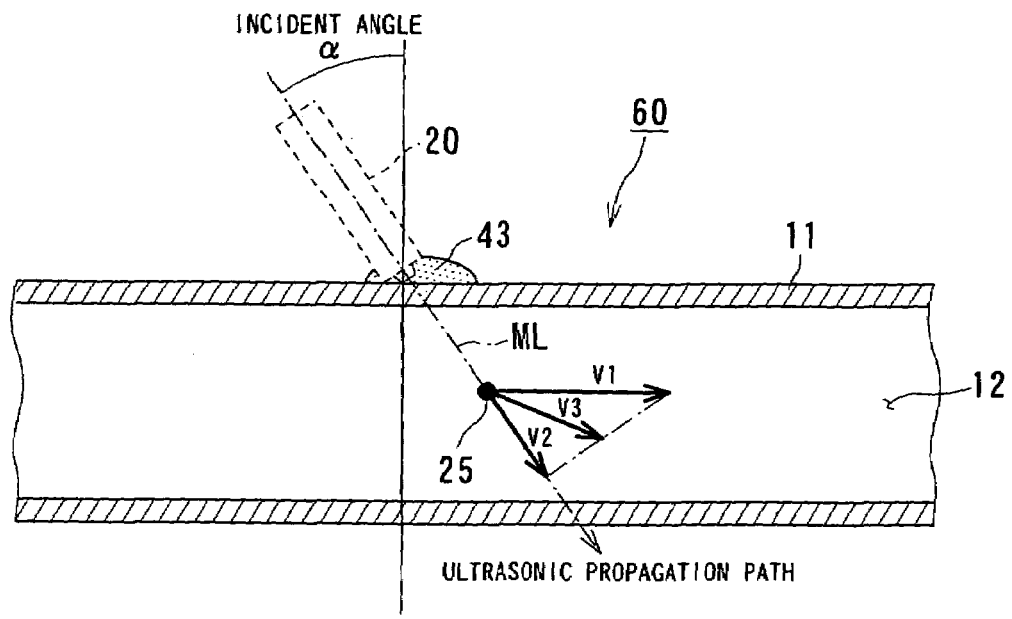
FIG. 4 is a schematic explanatory diagram for describing a mechanism for calculating the velocity component in the ultrasonic incident direction using the doppler frequency with a doppler ultrasonic flowmeter according to a third embodiment of the present invention.
Figure 5:
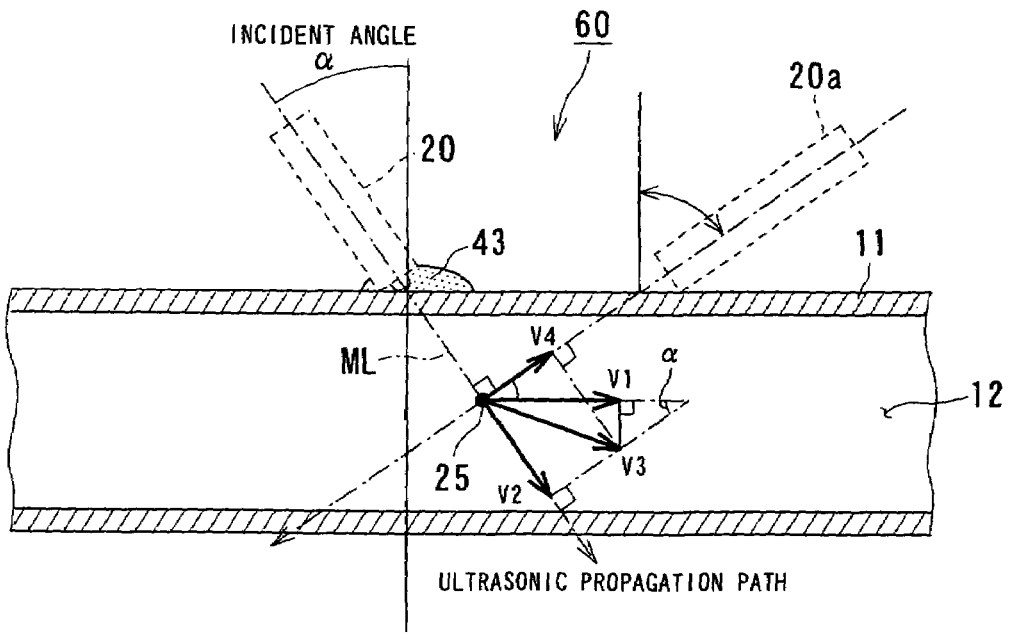
FIG. 5 is a diagram for describing a measurement mechanism of the doppler ultrasonic flowmeter according to the third embodiment of the present invention.
Figure 6:
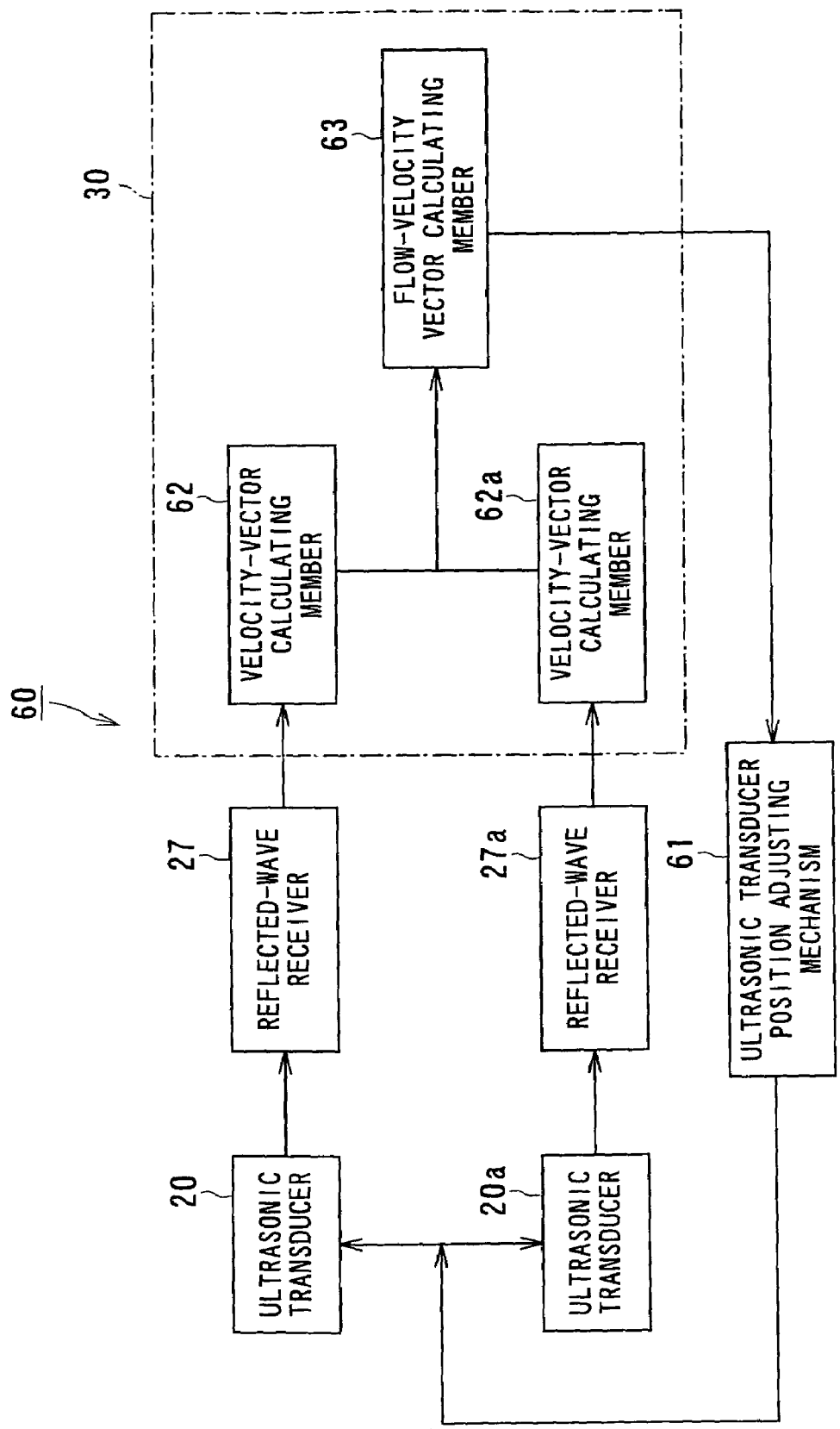
FIG. 6 is a block diagram for describing signal processing performed by the doppler ultrasonic flowmeter according to the third embodiment of the present invention.

FIG. 4 through FIG. 6 are a schematic diagrams which show a schematic configuration of a doppler ultrasonic flowmeter 60 according to a third embodiment of the present invention.

As shown in FIG. 4, the doppler ultrasonic flowmeter 60 calculates the velocity component $V_2$ of the fluid 12 to be measured, which flows within the flow tube 11, in the ultrasonic incident angle (ultrasonic emission angle) direction, using the doppler frequency. That is to say, the flow-speed distribution is calculated along the measurement line ML based upon the calculated doppler frequency with the line measurement method, thereby calculating the flow of the fluid 12 to be measured.

That is to say, with the doppler ultrasonic flowmeter 60, the velocity vector $V_2$ along the ultrasonic propagation path (measurement line ML) is calculated based upon the doppler frequency. Then, the calculated velocity vector $V_2$ is divided by (sin α), thereby calculating the velocity vector $V_1$ along the axis of the flow tube 11.

The doppler ultrasonic flowmeter 60 has the disadvantage that in a case wherein the fluid 12 to be measured does not flow in the direction parallel to the flow tube 11, i.e., in a case wherein a swirling flow or a non-parallel flow occurs within the fluid tube 11, the flow speed cannot be calculated with high precision. For example, let us consider a case wherein a bubble passes through the fluid tube 11 with the velocity vector $V_3$ as shown in FIG. 5. In this case, the velocity vector $V_2$ is obtained by projecting the velocity vector $V_3$ onto the ultrasonic propagation path. However, the vector obtained by projecting the velocity vector $V_1$ of the fluid 12 to be measured, onto the ultrasonic propagation path, does not match the velocity vector $V_2$. Accordingly, the bubble passing through at such a velocity lead to false calculation results of the flow speed of the fluid 12 to be measured, with positive deviation, along the axial direction of the fluid tube 11.

In order to solve the aforementioned problem of false calculation results of the flow speed, the doppler ultrasonic flowmeter 60 includes two ultrasonic transducers 20 and 20a mounted on the fluid tube 11. These two ultrasonic transducers 20 and 20a are mounted orthogonal one to another so as to measure the velocity vectors $V_2$ and $V_4$, respectively. Then, the vector sum of the velocity vectors $V_2$ and $V_4$ is calculated, thereby obtaining the correct flow speed of the fluid 12 to be measured or the flow speed of the bubble.

The doppler ultrasonic flowmeter 60 has a configuration wherein the position of the ultrasonic transducer 20a can be adjusted as to the other ultrasonic transducer 20 on the fluid tube 11 for measurement of the correct flow speed of the fluid 12 to be measured. Accordingly, the doppler ultrasonic flowmeter 60 includes an ultrasonic transducer position adjusting mechanism 61, and has a signal processing configuration shown in a signal processing block diagram in FIG. 6.

With the doppler ultrasonic flowmeter 60 shown in FIG. 6, the two ultrasonic transducers 20 and 20a are disposed such that the incident direction of the ultrasonic pulses cast from the ultrasonic transducers 20 and 20a are orthogonal one to another within the fluid tube 11. That is to say, the doppler ultrasonic flowmeter 60 has a configuration wherein the ultrasonic pulse beams cast from the ultrasonic transducers 20 and 20a are orthogonal one to another in the measurement region within the fluid tube 11.

The aforementioned doppler ultrasonic flowmeter 60 includes: reflected-wave receivers 27 and 27a for receiving the ultrasonic echo, i.e., the reflected waves from the measurement region within the fluid tube 11 due to the ultrasonic pulses cast from the ultrasonic transducers 20 and 20a; velocity-vector calculating member 62 and 62a for calculating the velocity vectors in the directions of the ultrasonic measurement lines based upon the magnitude of the ultrasonic echoes received by the reflected-wave receivers 27 and 27a; and a flow-velocity vector calculating member 63 for calculating the flow-speed vector of the fluid to be measured by making the vector sum of the velocity vectors calculated by the velocity vector calculating member 62 and 62a. Thus, the doppler ultrasonic flowmeter 60 has a function for calculating the flow of the fluid 12 to be measured based upon the flow-speed distribution data sets along the measurement lines ML within the fluid tube 11 calculated by the flow-velocity vector calculating member 63.

The ultrasonic echoes, i.e., the reflected waves reflected from the measurement region within the fluid tube 11 due to the ultrasonic pulses cast from the ultrasonic transducers 20 and 20a, are received by the reflected-wave receivers 27 and 27a, respectively. Then, the velocity-vector calculating member 62 and 62a convert the magnitude signals of the ultrasonic echoes received by the reflected-wave receivers 27 and 27a into the velocity vectors in the directions of the measurement lines ML (directions of the ultrasonic propagation paths). Subsequently, the flow-velocity vector calculating member 63 calculates the vector sum of the velocity vectors in the directions of the ultrasonic propagation paths thus obtained, thereby calculating the correct velocity vector, i.e., the correct flow speed of the fluid 12 to be measured.

The aforementioned velocity vector calculating member 62 and 62a, and the flow-velocity vector calculating member 63, form a flow-speed distribution data acquisition element 30A having the functions for measuring the flow-speed distribution data sets of the fluid 12 to be measured, which flows within the fluid tube 11, along the directions of the ultrasonic propagation paths (measurement lines) ML, and calculating the flow of the fluid 12 to be measured by integrating the flow-speed distribution data sets over the ultrasonic propagation paths.

Specifically, following calculation of the flow speed of a certain position by the flow-velocity vector calculating member 63 of the flow-speed distribution data acquisition element 30A, the ultrasonic transducer 20 or 20a is moved on the fluid tube 11 by actions of the ultrasonic transducer position adjusting mechanism 61, thereby allowing acquisition of data at the next position. That is to say, the doppler ultrasonic flowmeter 60 has a configuration for measuring the flow-speed distribution while moving the ultrasonic transducers 20 or 20a by actions of the ultrasonic transducer position adjusting mechanism 61, thereby enabling measurement of the flow-speed distribution of the fluid 12 to be measured over the ultrasonic propagation paths, and thereby calculating the correct flow thereof by calculation.

Fourth Embodiment

The present embodiment described below has generally the same configuration as that of the doppler ultrasonic flowmeter 10 shown in FIG. 1, wherein the computer 14 executes the functions serving as a doppler ultrasonic flowmeter according to the flow measurement PG 41, i.e., a software program, stored in the storage member 37, in cooperation with the Udflow unit 13 which is a hardware component, except for the configuration of the flow-measurement PG 41, leading to difference in the processing procedure or the functions provided for the user.

Accordingly, description will be made hereafter with reference to configuration block diagrams alone. Furthermore, description will be made in brief regarding the configuration of the doppler ultrasonic flowmeter. Note that with each embodiment, a different program, e.g., a flow-measurement PG 41A, is employed, instead of the flow-measurement PG 41 shown in FIG. 2. Accordingly, description will be made hereafter regarding each embodiment with reference to FIG. 2, replacing the flow-measurement PG 41 with the flow-measurement PG 41A or the like.

Figure 7:
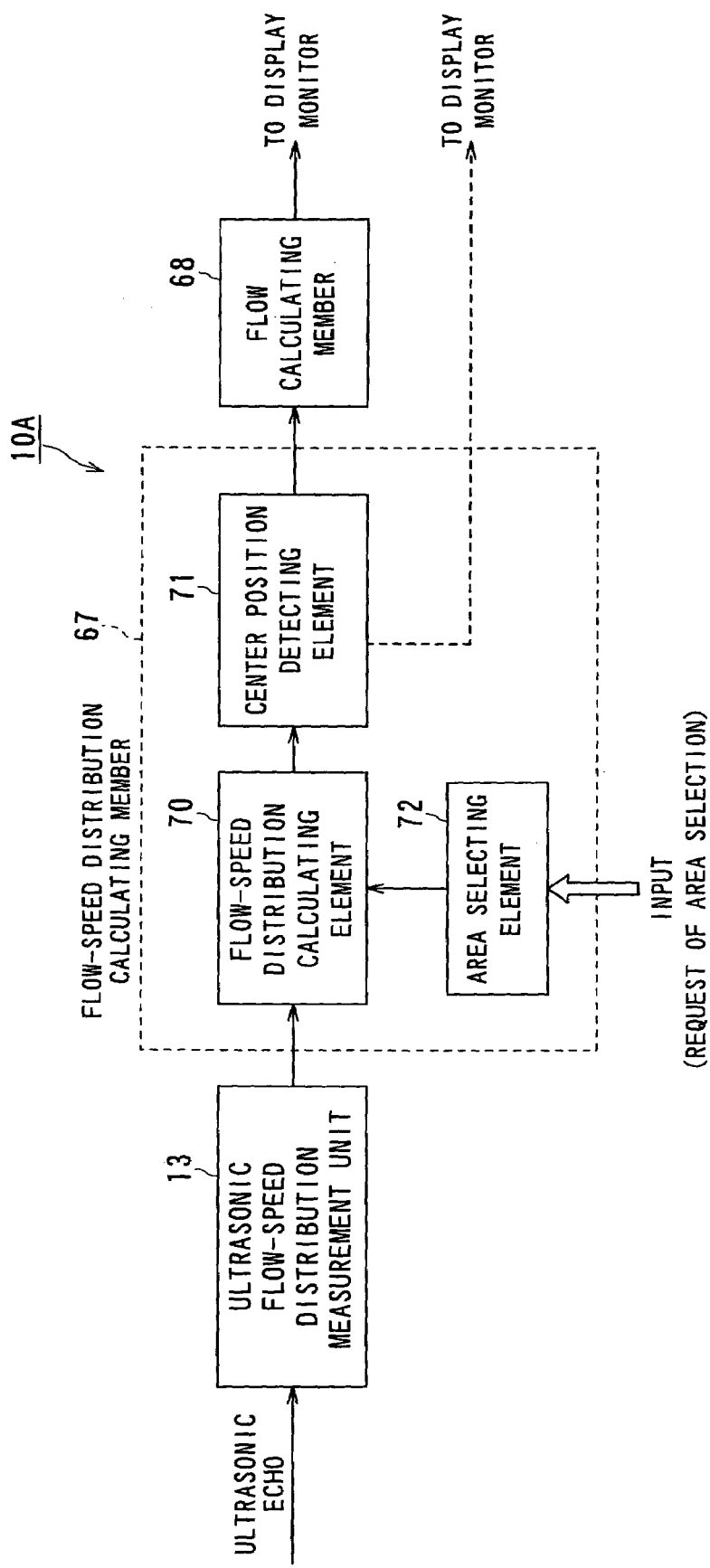
FIG. 7 is a functional block diagram of a doppler ultrasonic flowmeter according to a fourth embodiment of the present invention.

FIG. 7 is a functional block diagram of a doppler ultrasonic flowmeter 10A according to a fourth embodiment of the present invention.

The doppler ultrasonic flowmeter 10A shown in FIG. 7 has generally the same configuration as that of the doppler ultrasonic flowmeter 10 shown in FIG. 1, wherein the computer 14 executes the functions serving as a doppler ultrasonic flowmeter according to the flow measurement PG 41A, i.e., a software program, stored in the storage member 37, in cooperation with the Udflow unit 13 which is a hardware component.

As shown in FIG. 7, the doppler ultrasonic flowmeter 10A includes the Udflow unit 13 serving as the flow-speed data acquisition member 18 for calculating the speed of the great number of reflectors 25 contained in the fluid 12 to be measured in a reflector-group-speed calculating step, a flow-speed distribution calculating member 67 for measuring the flow-speed distribution of the fluid 12 to be measured by performing computation processing for the speed data of the reflectors 25 received from the Udflow unit 13 in a flow-speed distribution measurement processing step, and a flow calculating member 68 for measuring the flow of the fluid 12 to be measured by further performing computation processing for the speed distribution thereof.

With the doppler ultrasonic flowmeter 10A, the Udflow unit 13 serving as the flow-speed data acquisition member 18 and the flow-speed distribution calculating member 67 form a flow-speed distribution measurement unit. On the other hand, the flow calculating member 68 makes measurement of the flow thereof based upon the flow-speed distribution measurement results obtained by the flow-speed distribution measurement unit. That is to say, the Udflow unit 13, the flow-speed distribution calculating member 67, and the flow calculating member 68, form a flow measurement unit. Note that the measurement results output from at least one of the flow distribution calculating member 67 and the flow calculating member 68 are displayed on display such as the display monitor 39 of the computer 14, or the like.

The flow-speed distribution calculating member 67 of the doppler ultrasonic flowmeter 10A comprises a flow-speed distribution calculating element 70 for performing computation processing for the input speed data of the reflectors 25 so as to calculate the flow-speed distribution of the fluid 12 to be measured within the fluid tube 11, a center-position detecting element 71 for detecting the center of the fluid tube 11 in the radius direction, i.e., the center position of the fluid tube 11, and an area selecting element 72 for selecting one of two areas (each of which will be referred to as "division area" hereafter) into which the area of the fluid tube 11 is divided at the center position; the flow-speed distribution being calculated using the reflectors 25 within the selected division area.

On the other hand, the flow calculating member 68 measures the flow of the fluid 12 to be measured by performing computation processing for the input flow-speed distribution. Specifically, the flow of the fluid 12 to be measured is calculated by integrating the input flow-speed distribution over the radius direction (r direction) of the fluid tube 11. The calculated value of the flow thereof is output from the flow calculating member 68, and is displayed on display having a function for displaying the computation results.

Now, description will be made step by step regarding the ultrasonic flow measurement procedure for measurement of the flow of the fluid 12 to be measured performed by the doppler ultrasonic flowmeter 10A.

Figure 8:
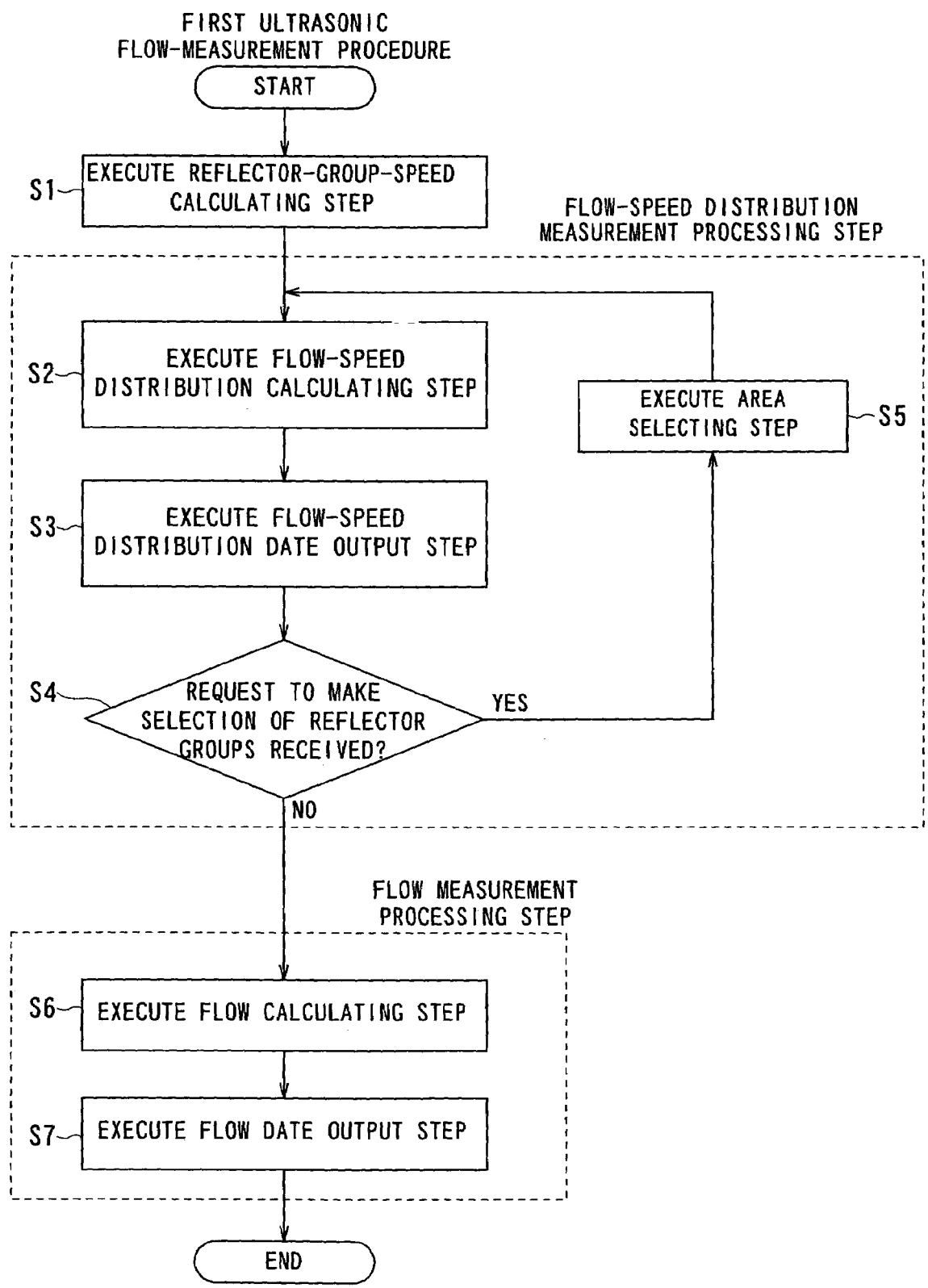
FIG. 8 is an explanatory diagram for making description step by step regarding the processing procedure of ultrasonic flow measurement with the doppler ultrasonic flowmeter according to the fourth embodiment of the present invention.

FIG. 8 is an explanatory diagram for making description step by step regarding the ultrasonic flow measurement procedure (which is denoted by "first ultrasonic flow measurement procedure" in FIG. 8) for the ultrasonic flow measurement method performed by the doppler ultrasonic flowmeter 10A.

As shown in FIG. 8, the ultrasonic flow measurement method comprises: a reflector-group-speed calculating step (Step S1) for calculating the speed of the number of reflectors 25 contained in the fluid 12 to be measured, and outputting the calculated flow-speed distribution of the reflectors 25 as the flow-speed distribution data from the Udflow unit 13; a flow-speed distribution measurement processing step (Step S2 to Step S5) for performing computation processing for the input flow-speed distribution data of the reflectors 25 so as to calculate the flow-speed distribution of the fluid 12 to be measured; and a flow measurement processing step (Step S6 to Step S7) for further performing computation processing for the flow-speed distribution of the fluid 12 to be measured so as to calculate the flow thereof.

With the present ultrasonic flow measurement procedure, first, in Step S1, the Udflow unit 13 casts the ultrasonic pulses onto the fluid 12 to be measured, and receives the ultrasonic echoes reflected by the fluid 12 to be measured so as to calculate the flow-speed distribution of the reflectors 25 contained in the fluid 12 to be measured, whereby the flow-speed distribution data of the reflectors 25 is output. Then, the flow-speed distribution calculating member 67 receives the flow-speed distribution data of the reflectors 25 thus output, and performs the flow-speed distribution measurement processing step (Step S2 through Step S5).

The flow-speed distribution measurement processing step (Step S2 through Step S5) comprises: a flow-speed distribution calculating step (Step S2) for calculating the flow-speed distribution data of the fluid 12 to be measured, and the center position data of the fluid tube 11, based upon the flow-speed distribution data of the reflectors 25; a flow-speed distribution data output step (Step S3) for outputting the flow-speed distribution data and the center position data thus calculated to display for displaying such information; and an area selecting step (Step S5) for selecting one of the two division areas into which the area of the fluid tube 11 has been divided at the center position, according to the selection of the user; the flow-speed distribution being calculated using the reflectors 25 within the selected area, in the event of receiving a request to make selection of the reflectors 25 for calculating the flow-speed distribution (i.e., in a case of "YES" in Step S4).

In the flow-speed distribution measurement processing step, first, in the flow-speed distribution calculating step, i.e., Step S2, the flow-speed distribution and the center position of the fluid tube 11 are calculated. Note that with the flow-speed distribution calculating member 67 shown in FIG. 7, a flow-speed distribution calculating element 70 calculates the flow-speed distribution, and a center position detecting element 71 detects the center position.

The flow-speed distribution calculating element 70 calculates the speed of the reflector 25 for each position thereof contained in the fluid 12 to be measured based upon the position and speed of each reflector 25, whereby flow speed is obtained for each position. On the other hand, the center position detecting element 71 detects the positions where multiple reflection of the ultrasonic echoes occurs, based upon the received ultrasonic echo signals, and determines the middle point between the detected positions to be the center position, based upon the fact that multiple reflection of the ultrasonic echoes occurs on the wall face of the fluid tube 11. Upon completion of the calculation of the flow-speed distribution and the center position of the fluid tube 11 by the flow-speed distribution calculating element 70 and the center position detecting element 71, the flow-speed distribution calculating step, i.e., Step S2 ends.

Upon completion of the flow-speed distribution calculating step in Step S2, the flow proceeds to Step S3, i.e., the flow-speed distribution data output step, where the flow-speed distribution calculating element 70 and the center position detecting element 71 output the flow-speed distribution data and the center position data, respectively. Upon output of the flow-speed distribution data and the center position data, the flow-speed distribution data output step, i.e., Step S3 ends. Note that the computation processing member 35 of the computer 14 calculates both the data sets thus output, i.e., the flow-speed distribution and the center position, and display the calculation results on the display monitor 39.

Upon completion of the flow-speed distribution data output step, i.e., completion of step S3, the user can confirm the flow-speed distribution of the fluid 12 to be measured, which has been measured with the doppler ultrasonic flowmeter 10A, by means of the display monitor 39. In the event that the user has confirmed the flow-speed distribution of the fluid 12 to be measured, and has determined that there is no problem such as failure in measurement at any portion, or the like, (in the event of "NO" in Step S4), the flow-speed distribution measurement processing step ends.

On the other hand, in the event that the user has determined that there is a problem such as a problem that the flow speed is different between the two division areas into which the cross-sectional area of the fluid tube is divided at the center position, but the flow speed of each division area is not measured, the user can make a request through the input member 38 of the computer 14 to select the area where the flow-speed distribution is to be calculated using the reflectors 25 contained in the selected area.

The cross-sectional area of the fluid tube is divided at the center position into two areas, i.e., the division area close to the ultrasonic transducer 20 (which will be referred to as "close-side area" hereafter) and the division area away from the ultrasonic transducer 20, i.e., the far-side division area (which will be referred to as "far-side area" hereafter), for measurement of the flow speed. The user can select the area where the flow-speed distribution is to be calculated using the reflectors 25 contained in the selected area, from the three areas, i.e., the close-side area, the far-side area, and the entire area (both the close area and the far-side area).

Figure 9:
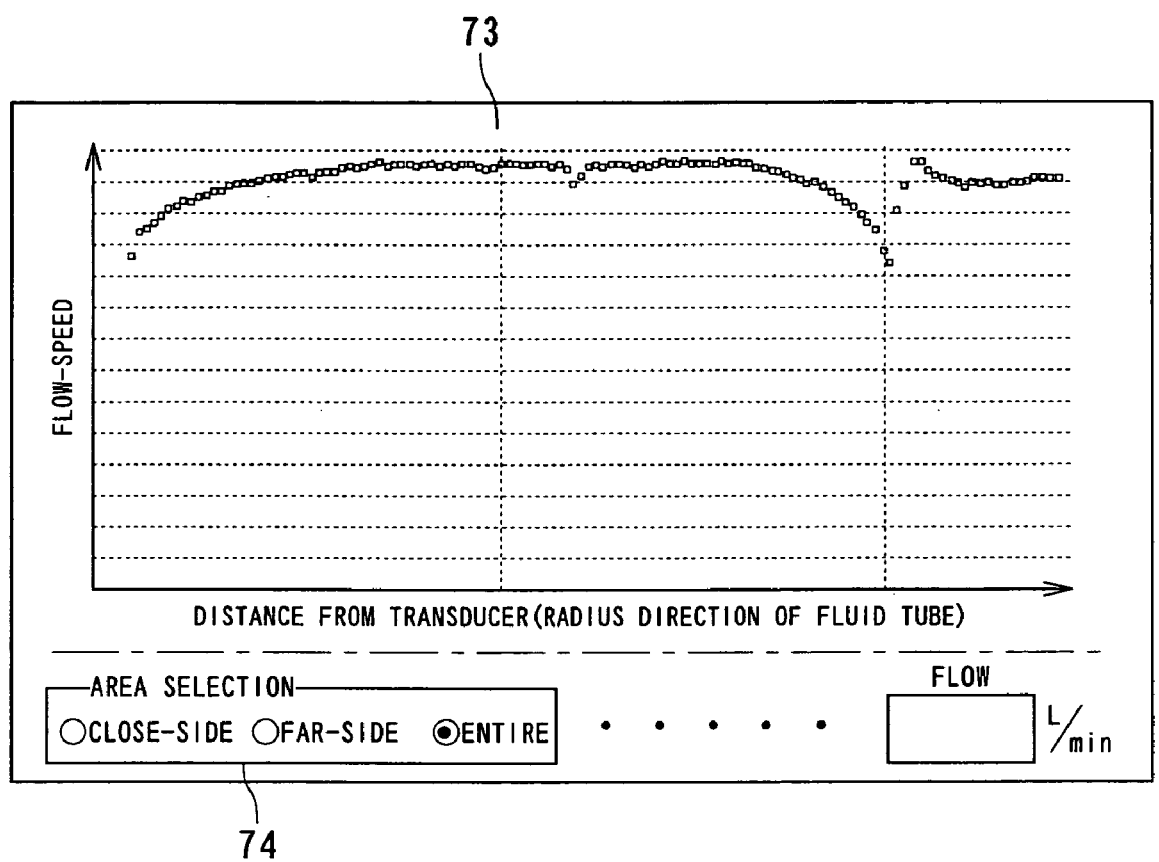
FIG. 9 is a schematic diagram which shows an example of the flow-speed distribution displayed on a display monitor, which allows the user to select a division area where the flow-speed distribution is calculated using the reflector groups.

FIG. 9 is a schematic diagram which shows an example of the flow-speed distribution displayed in the display monitor 39 with a function of the division area selection for selecting the area where the flow-speed distribution is to be calculated using the reflectors 25.

As shown in FIG. 9, the user selects one of the choices through a graphical user interface (GUI), for example, whereby a desired division area where the flow-speed distribution is to be calculated using the reflectors 25 is selected. In the example shown in FIG. 9, the left region in the drawing corresponds to the close-side area, and the right region in the drawing corresponds to the far-side area, with a center line 73 in the drawing as the center position.

With the area selection GUI 74 displayed on the display monitor 39 shown in FIG. 9, the user selects one of "close-side" corresponding to the close-side area, "far-side" corresponding to the far-side area, and "entire" corresponding to the entire area, whereby a desired division area where the flow-speed distribution is to be calculated using the reflectors 25 is selected. In the example shown in FIG. 9, the entire area is selected.

Upon the user making a request for selection of the area through the input member 38 of the computer 14 (in the event of "YES" in Step S4), the flow proceeds to Step S5, i.e., the area selecting step, where the area selecting element 72 selects a division area where the flow-speed distribution is to be calculated using the reflectors 25 according to the request from the user. Upon completion of the area selecting step, the flow proceeds to Step S2, following which the processing steps following the Step S2 are repeated.

In the event that the user has made a request for selecting the area, the flow-speed distribution is calculated for the selected area, i.e., the close-side area or the far-side area, in Step S2, i.e., the flow-speed distribution calculating step. Note that the flow-speed distribution is calculated on the assumption that the flow-speed distribution within the fluid tube 11 is generally symmetrical with regard to the center position (tube axis). Upon calculation of the flow-speed distribution, the flow proceeds to Step S3, i.e., the flow-speed distribution data output step, where the calculated flow-speed distribution is displayed on the monitor 39.

Upon completion of the flow-speed distribution measurement processing step (Step S2 through Step S5), the flow proceeds to Step S6, following which the flow calculating member 68 executes the flow measurement processing step (Step S6 and Step S7). Note that the flow measurement processing step comprises a flow calculating step (Step S6) and a flow data output step (Step S7).

In the flow measurement processing step, first, the flow proceeds to Step S6, i.e., the flow calculating step. In the flow calculating step, the flow calculating member 68 receives the flow-speed distribution data calculated in the flow-speed distribution measurement processing step, and integrate the received flow-speed distribution data over the radius direction (r direction) of the fluid tube 11, thereby calculating the flow of the fluid 12 to be measured. Upon calculation of the flow of the fluid 12 to be measured, Step S6 ends, following which the flow proceeds to Step S7, i.e., the flow data output step.

In the flow data output step, the flow calculation data calculated in the flow calculating step is output as the flow measurement results. Upon output of the flow calculation data from the flow calculating member 68, Step S7 ends, i.e., the flow measurement processing step ends. Note that the flow measurement results output in Step S7 are subjected to computation processing by the computation processing member 35 of the computer 14, and are displayed on the display monitor 39 as shown in FIG. 9, for example.

Thus, the doppler ultrasonic flowmeter 10A according to the present embodiment, the flow measurement method using the doppler ultrasonic flowmeter 10A, and the flow measurement program employed for the doppler ultrasonic flowmeter 10A, have a function for selecting an area where correct measurement has been made, according to a request from the user, and calculating the flow-speed distribution for the area thus selected, thereby enabling more correct measurement of the flow-speed distribution regardless of irregularities in the measurement results of the flow-speed distribution. Furthermore, with the present embodiment, the flow thereof is computed based upon the correct measurement results of the flow-speed distribution, thereby enabling correct measurement of the flow thereof, as well.

Note that while description has been made regarding an arrangement wherein the present embodiment is applied to the doppler ultrasonic flowmeter 10 shown in FIG. 1, having a configuration wherein the computer 14 reads out and executes the flow measurement PG 41A stored in the storage member 37, whereby a combination of the Udflow unit 13, i.e., a hardware component unit, and the flow measurement PG 41A, i.e., a software component, has the functions serving as the doppler ultrasonic flowmeter 10A, the present embodiment may be applied to the doppler ultrasonic flowmeter 50 or the doppler ultrasonic flowmeter 60.

On the other hand, the present invention is not restricted to an arrangement wherein the measurement results of the flow are displayed along with the flow-speed distribution as shown in FIG. 9, rather the doppler ultrasonic flowmeter 10A may has a configuration wherein the flow is displayed separately from the flow-speed distribution.

Fifth Embodiment

Figure 10:
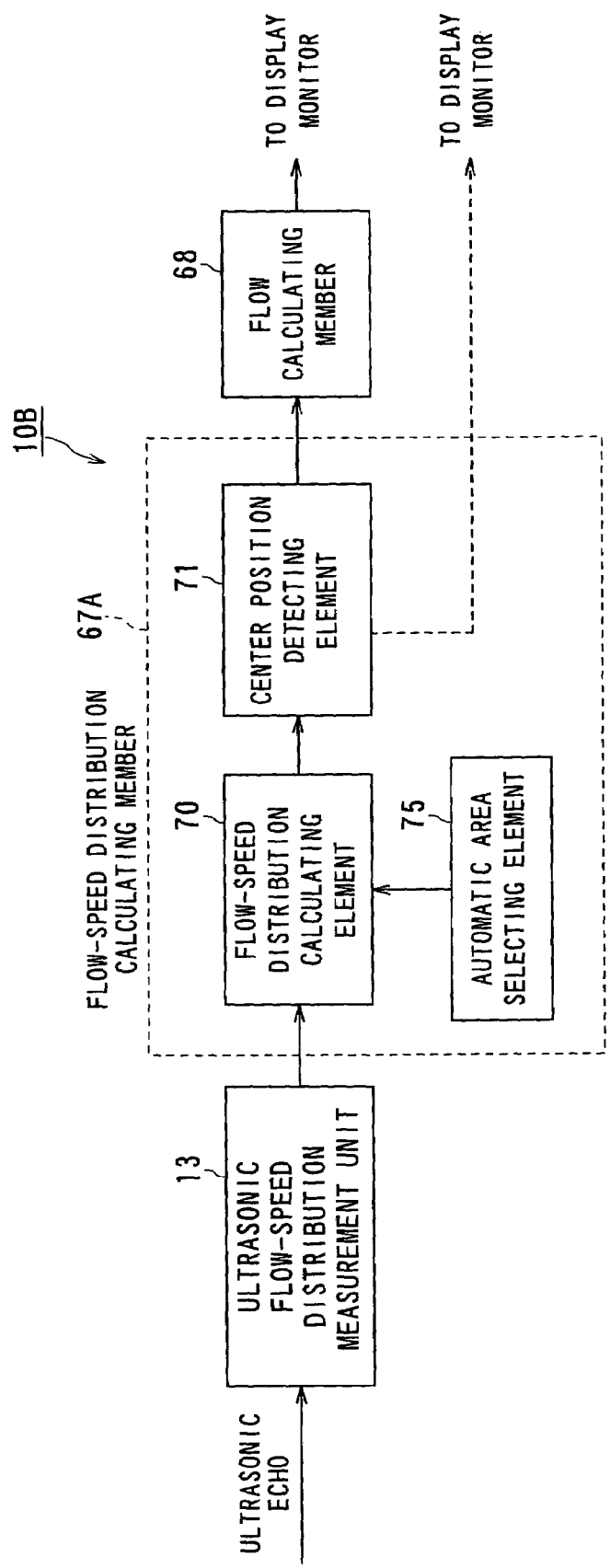
FIG. 10 is a functional block diagram of a doppler ultrasonic flowmeter according to a fifth embodiment of the present invention.

FIG. 10 is a functional block diagram of a doppler ultrasonic flowmeter 10B according to a fifth embodiment of the present invention.

The doppler ultrasonic flowmeter 10B shown in FIG. 10 has generally the same configuration as that of the doppler ultrasonic flowmeter 10 shown in FIG. 1, wherein the computer 14 reads out and executes a flow measurement PG 41B stored in the storage member 37, whereby a combination of the Udflow unit 13, i.e., a hardware component unit, and a flow measurement PG 41B, i.e., a software component, has the functions serving as the doppler ultrasonic flowmeter.

As shown in FIG. 10, the doppler ultrasonic flowmeter 10B has the same configuration as that of the doppler ultrasonic flowmeter 10A, except for a configuration including a flow-speed distribution calculating member 67A, instead of the flow-speed distribution calculating member 67, and accordingly, the same components are denoted by the same reference numerals, and description thereof will be omitted. Note that the doppler ultrasonic flowmeter 10 according to the present embodiment has the same configuration wherein the Udflow unit 13 serving as the flow-speed data acquisition-member 18 and the flow-speed distribution calculating member 67A form the flow-speed distribution measurement unit, and the Udflow unit 13, the flow-speed distribution calculating member 67A, and the flow calculating member 68, form the flow measurement unit.

The flow-speed distribution calculating member 67A includes the flow-speed distribution calculating element 70 and the center position detecting element 71, and further include an automatic area selecting element 75 for making automatic selection of the division area where the flow-speed distribution is to be calculated using the reflectors 25, instead of the area selecting element 72.

Figure 11:
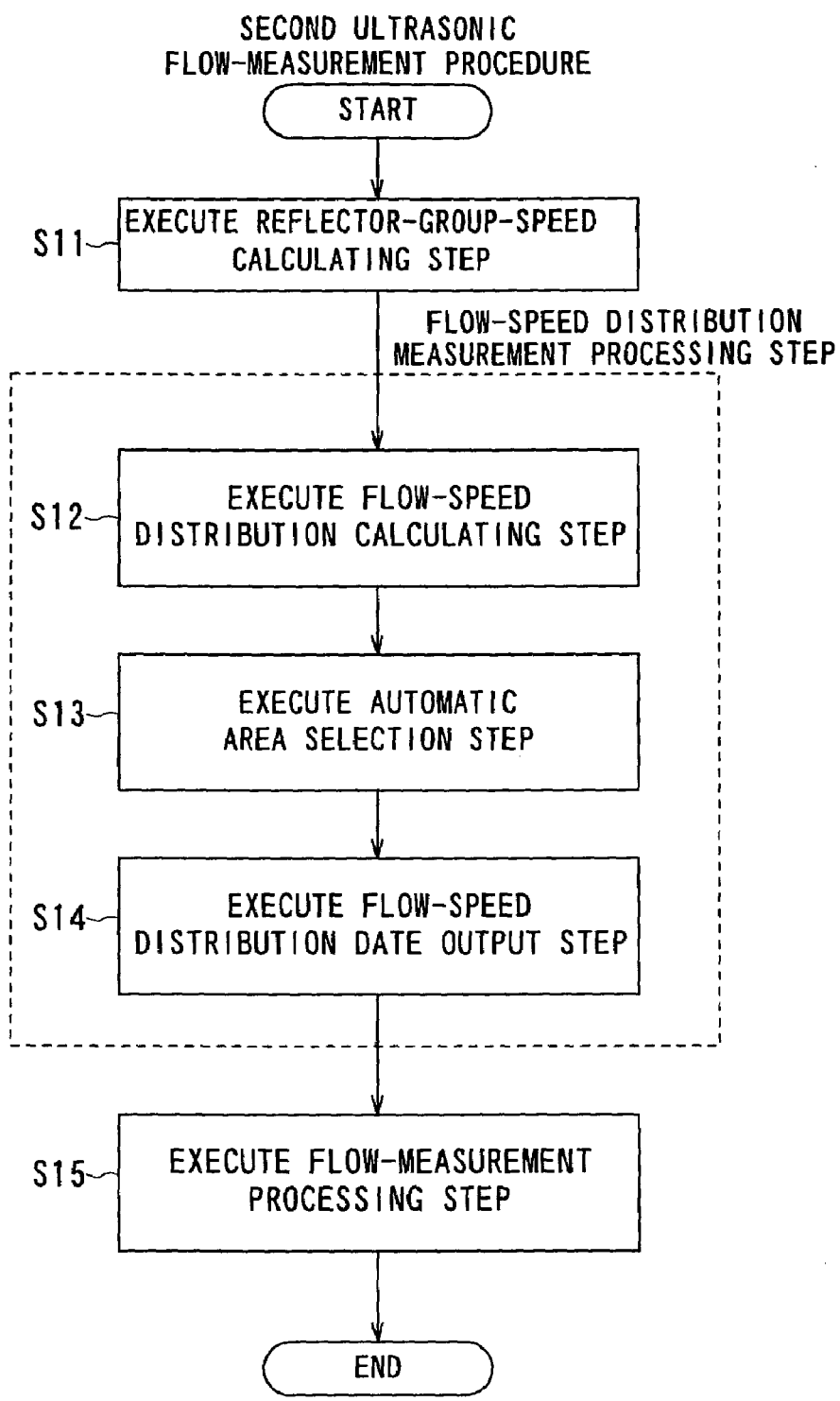
FIG. 11 is an explanatory diagram for making description step by step regarding the processing procedure of ultrasonic flow measurement with the doppler ultrasonic flowmeter according to the fifth embodiment of the present invention.

FIG. 11 is an explanatory diagram for describing the processing procedure, i.e., the ultrasonic flow measurement procedure (which will be denoted by "second ultrasonic flow measurement procedure" in FIG. 11), step by step, employed for the doppler ultrasonic flowmeter 10B.

As shown in FIG. 11, the ultrasonic flow measurement procedure employed for the doppler ultrasonic flowmeter 10B has generally the same configuration as that of the ultrasonic flow measurement procedure employed for the doppler ultrasonic flowmeter 10A shown in FIG. 8, except for the flow-speed distribution measurement processing step. That is to say, the difference therebetween is that the flow-speed distribution measurement processing step according to the present embodiment includes an automatic area selecting step for making automatic selection of the division area where the flow-speed distribution is to be calculated using the reflectors 25, between the flow-speed distribution calculating step (Step S2) and the flow-speed distribution data output step (Step S3).

As shown in FIG. 11, the ultrasonic flow measurement procedure employed for the doppler ultrasonic flowmeter 10B comprises a reflector-group-speed calculating step (Step S11), a flow-speed distribution measurement processing step (Step S12 through Step S14), and a flow measurement processing step (Step S15). First, the flow proceeds to the reflector-group-speed calculating step (Step S11), the flow proceeds to the flow-speed distribution measurement processing step (Step S12 through Step S14), and the flow proceeds to the flow measurement processing step (Step S15).

That is to say, in the ultrasonic flow measurement procedure employed for the doppler ultrasonic flowmeter 10B, first, the flow proceeds to the reflector-group-speed calculating step (Step S11) having the same functions as with the reflector-group-speed calculating step (step S1) shown in FIG. 8, following which the flow proceeds to the flow-speed distribution measurement processing step (Step S12 through Step S14).

Specifically, in the flow-speed distribution measurement processing step (Step S12 through Step S14), the flow proceeds to the flow-speed distribution calculating step (Step S12) having the same functions as with the flow-speed distribution calculating step (Step S2) shown in FIG. 8, following which the flow proceeds to Step S13, i.e., the automatic area selecting step, where the flow-speed distribution calculating member 67A makes automatic selection of the division area where the flow-speed distribution is to be calculated using the reflectors 25.

Upon automatic selection of the division area where the flow-speed distribution is to be calculated using the reflectors 25 in the automatic area selecting step, i.e., in Step S13, the flow proceeds to Step S14, i.e., the flow-speed distribution data output step, where the flow-speed distribution data and the center position data calculated in Step S12 and Step S13 are output for displaying the information on the display monitor 39 or the like, whereby the flow-speed distribution data output step, i.e., Step S14 ends.

Upon completion of the flow-speed distribution data output step, i.e., Step S14, the flow proceeds to the flow measurement processing step (Step S15), where the flow calculating member 68 performs calculation processing. Note that the flow measurement processing step (Step S15) shown in FIG. 11 has the same configuration as that of the flow measurement processing step (Step S6 and Step S7) shown in FIG. 8, and accordingly, the configuration is shown in brief in the drawing.

Thus, the doppler ultrasonic flowmeter 10B according to the present embodiment, the flow measurement method using the doppler ultrasonic flowmeter 10B, and the flow measurement program employed for the doppler ultrasonic flowmeter 10B, have a function for making automatic selection of an area where correct measurement has been made, and calculating the flow-speed distribution for the area thus selected, thereby enabling more correct measurement of the flow-speed distribution regardless of irregularities of the measurement results of the flow-speed distribution. Furthermore, with the present embodiment, the flow thereof is computed based upon the correct measurement results of the flow-speed distribution thus obtained, thereby enabling more correct flow measurement.

While description has been made regarding the doppler ultrasonic flowmeter 10B having a configuration wherein the flow-speed distribution calculating member 67A includes the automatic area selecting element 75 instead of the area selecting element 72, an arrangement may be made wherein the flow-speed distribution calculating member 67A includes both the automatic area selecting element 75 and the area selecting element 72. The doppler ultrasonic flowmeter having such a configuration allows the user to select a desired selection mode from the two kinds of the selection modes, i.e., the manual selection according to the selection of the user, and the automatic selection. In this case, an arrangement may be made wherein a menu is prepared for the user, wherein in the event that the area has not been selected according to the selection of the user, the system makes automatic selection of the area for obtaining more correct flow-speed distribution.

Note that while description has been made regarding an arrangement wherein the present embodiment is applied to the doppler ultrasonic flowmeter 10 shown in FIG. 1, having a configuration wherein the computer 14 reads out and executes the flow measurement PG 41B stored in the storage member 37, whereby a combination of the Udflow unit 13, i.e., a hardware component unit, and the flow measurement PG 41B, i.e., a software component, has the functions serving as the doppler ultrasonic flowmeter 10B, the present embodiment may be applied to the doppler ultrasonic flowmeter 50 or the doppler ultrasonic flowmeter 60.

Sixth Embodiment

Figure 12:
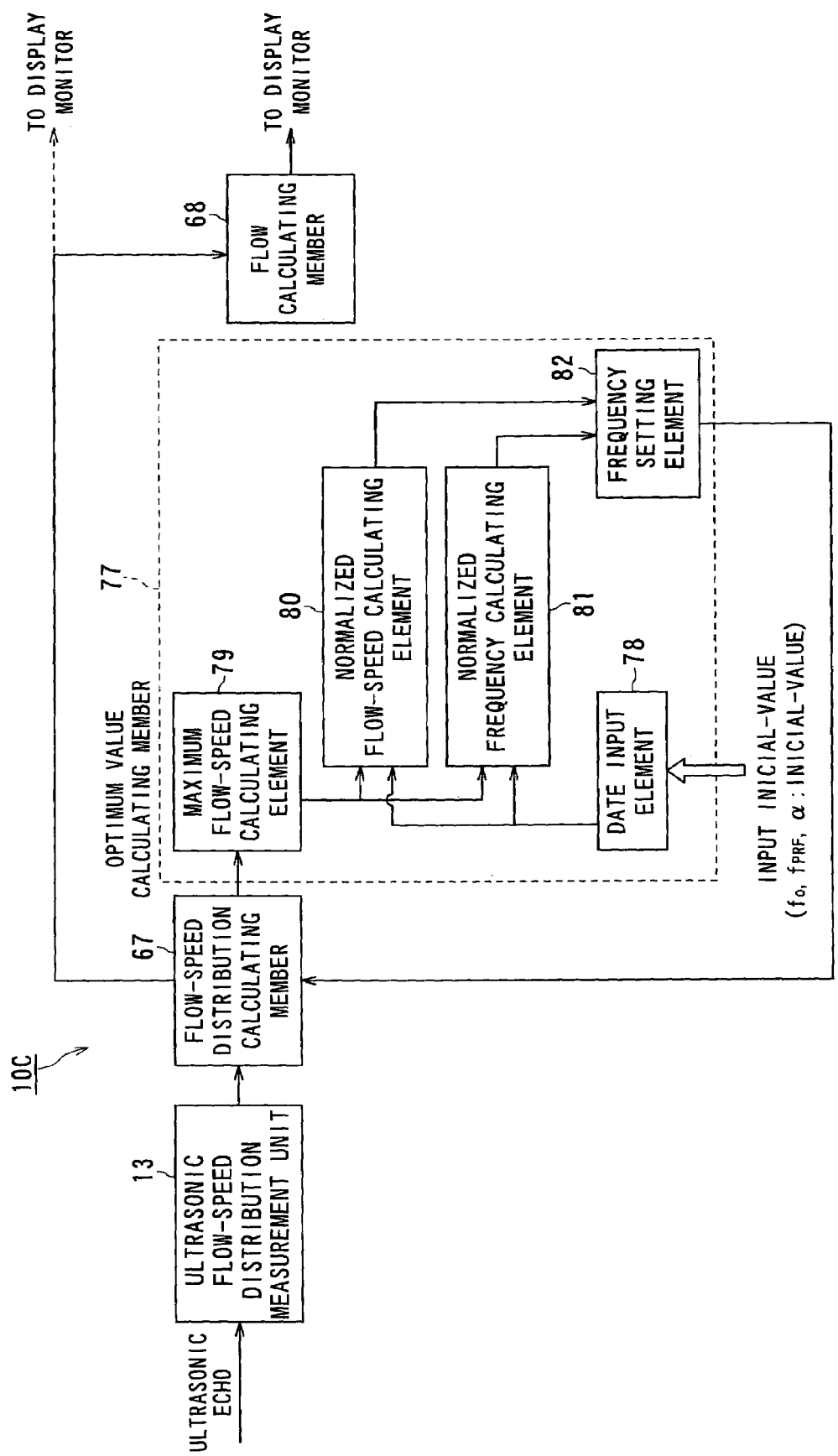
FIG. 12 is a functional block diagram of a doppler ultrasonic flowmeter according to a sixth embodiment of the present invention.

FIG. 12 is a functional block diagram of a doppler ultrasonic flowmeter 10C according to a sixth embodiment of the present invention.

The doppler ultrasonic flowmeter 10C shown in FIG. 12 has generally the same configuration as that of the doppler ultrasonic flowmeter 10 shown in FIG. 1, wherein the computer 14 reads out and executes a flow measurement PG 41C stored in the storage member 37, whereby a combination of the Udflow unit 13, i.e., a hardware component unit, and a flow measurement PG 41C, i.e., a software component, has the functions serving as the doppler ultrasonic flowmeter.

As shown in FIG. 12, the doppler ultrasonic flowmeter 10C includes the Udflow unit 13, the flow-speed distribution calculating member 67, the flow calculating member 68, and an optimum value calculating member 77 for making automatic calculation of the optimum value which is used for adjustment of measurement, which depends upon the properties of the object to be measured. Note that the doppler ultrasonic flowmeter 10C has the same configuration wherein the Udflow unit 13 serving as flow-speed data acquisition member 18 and the flow-speed distribution calculating member 67 form the flow-speed distribution measurement unit, and the Udflow unit 13, the flow-speed distribution calculating member 67, and the flow calculating member 68, form the flow measurement unit.

The optimum value calculating member 77 includes: a data input element 78 for receiving the information regarding the inner diameter Di of the fluid tube 11, the ultrasonic wave speed Cw in the fluid 12 to be measured, and the incident angle α of the ultrasonic pulses; a maximum flow-speed calculating element 79 for calculating the maximum flow speed V obtained based upon the flow-speed distribution measured by the flow-speed distribution calculating member 67; a normalized flow-speed calculating element 80 for calculating the normalized flow-speed $V_0$ which is obtained by dividing the calculated maximum flow-speed V by the ultrasonic wave speed Cw in the fluid 12 to be measured; a normalized frequency calculating element 81 for calculating a normalized frequency $F_0$ which is obtained by dividing the pulse repetition frequency $f_{PRF}$ by the emission frequency $f_0$; and a frequency setting element 82 for resetting the emission frequency to an emission frequency $f_1$ which satisfies the following Expression.

[Expression 1]

$$F_0 \geq 4V_0 \cdot \sin \alpha, \text{ and } f_{PRF} \leq Cw/2Di$$

The doppler ultrasonic flowmeter 10C has a configuration wherein the data input element 78 of the optimum value calculating member 77 receives the information regarding the inner diameter Di of the fluid tube 11, the ultrasonic wave speed Cw in the fluid 12 to be measured, and the incident angle α of the ultrasonic pulses, each of which are initial values, and the maximum-flow-speed calculating element 79 calculates the maximum flow speed V based upon the flow-speed distribution measured by the flow-speed distribution calculating member 67.

The normalized flow-speed calculating element 80 divides the maximum flow speed V calculated by the maximum-flow-speed calculating element 79, by the ultrasonic wave speed Cw in the fluid 12 to be measured, regarding which the information has been received by the data input element 78, thereby calculating the normalized flow speed $V_0$. On the other hand, the normalized frequency calculating element 81 calculates the normalized frequency $F_0$ by dividing the pulse repetition frequency $f_{PRF}$ by the emission frequency $f_0$.

The frequency setting element 82 resets the emission frequency to the emission frequency $f_1$ so as to satisfy the relation represented by the following Expression 1 including the normalized speed $V_0$ calculated by the normalized speed calculating element 80 and the normalized frequency $F_0$ calculated by the normalized frequency calculating element 81.

$$F_0 \geq 4V_0 \cdot \sin \alpha, \text{ and } f_{PRF} \leq Cw/2Di$$

Note that the Expression 1 represents a range of the optimum values. Note that the relation represented by the Expression 1 has been proposed based upon the experimental results obtained by the present inventor.

Figure 13:
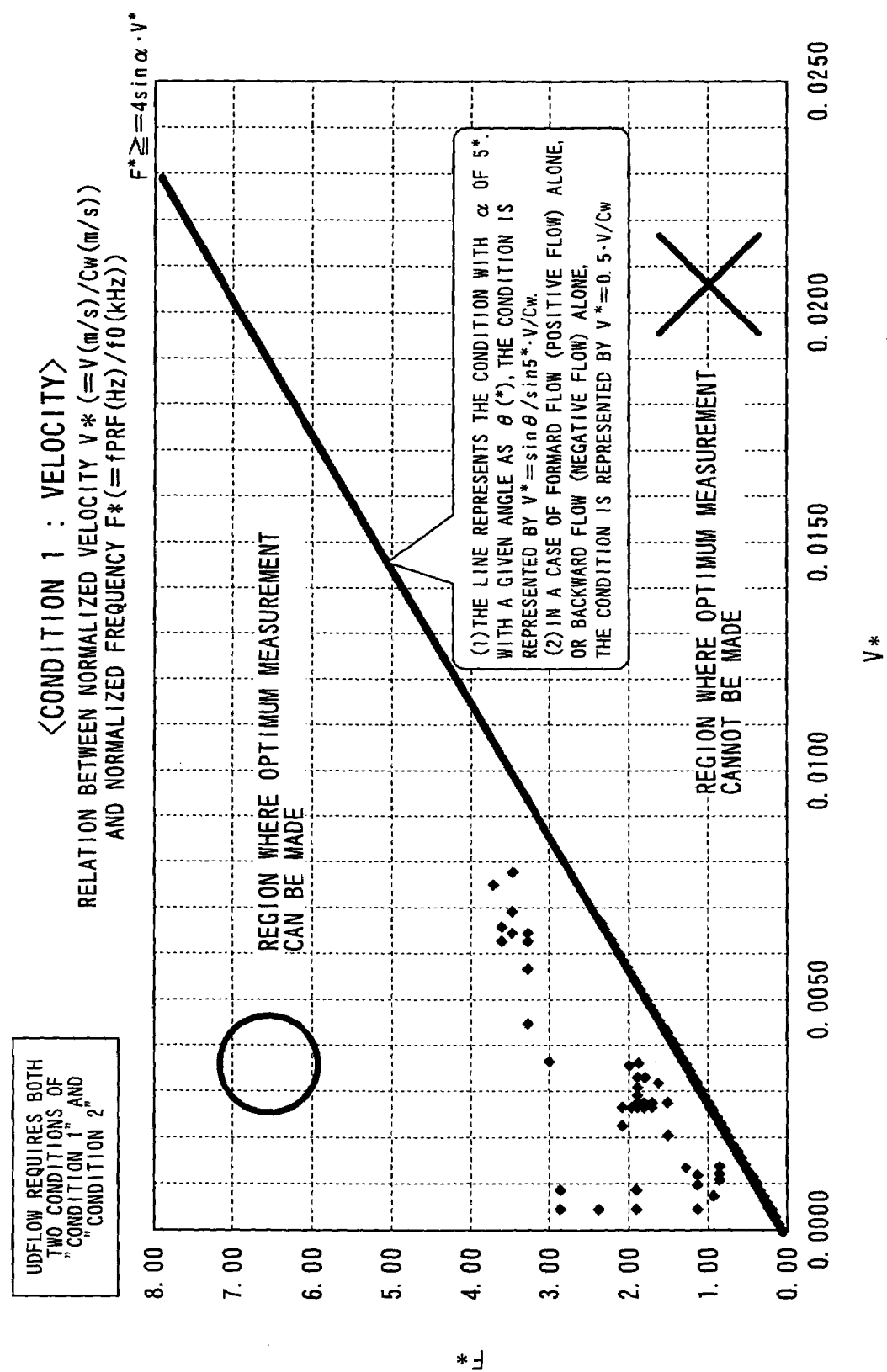
FIG. 13 is an explanatory diagram for describing the conditions which determine whether or not optimum measurement can be made with the doppler ultrasonic flowmeter according to the sixth embodiment of the present invention, showing a region where optimum measurement can be made and a region where optimum measurement cannot be made, wherein the horizontal axis represents the normalized speed V*, and the vertical axis represents the normalized frequency F*.
Figure 14:
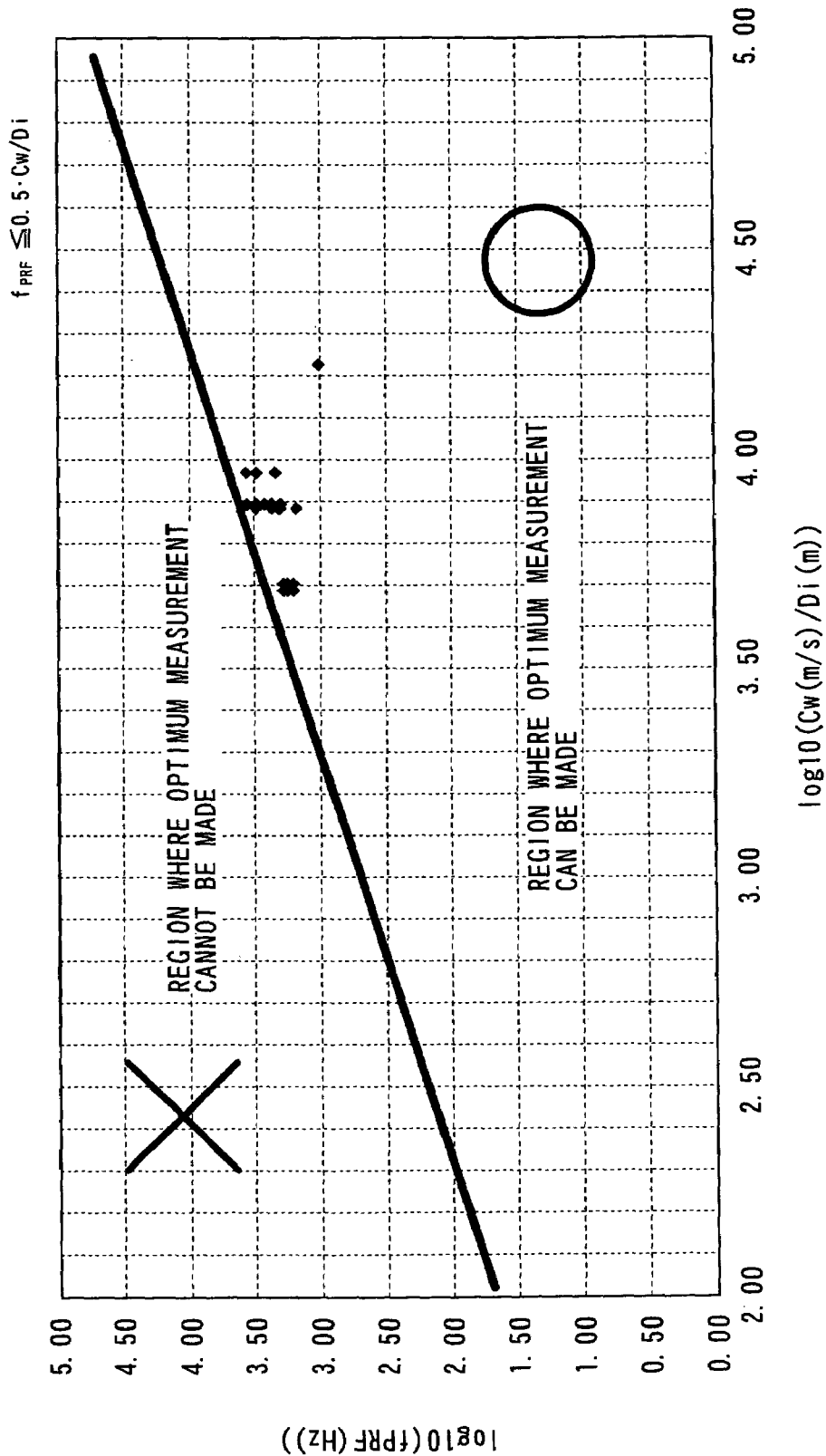
FIG. 14 is an explanatory diagram for describing the conditions which determine whether or not optimum measurement can be made with the doppler ultrasonic flowmeter according to the sixth embodiment of the present invention, showing a region where optimum measurement can be made and a region where optimum measurement cannot be made, wherein the horizontal axis represents the logarithm of Cw/Di, and the vertical axis represents the logarithm of the pulse repetition frequency ($f_{PRF}$).
Figure 15:
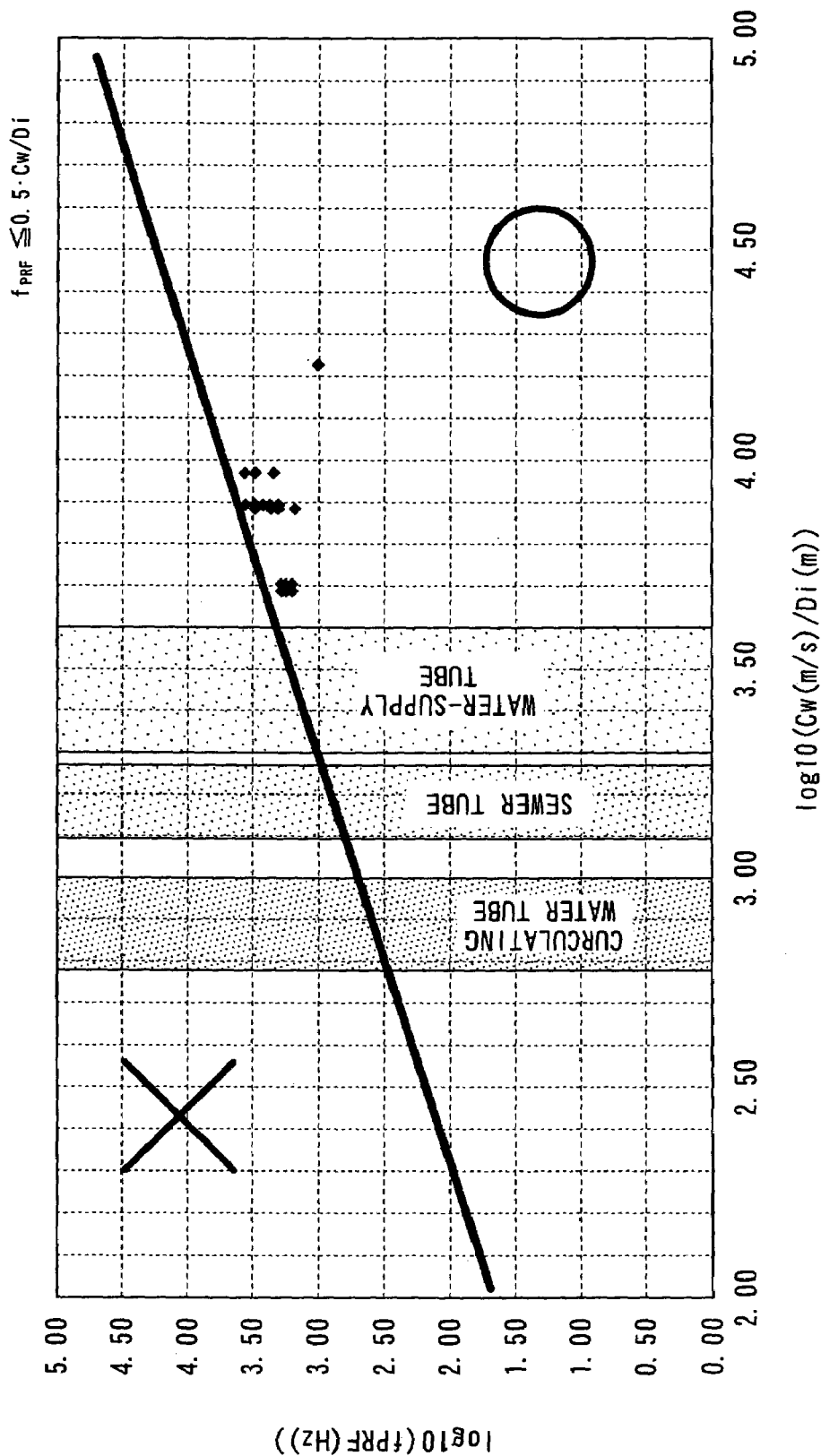
FIG. 15 is an explanatory diagram for describing the conditions which determine whether or not optimum measurement can be made with the doppler ultrasonic flowmeter according to the sixth embodiment of the present invention, showing a region where optimum measurement can be made and a region where optimum measurement cannot be made, as well as showing typical kinds of tubes.

FIG. 13 through FIG. 15 are explanatory diagrams which show ranges of the optimum values, which have been proposed based upon the experimental results obtained by the present inventor.

FIG. 13 is an explanatory diagram which shows the region where the optimum measurement can be made, and the region where the optimum measurement cannot be made, wherein the horizontal axis represents the normalized speed V*, and the vertical axis represents the normalized frequency F*. That is to say, it has been confirmed based upon the experimental results, that optimum measurement can be made in the region which satisfies the relation, $F^* \geq 4V_0 \cdot \sin \alpha$, i.e., in the upper-left region in the drawing.

FIG. 14 is an explanatory diagram which shows the region where the optimum measurement can be made, and the region where the optimum measurement cannot be made, wherein the horizontal axis represents the logarithm of (Cw/Di), and the vertical axis represents the logarithm of the pulse repetition frequency $f_{PRF}$. That is to say, it has been confirmed based upon the experimental results, that optimum measurement can be made in the region which satisfies the relation, $f_{PRF} \leq Cw/2Di$, i.e., in the lower-right region in the drawing.

FIG. 15 is an explanatory diagram which shows the region where the optimum measurement can be made, and the region where the optimum measurement cannot be made, with regard to typical tubes. An arrangement may be made wherein the relation as shown in FIG. 15 is provided for the user in the form which allows the user to obtain the relation on the network, or in the form of a printed table. In this case, the user can determine whether or not optimum measurement can be made under certain conditions, based upon the aforementioned information.

Now, description will be made step by step regarding the ultrasonic flow measurement procedure, i.e., measurement of the flow of the fluid 12 to be measured, which is performed by the doppler ultrasonic flowmeter 10C.

Figure 16:
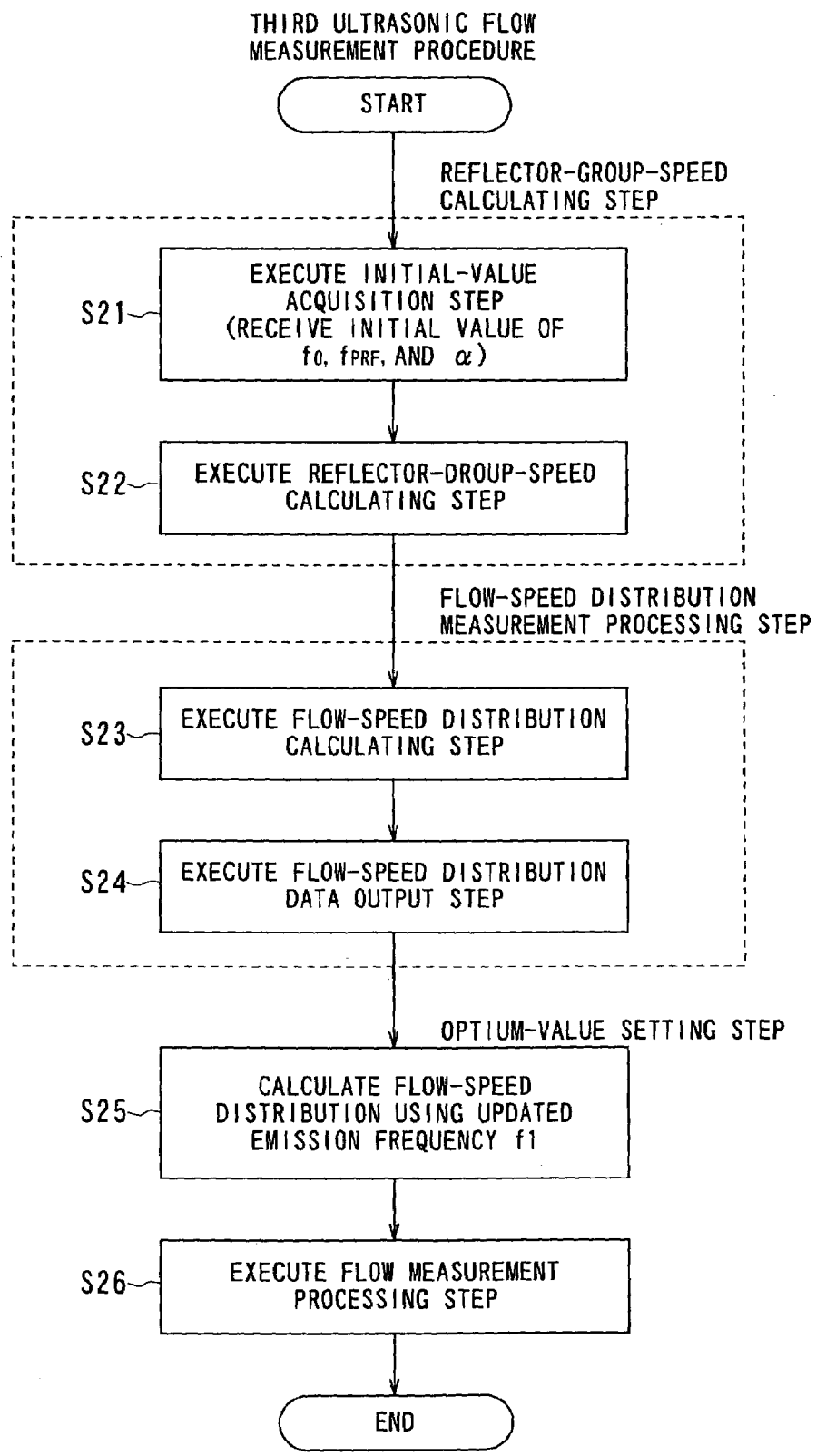
FIG. 16 is an explanatory diagram for making description step by step regarding the processing procedure of ultrasonic flow measurement with the doppler ultrasonic flowmeter according to the sixth embodiment of the present invention.

FIG. 16 is an explanatory diagram for describing step by step regarding the ultrasonic flow measurement procedure (which is denoted by "third ultrasonic flow measurement procedure" in FIG. 16), i.e., the ultrasonic flow measurement method which is performed by the doppler ultrasonic flowmeter 10C.

As shown in FIG. 16, the ultrasonic flow measurement procedure comprises: a reflector-group-speed calculating step (Step S21 and Step S22); a flow-speed distribution measurement processing step (Step S23 and Step S24); an optimum-value setting step (Step S25) for calculating the optimum values of the basic frequency $f_0$, the pulse repetition frequency $f_{PRF}$, and the incident angle α; and a flow measurement processing step (Step S26).

Specifically, the reflector-group-speed calculating step (Step S21 and Step S22) includes an initial-value acquisition step (Step S21), and a reflector-group-speed calculating step (Step S22). First, the flow proceeds to Step S21, i.e., the initial-value acquisition step, wherein the system receives the initial values of the basic frequency $f_0$ at the start time of measurement, the pulse repetition frequency $f_{PRF}$, and the incident angle α. Then, the flow proceeds to Step S22, i.e., the reflector-group-speed calculating step, where the system casts the ultrasonic pulses onto the fluid 12 to be measured, receives the ultrasonic echoes so as to calculate the speed of each of the number of reflectors 25 contained in the fluid 12 to be measured, and the Udflow unit 13 outputs the calculated flow-speed distribution of the reflector-groups 25 as the flow-speed distribution data. Then, the reflector-group-speed calculating step (Step S22) ends.

Upon completion of the reflector-group-speed calculating step, the flow proceeds to the flow-speed distribution measurement processing step (Step S23 and Step S24). First, the flow proceeds to the flow-speed calculating distribution step (Step S23), where the flow-speed distribution calculating member 67 calculates the flow-speed distribution of the fluid 12 to be measured, and the center position. Subsequently, the flow proceeds to the flow-speed distribution data output step (Step S24), where the flow-speed distribution calculating member 67 outputs the flow-speed distribution data and the center position, thus obtained. Upon output of the flow-speed distribution data and the center position data from the flow-speed distribution calculating member 67, the flow-speed distribution measurement processing step ends.

Upon completion of the flow-speed distribution measurement processing step, the flow proceeds to the maximum-value setting step (Step S25), where the optimum-value calculating member 77 calculates the optimum values of the basic frequency $f_0$, the pulse repetition frequency $f_{PRF}$, and the incident angle $\alpha$.

Specifically, the flow proceeds to the optimum-value setting step, i.e., the emission frequency reset step for resetting the emission frequency to the emission frequency $f_1$ which satisfies the following Expression.

$$F_0 \geq 4V_0 \cdot \sin\alpha, \text{ and } f_{PRF} \leq Cw/2Di$$

Note that the optimum-value calculating member 77 resets the emission frequency $f_1$. Upon reset of the emission frequency f1 by the optimum-value calculating member 77, the flow proceeds to the flow-speed distribution measurement processing step, where the system calculates the flow-speed distribution using the updated emission frequency f1. Note that the flow-speed distribution measurement processing step and the emission frequency reset step are repeated until the optimum emission frequency is obtained for measurement. Upon the system obtaining the optimum emission frequency f1, the optimum-value setting step (Step S25) ends.

Upon completion of the optimum-value setting step, the flow proceeds to Step S26, i.e., the flow measurement processing step. The flow measurement processing step, i.e., Step S26, has the same configuration as that of the flow measurement processing step (Step S6 and Step S7) shown in FIG. 8.

As described above, with the doppler ultrasonic flowmeter 10C according to the present embodiment, the flow measurement method using the doppler ultrasonic flowmeter 10C, and the flow measurement program employed for the doppler ultrasonic flowmeter 10C, the optimum-value calculating member 77 has a function for automatic calculation of the optimum value used for adjustment of measurement, which depends upon the properties of the object to be measured, thereby enabling measurement without preliminary measurement for obtaining the optimum value used for adjustment of measurement, which depends upon the properties of the object to be measured, and thereby reducing the load on the user due to the troublesome procedure before measurement.

Note that an arrangement may be made wherein the data input element 78 automatically receives the inner diameter Di of the fluid tube 11, the ultrasonic wave speed Cw in the fluid 12 to be measured, and the incident angle $\alpha$ of the ultrasonic pulses, or an arrangement may be made wherein the user manually inputs the aforementioned information to the data input element 78.

Note that while description has been made regarding an arrangement wherein the present embodiment is applied to the doppler ultrasonic flowmeter 10 shown in FIG. 1, having a configuration wherein the computer 14 reads out and executes the flow measurement PG 41C stored in the storage member 37, whereby a combination of the Udflow unit 13, i.e., a hardware component unit, and the flow measurement PG 41C, i.e., a software component, has the functions serving as the doppler ultrasonic flowmeter 10C, the present embodiment may be applied to the doppler ultrasonic flowmeter 50 or the doppler ultrasonic flowmeter 60.

Seventh Embodiment

A doppler ultrasonic flowmeter 50A according to a seventh embodiment of the present invention has generally the same configuration as that of the doppler ultrasonic flowmeter 50 shown in FIG. 3, wherein the computer 14 reads out and executes a flow measurement PG 41D stored in the storage member 37, whereby a combination of the Udflow unit 13, i.e., a hardware component unit, and a flow measurement PG 41D, i.e., a software component, has the functions serving as the doppler ultrasonic flowmeter 50A.

Figure 17:
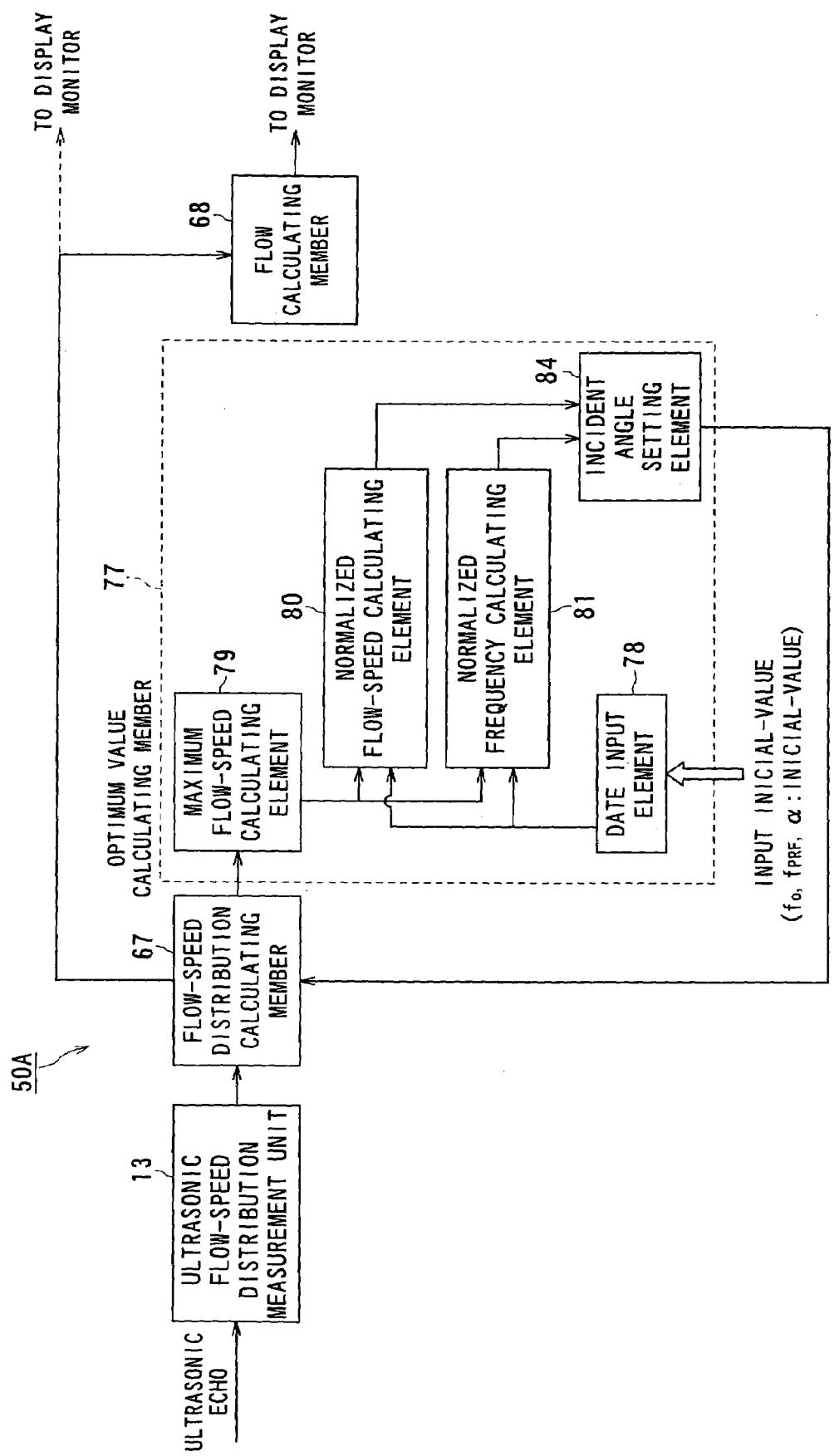
FIG. 17 is a functional block diagram of a doppler ultrasonic flowmeter according to a seventh embodiment of the present invention.

FIG. 17 is a functional block diagram of the doppler ultrasonic flowmeter 50A according to the seventh embodiment of the present invention.

The doppler ultrasonic flowmeter 50A comprises: a Udflow unit 13 including the incident angle adjusting/setting member 51; the flow-speed distribution calculating member 67; the flow calculating member 68; an optimum-value calculating member 77A for making automatic selection of the optimum value used for adjustment of measurement, which depends upon the properties of the object to be measured. Note that the doppler ultrasonic flowmeter 50A according to the present embodiment has the same configuration wherein the Udfow unit 13 serving as the flow-speed data acquisition member 18 and the flow-speed distribution calculating member 67 form the flow-speed distribution measurement unit, and the Udflow unit 13, the flow-speed distribution calculating member 67, and the flow calculating member 68, form the flow measurement unit.

The optimum-value calculating member 77A comprises: the data input element 78; the maximum-flow-speed calculating element 79; the normalized speed calculating element 80; the normalized frequency calculating element 81; an incident angle setting element 84 for resetting the incident angle to $\alpha 1$, which satisfies the following Expression.

$$F_0 \geq 4V_0 \cdot \sin\alpha, \text{ and } f_{PRF} \leq Cw/2Di$$

With the doppler ultrasonic flowmeter 50A, the data input element 78 of the optimum-value calculating member 77 receives the initial values of the inner diameter Di of the fluid tube 11, the ultrasonic wave speed Cw in the fluid 12 to be measured, and the incident angle $\alpha$ of the ultrasonic pulses. Furthermore, the maximum flow-speed calculating element 79 thereof calculates the maximum flow speed V based upon the flow-speed distribution measured by the flow-speed distribution calculating member 67.

The normalized speed calculating element 80 calculates the normalized flow speed $V_0$ which is obtained by dividing the maximum flow speed V calculated by the maximum flow-speed calculating element 79, by the ultrasonic wave speed Cw in the fluid 12 to be measured; Cw having been received by the data input element 78. On the other hand, the normalized frequency calculating element 81 calculates the normalized frequency $F_0$ which is obtained by dividing the pulse repetition frequency $f_{PRF}$ by the emission frequency $f_0$.

The incident angle setting element 84 resets the incident angle to $\alpha 1$ which satisfies the relation represented by the following Expression 1 including the normalized flow speed $V_0$ calculated by the normalized speed calculating element 80 and the normalized frequency $F_0$ calculated by the normalized frequency calculating element 81.

$$F_0 \geq 4V_0 \cdot \sin\alpha, \text{ and } f_{PRF} \leq Cw/2Di$$

Note that the relation represented by the Expression 1 represents the range of the optimum values shown in FIG. 13 through FIG. 15, and has been proposed based upon the experimental results obtained by the present inventor.

Figure 18:
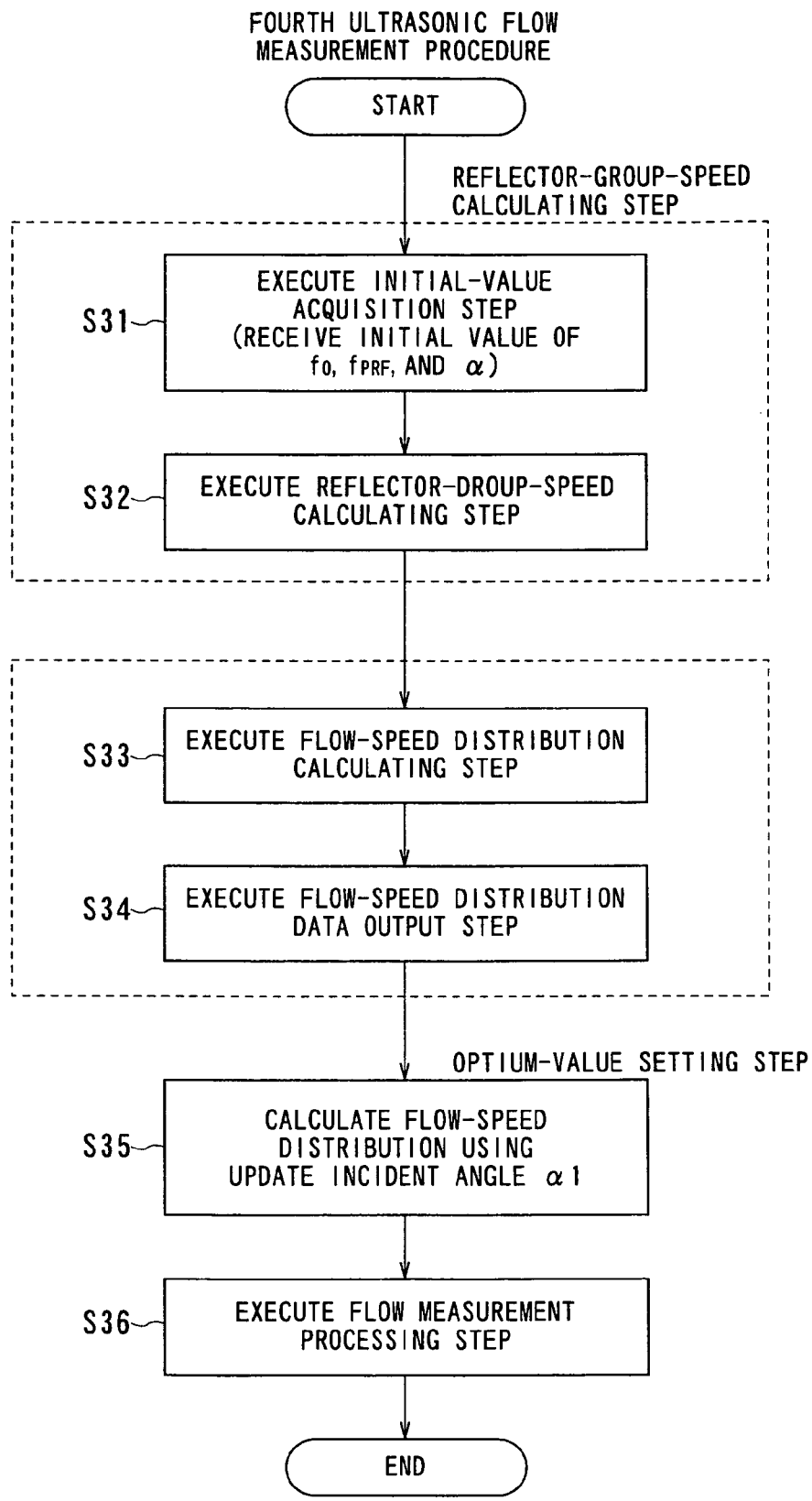
FIG. 18 is an explanatory diagram for making description step by step regarding the processing procedure of ultrasonic flow measurement with the doppler ultrasonic flowmeter according to the seventh embodiment of the present invention.

FIG. 18 is an explanatory diagram for making description step by step regarding the ultrasonic flow measurement procedure (which is denoted by "fourth ultrasonic flow measurement procedure" in FIG. 18), i.e., the ultrasonic flow measurement method employed for the doppler ultrasonic flowmeter 50A.

As shown in FIG. 18, the ultrasonic flow measurement procedure comprises: a reflector-group-speed calculating step (Step S31 and Step S32); a flow-speed distribution measurement processing step (Step S33 and S34); an optimum-value setting step for calculating the optimum values of the basic frequency $f_0$, the pulse repetition frequency $f_{PRF}$, and the incident angle α (Step S35); and a flow measurement processing step (Step S36).

The reflector-group-speed calculating step (Step S31 and Step S32) comprises an initial-value acquisition step (Step S31) and the reflector-group-speed calculating step (step S32). First, the flow proceeds to Step S31, i.e., the initial-value acquisition step, where the system receives the initial values of the basic frequency $f_0$ at the start time of measurement, the pulse repetition frequency $f_{PRF}$, and the incident angle α. Then, the flow proceeds to Step S32, i.e., the reflector-group-speed calculating step, the system calculates the speed of each of the number of reflectors 25 contained in the fluid 12 to be measured, and the Udflow unit 13 outputs the calculated flow-speed distribution of the reflectors 25 as the flow-speed distribution data.

Next, the flow proceeds to the flow-speed distribution calculating step (Step S33) in the flow-speed distribution measurement processing step (step S33 and Step S34), where the flow-speed distribution calculating member 67 calculates the flow-speed distribution of the fluid 12 to be measured and the center position. Subsequently, the flow proceeds to the flow-speed distribution data output step (Step S34), where the flow-speed distribution calculating member 67 outputs the flow-speed distribution data and the center position data thus calculated. Upon output of the flow-speed distribution data and the center position data, the flow-speed distribution measurement processing step ends.

Upon completion of the flow-speed distribution measurement processing step, the flow proceeds to the optimum-value setting step (Step S35), where the optimum-value calculating member 77A calculates the optimum values of the basic frequency $f_0$, the pulse repetition frequency $f_{PRF}$, and the incident angle α.

Specifically, in the optimum-value setting step, i.e., the incident-angle reset step, in this case, the system resets the incident angle to α1 which satisfies the following Expression.

$$F_0 \geq 4V_0 \cdot \sin\alpha, \text{ and } f_{PRF} \leq Cw/2Di$$

Note that the optimum-value calculating member 77A resets the incident angle to α1. Upon reset of the incident angle to the optimum incident angle α1 for measurement, the optimum-value setting step (Step S35) ends.

Upon completion of the optimum-value setting step, the flow proceeds to Step S26, i.e., the flow measurement processing step. The flow measurement processing step has the same configuration as that of the flow measurement processing step (Step S6 and Step S7) shown in FIG. 8.

As described above, with the doppler ultrasonic flowmeter 50A according to the present embodiment, the flow measurement method using the doppler ultrasonic flowmeter 50A, and the flow measurement program employed for the doppler ultrasonic flowmeter 50A, the optimum-value calculating member 77A has a function for automatic calculation of the optimum value used for adjustment of measurement, which depends upon the properties of the object to be measured, thereby enabling measurement without preliminary measurement for obtaining the optimum value used for adjustment of measurement, which depends upon the properties of the object to be measured, and thereby reducing the load placed on the user by the troublesome procedure before measurement.

Note that an arrangement may be made wherein the data input element 78 automatically receives the inner diameter Di of the fluid tube 11, the ultrasonic wave speed Cw in the fluid 12 to be measured, and the incident angle α of the ultrasonic pulses, or an arrangement may be made wherein the user manually inputs the aforementioned information to the data input element 78.

While description has been made regarding an arrangement wherein the optimum-value calculating member 77A comprises the data input element 78, the maximum flow-speed calculating element 79, the normalized speed calculating element 80, the normalized frequency calculating element 81, and the incident angle setting element 84, an arrangement may be made wherein the optimum-value calculating member 77A further comprises the frequency setting element 82 in the same way as with the optimum-value calculating member 77.

Note that while description has been made regarding an arrangement wherein the present embodiment is applied to the doppler ultrasonic flowmeter 50 shown in FIG. 3, having a configuration wherein the computer 14 reads out and executes the flow measurement PG 41D stored in the storage member 37, whereby a combination of the Udflow unit 13, i.e., a hardware component unit, and the flow measurement PG 41D, i.e., a software component, has the functions serving as the doppler ultrasonic flowmeter 50A, the present embodiment may be applied to the doppler ultrasonic flowmeter 60.

Eight Embodiment

Figure 19:
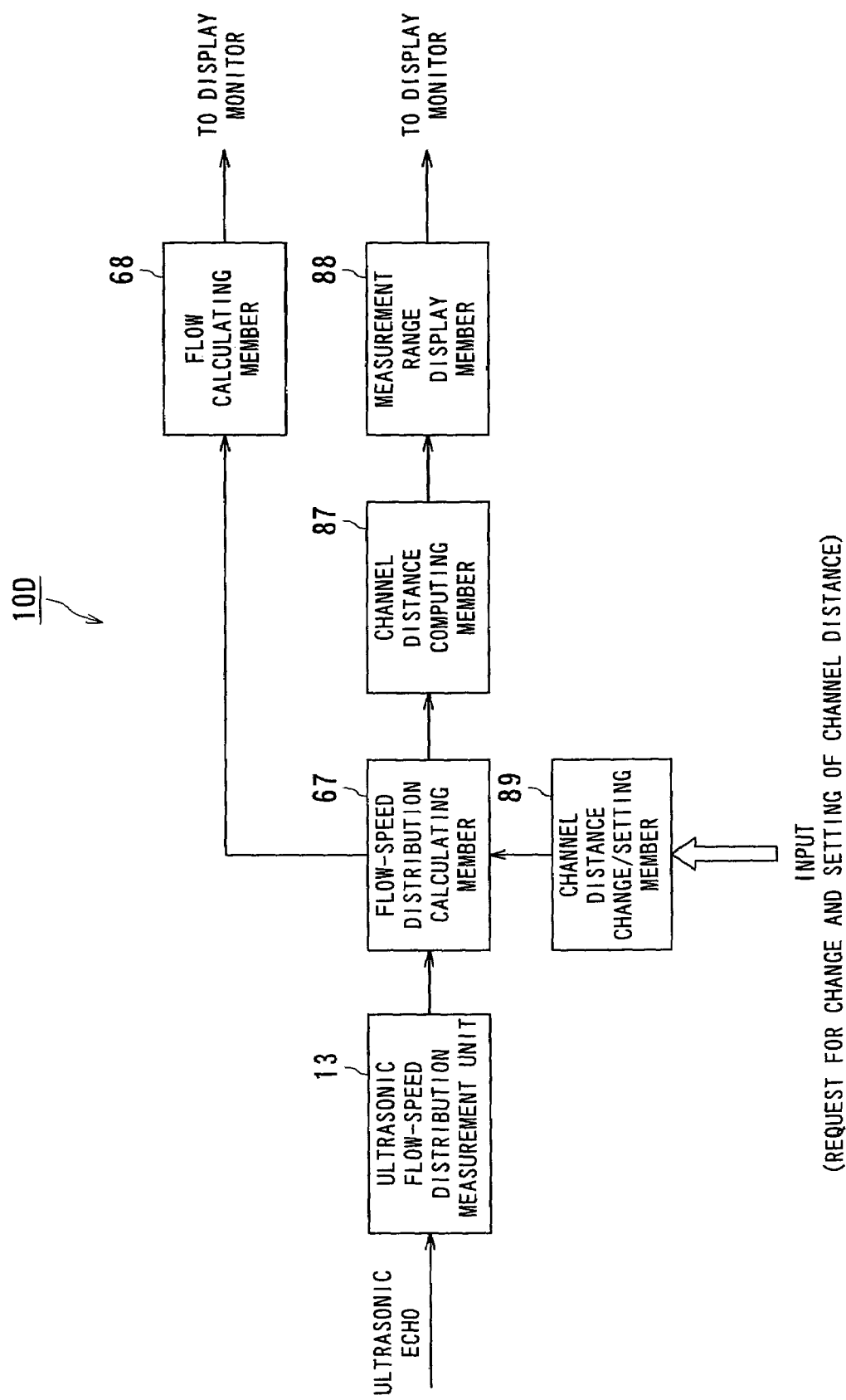
FIG. 19 is a functional block diagram of a doppler ultrasonic flowmeter according to an eighth embodiment of the present invention.

FIG. 19 is a functional block diagram of a doppler ultrasonic flowmeter 10D according to an eighth embodiment of the present invention.

The doppler ultrasonic flowmeter 10D shown in FIG. 19 has generally the same configuration as that of the doppler ultrasonic flowmeter 10 shown in FIG. 1, wherein the computer 14 reads out and executes a flow measurement PG 41E stored in the storage member 37, whereby a combination of the Udflow unit 13, i.e., a hardware component unit, and a PG 41E, i.e., a software component, has the functions serving as the doppler ultrasonic flowmeter.

As shown in FIG. 19, the doppler ultrasonic flowmeter 10D includes: the Udflow unit 13; the flow-speed distribution calculating member 67; the flow calculating member 68; a channel distance computing member 87 for computing the minimum channel distance based upon the frequency and the speed of the ultrasonic pulses; a measurement range display member 88 for computing and displaying the measurement range based upon the minimum channel distance thus computed; and channel distance change/setting member 89 which allows the user to determine whether or not the minimum channel distance is changed to the value obtained by multiplying the initial minimum channel distance by an integer.

The channel distance computing member 87 computes the minimum channel distance based upon the frequency and speed of the ultrasonic pulses. The measurement range display member 88 computes the measurement range based upon the minimum channel distance computed by the channel distance computing member 87, and displays the computation results on display. The channel distance change/setting member 89 receives a request for change and setting of the minimum channel distance, which allows the user to determine whether or not the minimum channel distance is changed to the value obtained by multiplying the initial minimum channel distance by an integer.

Let us say that the ultrasonic pulse is cast from the transducer onto the fluid, is reflected from the far-side tube wall, and received by the reflected-wave receiver, just during the pulse repetition cycle (=$1/f_{PRF}$). In this case, the maximum value of the channel distance which can be set by the channel distance change/setting member 89 matches the tube diameter of the fluid tube 11. Accordingly, the maximum value of the channel distance can be varied by adjusting the pulse repetition frequency $f_{PRF}$. Note that it can be understood that the system can set the maximum channel distance sufficient for measurement of the actual fluid tube 11 having the largest tube diameter, based upon the fact that the system can set a desired pulse repetition frequency $f_{PRF}$ from the minimum in order of 1 Hz, and the ultrasonic wave speed Cw is in order of 1000 m/s in the fluid 12 to be measured.

Figure 20:
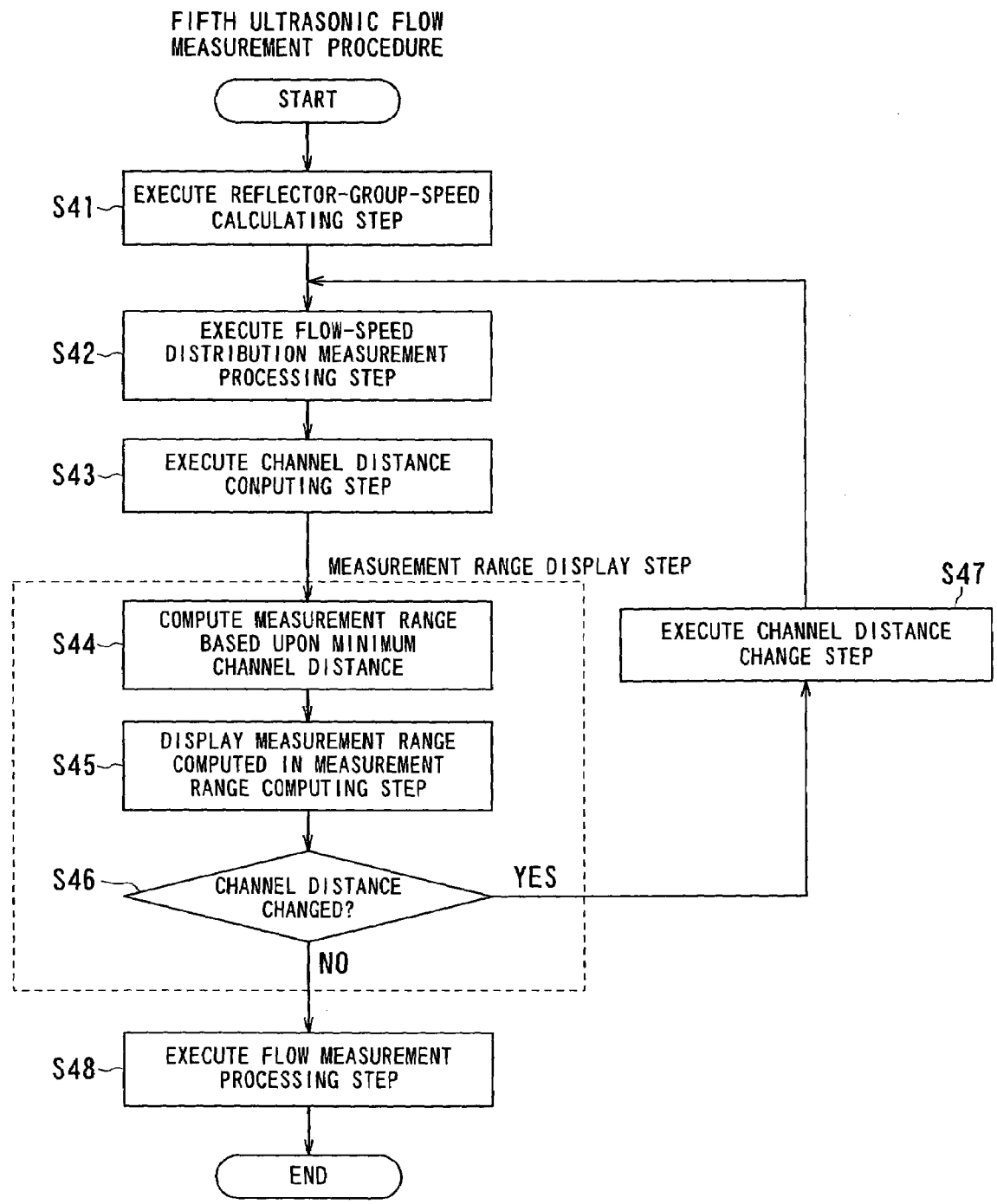
FIG. 20 is an explanatory diagram for making description step by step regarding the processing procedure of ultrasonic flow measurement with the doppler ultrasonic flowmeter according to the eighth embodiment of the present invention.

FIG. 20 is an explanatory diagram for making description step by step regarding the ultrasonic flow measurement procedure (which is denoted by "fifth ultrasonic flow measurement procedure" in FIG. 20), i.e., the ultrasonic flow measurement method employed for the doppler ultrasonic flowmeter 10D.

As shown in FIG. 20, the ultrasonic flow measurement procedure performed by the doppler ultrasonic flowmeter 10D comprises: a reflector-group-speed calculating step (Step S41); a flow-speed distribution measurement processing step (Step S42); a channel distance computing step (step S43); a measurement range display step (Step S44 through Step S46); a channel distance changing step (Step S47); and a flow measurement processing step (Step S48).

The reflector-group-speed calculating step (Step S41) has the same configuration as that of the reflector-group-speed calculating step (Step S1) shown in FIG. 8, wherein the Udflow unit 13 calculates the speed of each of the number of reflectors 25 contained in the fluid 12 to be measured, and the Udflow unit 13 outputs the calculated flow-speed distribution of the reflectors 25 as the flow-speed distribution data. Furthermore, the Udflow unit 13 outputs the data of the frequency $f_0$ of the ultrasonic pulses and the ultrasonic wave speed Cw required for computation in the channel distance computation step (Step S43). Upon completion of the reflector-group-speed calculating step, the flow proceeds to the flow-speed distribution measurement processing step (Step S42).

In Step S42, i.e., the flow-speed distribution measurement processing step, the flow-speed distribution calculating member 67 calculates the flow-speed distribution data of the fluid 12 to be measured and the center position data of the fluid tube 11 based upon the flow-speed distribution data of the reflectors 25. Upon calculation of the flow-speed distribution data of the fluid 12 to be measured, and the center position data of the fluid tube 11, the flow-speed distribution measurement processing step (Step S42) ends, following which the flow proceeds to the channel distance computing step (Step S43).

In Step S43, i.e., the channel distance computing step, the channel distance computing member 87 computes the minimum channel distance based upon the frequency $f_0$ of the ultrasonic pulses at the time of measurement and the ultrasonic wave speed Cw. Upon computation of the minimum channel distance, the channel distance computing step ends, following which the flow proceeds to the measurement range display steps (Step S44 through Step S46).

The measurement range display steps (Step S44 through Step S46) comprises: a measurement range computing step (Step S44) for computing the measurement range based upon the minimum channel distance computed by the channel distance computing member 87; a measurement range display step (Step S45) for displaying the data of the measurement range computed in the measurement range computing step on display; and a channel distance change/setting determination step (Step S46) which allows the user to determine whether or not the channel distance is changed, through the display.

In the measurement range display steps (Step S44 through Step S46), first, the flow proceeds to Step S44, i.e., the measurement range computing step, where the measurement range display member 88 computes the measurement range, following which the flow proceeds to Step S45, i.e., the measurement range display step, where the measurement range display member 88 outputs the data of the measurement range, and the computation processing member 35 of the computer 14 displays the information regarding the measurement range outputs from the measurement range display member 88 on the display monitor 39.

Figure 21:
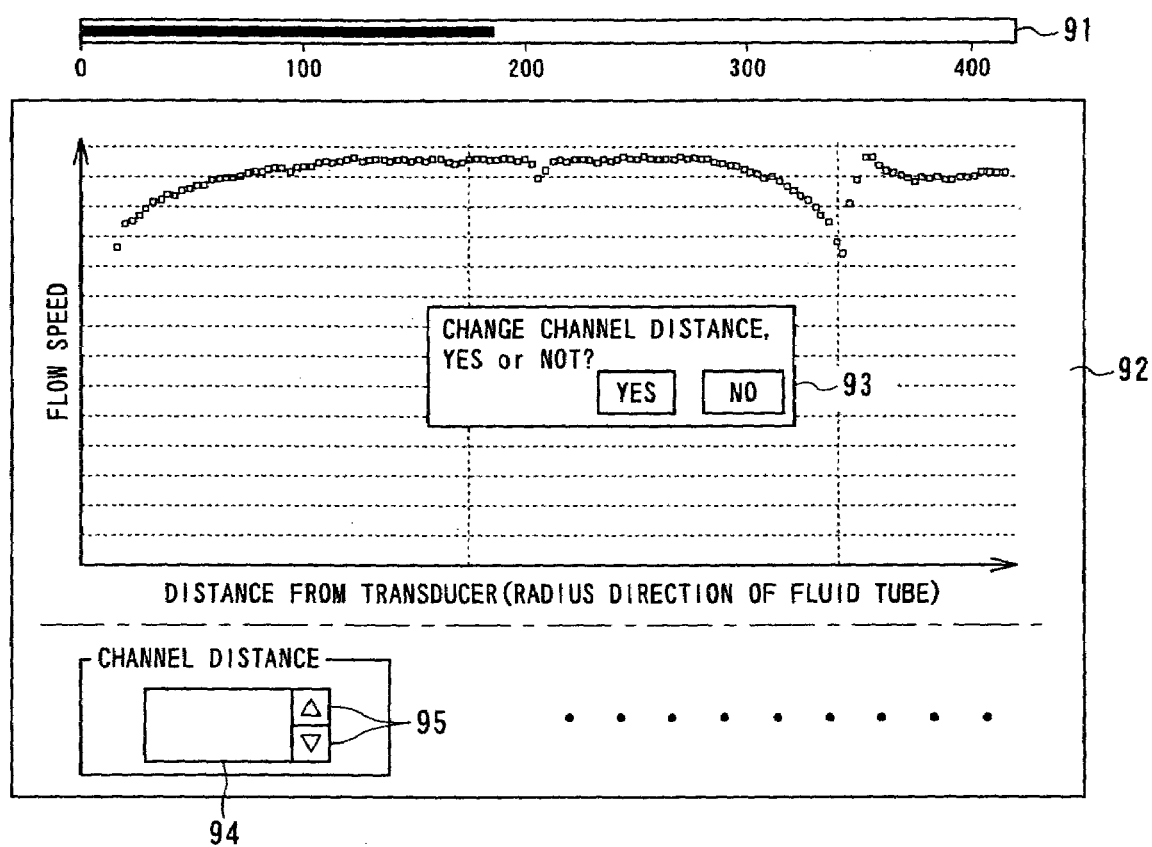
FIG. 21 is a schematic explanatory diagram which shows an example of a screen displayed on a display monitor in a measurement range display step of the ultrasonic flow measurement procedure of the doppler ultrasonic flowmeter according to the eighth embodiment of the present invention.

FIG. 21 is a schematic explanatory diagram which shows an example of a screen displayed on the display monitor 39 as a result of the measurement range display step (Step S45).

As shown in FIG. 21, a measurement range bar 91 is displayed on the upper portion of the flow-speed distribution display portion 92, which allows the user to confirm the measurement range.

Note that while the arrangement shown in FIG. 21 has a simple layout for convenience of description, it is needless to say that the layout of the screen may further include the information regarding the frequency of the ultrasonic pulses, the ultrasonic wave speed, and so forth, as necessary.

Furthermore, at the same time of display of the measurement range bar 91 on the display monitor 39, the flow proceeds to Step S46, i.e., the channel distance change/setting determination step, where the system displays a dialog box (which will be referred to as "channel distance change/setting determination dialog box" hereafter) 93 on the display monitor 39, which allows the user to determine whether or not the channel distance is changed. Upon display of the measurement range bar and the channel distance change/setting determination dialog box, the measurement range display steps (Step S44 through Step S46) ends.

In the event that the user has determined that there is no need to change the minimum channel distance in particular through the minimum channel distance change/setting determination dialog box displayed on the display monitor 39 in Step S46, i.e., the channel distance change/setting determination step (in a case of "NO" in Step S46), the flow proceeds to the flow measurement processing step (Step S48). The flow measurement processing step (Step S48) has the same configuration as that of the flow measurement processing step (Step S6 and Step S7) shown in FIG. 8. Upon completion of the Step S48, i.e., the flow measurement processing step, the ultrasonic flow measurement procedure ends.

On the other hand, in the event that the user has determined that there is the need to change the minimum channel distance through the minimum channel distance change/setting determination dialog box 93 displayed on the display monitor 39 in Step S46, i.e., the channel distance change/setting determination step (in a case of "YES" in Step S46), the flow proceeds to the channel distance changing step (Step S47).

In the channel distance changing step, the channel distance change/setting member 89 changes the channel distance by multiplying the minimum channel distance by an integer corresponding to the request input by the user. In a case of input of a request that measurement is made with the channel distance twice the minimum distance channel, the channel distance is set to twice the minimum channel distance.

As shown in FIG. 21, the system provides a GUI, e.g., a channel distance setting window 94 displayed on the display monitor 39, which allows the user to change the channel distance through the input member 38 of the personal computer 14. Alternatively, the user selects and operates (click operation) a vertical cursor 95 displayed on the side of the channel distance setting window 94 through the input member 38 of the personal computer 14 so as to adjust the channel distance in increments of the minimum channel distance. Note that in a case wherein the user sets the value in the channel distance setting window 94 to 2, the channel distance is set to twice the minimum channel distance.

Upon completion of setting processing by the channel distance change/setting member 89 wherein the channel distance is set to the value obtained by multiplying the minimum channel distance by an integer which has been input in the channel distance setting window 94, the channel distance changing step (Step S47) ends, following which the flow proceeds to Step S42. Then, the system executes the processing steps following Step S42.

Next, description will be made regarding the estimation results of the relation between the measurement precision of the doppler ultrasonic flowmeter 10D and the channel distance which is obtained by multiplying the minimum channel distance by an integer, based upon the measurement results.

(Estimation Results of the Relation Between the Measurement Precision and the Channel Distance)

The first measurement was made as follows. That is to say, flow measurement was made with regard to water flowing within the fluid tube 11 with an inner diameter of 150 mm, serving as the fluid 12 to be measured, with a sampling frequency of 1 MHz, and with a channel distance of twice the minimum channel distance.

In a case of measurement of water serving as the fluid 12 to be measured, with an sampling frequency of 1 MHz, the minimum channel distance is approximately 0.75 mm, based upon the fact that the ultrasonic wave speed is 1480 m/s in water. On the other hand, the doppler ultrasonic flowmeter 10D used for the present measurement includes 128 channels, and accordingly, the measurement depth (distance) becomes 128×0.75 mm=96 mm. Accordingly, it can be understood that the channel distance needs to be set to at least twice or more the minimum channel distance.

In the first measurement using the doppler ultrasonic flowmeter 10D, the flow-speed distribution was obtained with 100 channels (=150 mm/1.5 mm) of the 128 channels included in the doppler ultrasonic flowmeter 10D.

Next, the second measurement was made as follows. That is to say, flow measurement was made with regard to water flowing within the fluid tube 11 with an inner diameter of 150 mm, serving as the fluid 12 to be measured, with a sampling frequency of 1 MHz, and with a channel distance of three times the minimum channel distance.

With the second measurement, the channel distance becomes three times the minimum channel distance, i.e., 0.75 mm×3=2.25 mm, and accordingly, the measurement depth (distance) becomes 128×2.25 mm=288 mm. On the other hand, in the second measurement, the flow-speed distribution was obtained with 67 channels (=150 mm/2.25 mm) of the 128 channels included in the doppler ultrasonic flowmeter 10D.

Next, the third measurement was made with a reduced number of the measurement channels. As a result of the third measurement, it has been confirmed that high measurement can be made with a sufficiently smaller error than 1% from the true value, even if measurement is made with approximately half the measurement channels.

As can be understood from the measurement results described above, it has been confirmed that the doppler ultrasonic flowmeter according to the present embodiment exhibits high measurement performance without a particular countermeasure for handling measurement with a large-diameter fluid tube, or improving measurement precision, such as a configuration including the 256 channels or 512 channels; the number being greater than with the present embodiment including the 128 channels.

Specifically, it has been confirmed that with a doppler ultrasonic flowmeter having a configuration wherein the flow-speed distribution is calculated based upon the ultrasonic echoes received by the measurement channels of which the maximum number is 128, high-precision measurement can be made with a sufficiently smaller error than 1% for any tube in a large diameter range from a large inner diameter exceeding 280 mm, to a small inner diameter less than 100 mm (e.g., in a case of employing the channel distance three times the minimum channel distance, measurement was made with an error of 0.0056%).

As described above, with the doppler ultrasonic flowmeter 10D according to the present embodiment, the flow measurement method using the doppler ultrasonic flowmeter 10D, and the flow measurement program employed for the doppler ultrasonic flowmeter 10D, the user can determine to change the measurement range based upon the relation between the measurement range calculated based upon the minimum channel distance and the tube diameter of the fluid tube within which the fluid to be measured flows, as necessary, and the flow-speed distribution is computed based upon the measurement results with the changed measurement range, thereby enabling extension of the measurement range.

Note that while description has been made regarding an arrangement wherein the present embodiment is applied to the doppler ultrasonic flowmeter 10 shown in FIG. 1, having a configuration wherein the computer 14 reads out and executes the flow measurement PG 41E stored in the storage member 37, whereby a combination of the Udflow unit 13, i.e., a hardware component unit, and the PG 41E, i.e., a software component, has the functions serving as the doppler ultrasonic flowmeter 10D, the present embodiment may be applied to the doppler ultrasonic flowmeter 50 or the doppler ultrasonic flowmeter 60.

While description has been made regarding the doppler ultrasonic flowmeter 10D having a configuration wherein the mechanism which allows the system to adjust the measurement range by setting the channel distance to a value obtained by multiplying the minimum channel distance by an integer is applied to a doppler ultrasonic flowmeter including 128 measurement channels, the present invention is not restricted to the aforementioned arrangement, rather, arrangements may be made wherein the aforementioned mechanism is applied to a doppler ultrasonic flowmeter including 128 or more measurement channels.

Ninth Embodiment

Figure 22:
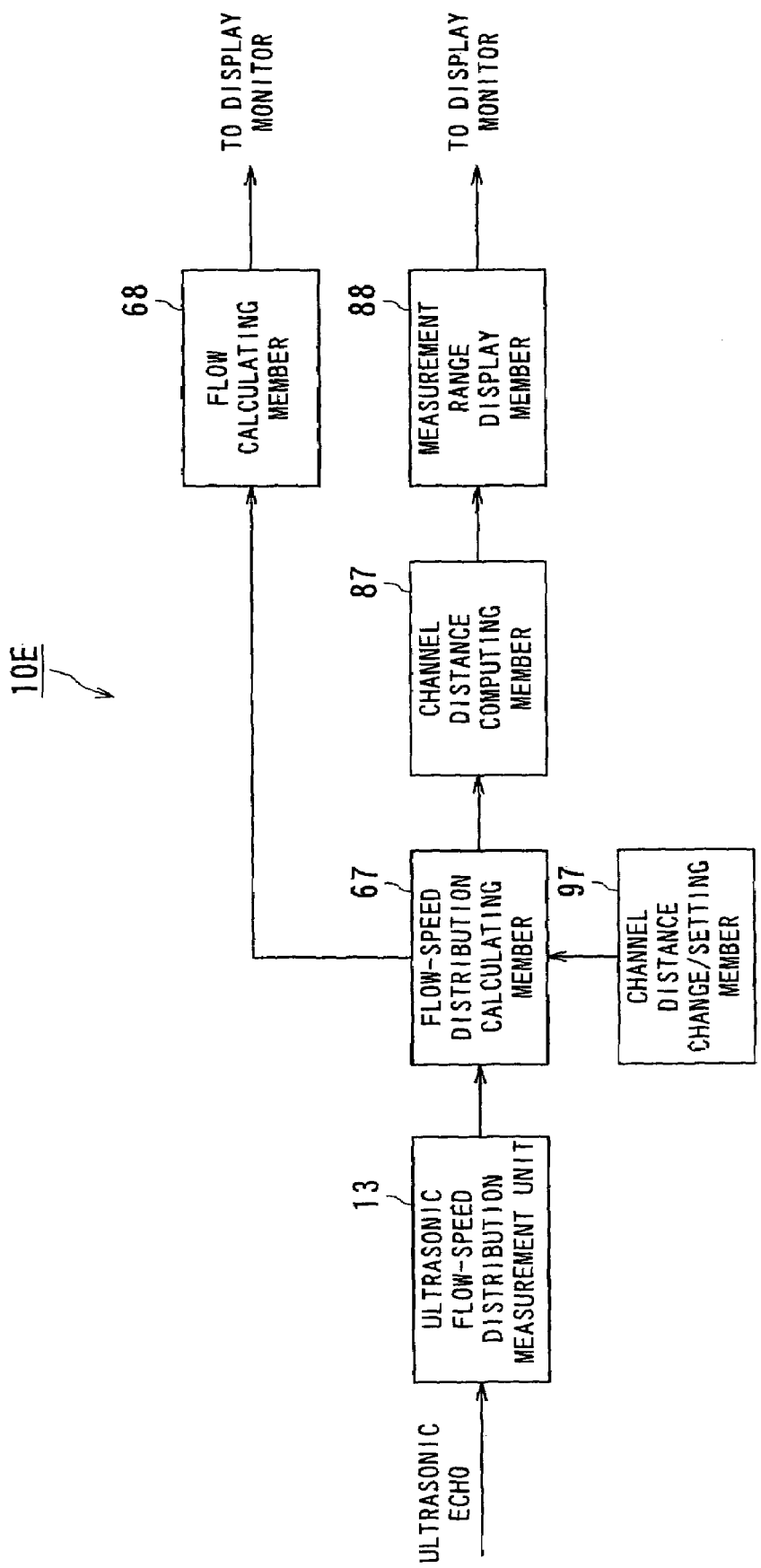
FIG. 22 is a functional block diagram of a doppler ultrasonic flowmeter according to a ninth embodiment of the present invention.

FIG. 22 is a functional block diagram of a doppler ultrasonic flowmeter 10E according to a ninth embodiment of the present invention.

The doppler ultrasonic flowmeter 10E shown in FIG. 22 has generally the same configuration as that of the doppler ultrasonic flowmeter 10 shown in FIG. 1, wherein the computer 14 reads out and executes a flow measurement PG 41F stored in the storage member 37, whereby a combination of the Udflow unit 13, i.e., a hardware component unit, and a flow measurement PG 41F, i.e., a software component, has the functions serving as the doppler ultrasonic flowmeter.

As shown in FIG. 22, the doppler ultrasonic flowmeter 10E has the same configuration as that of the doppler ultrasonic flowmeter 10D shown in FIG. 19, except for a configuration including a channel distance automatic change/determination member 97, instead of the channel distance change/setting member 89. Accordingly, the same components are denoted by the same reference numerals, and description thereof will be omitted. Note that the present embodiment has the same configuration wherein the Udflow unit 13 serving as the flow-speed data acquisition member 18 and the flow-speed distribution calculating member 67 form the flow-speed distribution measurement unit, and the Udflow unit 13, the flow-speed distribution calculating member 67, and the flow calculating member 68, form the flow measurement unit.

The doppler ultrasonic flowmeter 10E includes: the Udflow unit 13; the flow-speed distribution calculating member 67; the flow calculating member 68; the channel distance computing member 87; the measurement range display member 88; and the cannel distance automatic change/determination member 97 for automatically determining whether or not the channel distance is set to a value obtained by multiplying the minimum channel distance by an integer. Specifically, the channel distance automatic change/determination member 97 automatically determines whether or not the channel distance is set to a value obtained by multiplying the minimum channel distance by an integer, based upon the minimum channel distance, the tube diameter of the fluid tube 11, and the maximum number of the measurement channels.

Figure 23:
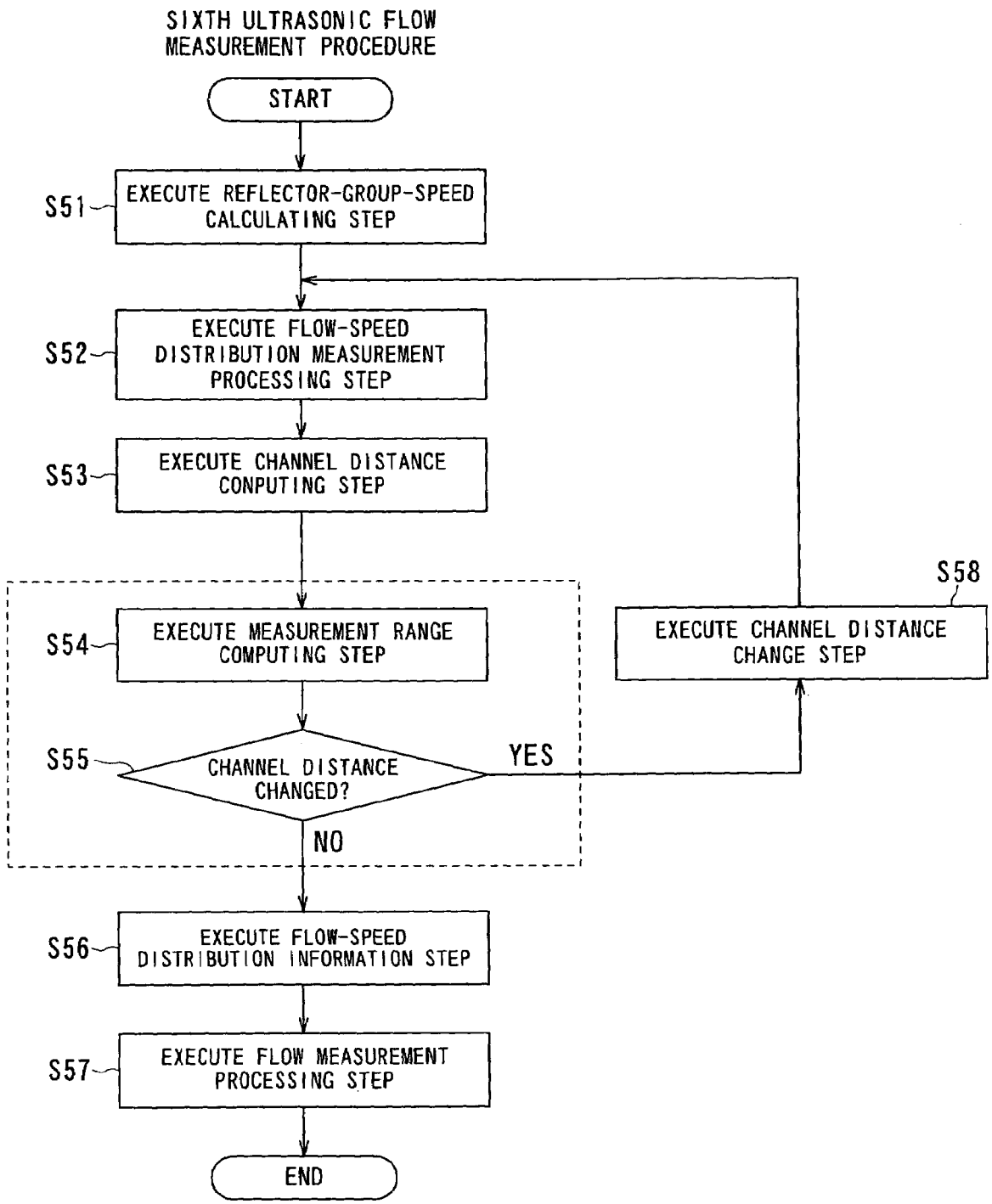
FIG. 23 is an explanatory diagram for making description step by step regarding the processing procedure of ultrasonic flow measurement with the doppler ultrasonic flowmeter according to the ninth embodiment of the present invention.

FIG. 23 is an explanatory diagram for making description step by step regarding the ultrasonic flow measurement procedure (which is denoted by "sixth ultrasonic flow measurement procedure" in FIG. 23), i.e., the ultrasonic flow measurement method employed for the doppler ultrasonic flowmeter 10E.

As shown in FIG. 23, the ultrasonic flow measurement procedure performed by the doppler ultrasonic flowmeter 11E comprises: a reflector-group-speed calculating step (Step S51); a flow-speed distribution measurement processing step (Step S52); a channel distance computing step (step S53); a measurement range display step (Step S54 and Step S55); a flow-speed distribution information display step (Step S56); a flow measurement processing step (Step S57); and a channel distance changing step (Step S58).

The reflector-group-speed calculating step (Step S51) has the same configuration as that of the reflector-group-speed calculating step (Step S41) shown in FIG. 20, wherein the Udflow unit 13 calculates the speed of each of the number of reflectors 25 contained in the fluid 12 to be measured, and the Udflow unit 13 outputs the calculated flow-speed distribution of the reflectors 25, and the data of the frequency $f_0$ of the ultrasonic pulses and the ultrasonic wave speed Cw. Upon completion of the reflector-group-speed calculating step, the flow proceeds to the flow-speed distribution measurement processing step (Step S52).

In Step S52, i.e., the flow-speed distribution measurement processing step, the flow-speed distribution calculating member 67 calculates the flow-speed distribution data of the fluid 12 to be measured and the center position data of the fluid tube 11 based upon the flow-speed distribution data of the reflectors 25. Upon calculation of the flow-speed distribution data of the fluid 12 to be measured, and the center position data of the fluid tube 11, the flow-speed distribution measurement processing step (Step S52) ends, following which the flow proceeds to the channel distance computing step (Step S53).

In Step S53, i.e., the channel distance computing step, the channel distance computing member 87 computes the minimum channel distance based upon the frequency $f_0$ of the ultrasonic pulses at the time of measurement and the ultrasonic wave speed Cw. Upon computation of the minimum channel distance, the channel distance computing step ends, following which the flow proceeds to the measurement range calculating step (Step S54 and Step S55).

The measurement range calculating step (Step S54 and Step S55) comprises: a measurement range computing step (Step S54) for computing the measurement range based upon the minimum channel distance computed by the channel distance computing member 87; and a channel distance change determination step (Step S55) for determining whether or not the channel distance needs to be changed.

In the measurement range calculating step (Step S54 and Step S55), first, the flow proceeds to Step S54, i.e., the measurement range computing step, where the measurement range display member 88 computes the measurement range, following which the flow proceeds to Step S55, i.e., the channel distance change determination step, where the cannel distance automatic change/determination member 97 determines whether or not the channel distance needs to be changed based upon the measurement range calculated by the measurement range display member 88 and the tube diameter of the fluid tube within which the fluid to be measured flows.

In the event that the channel distance automatic change/determination member 97 has determined that the channel distance needs not to be changed in the channel distance change determination step (in a case of "NO" in Step S55), the flow proceeds to the flow-speed distribution information display step (step S56), where the system displays the information regarding the flow-speed distribution of the fluid 12 to be measured, and the measurement range, on the display monitor 39.

Upon display of information regarding the flow-speed distribution of the fluid 12 to be measured, and the measurement range, on the display monitor 39, the flow-speed distribution information display step (step S56) ends, following which the flow proceeds to the flow measurement processing step (Step S57). The flow measurement processing step (Step S57) has the same configuration as that of the flow measurement processing step (Step S6 and Step S7) shown in FIG. 8. Then, upon completion of Step S57, i.e., the flow measurement processing step, the ultrasonic flow measurement procedure ends.

On the other hand, in the event that the channel distance automatic change/determination member 97 has determined that the channel distance needs to be changed in the channel distance change determination step (in a case of "YES" in Step S55), the flow proceeds to the channel distance changing step (Step S58).

The channel distance changing step (Step S58) has the same configuration as that of the channel distance changing step (Step S47) shown in FIG. 20, where the channel distance automatic change/determination member 97 sets the channel distance to a value which is obtained by multiplying the minimum channel distance by an integer. Upon completion of the channel distance changing step, the flow returns to Step S52, and the system performs processing steps following Step S52.

As described above, with the doppler ultrasonic flowmeter 10E according to the present embodiment, the flow measurement method using the doppler ultrasonic flowmeter 10E, and the flow measurement program employed for the doppler ultrasonic flowmeter 10E, the channel distance automatic change/determination member 97 determines whether or not the channel distance needs to be changed based upon the measurement range calculated from the minimum channel distance and the tube diameter of the fluid tube within which the fluid to be measured flows, and automatically change the measurement range, as necessary, for measurement of the flow-speed distribution.

This enables extension of the measurement range in the same way as with the doppler ultrasonic flowmeter 10D according to the present embodiment, the flow measurement method using the doppler ultrasonic flowmeter 10D, and the flow measurement program employed for the doppler ultrasonic flowmeter 10D. Furthermore, an arrangement with an extended measurement range exhibits a high-precision measurement performance with a sufficiently smaller error than 1%.

Note that while description has been made regarding an arrangement wherein the present embodiment is applied to the doppler ultrasonic flowmeter 10 shown in FIG. 1, having a configuration wherein the computer 14 reads out and executes the flow measurement PG 41F stored in the storage member 37, whereby a combination of the Udflow unit 13, i.e., a hardware component unit, and the flow measurement PG 41F, i.e., a software component, has the functions serving as the doppler ultrasonic flowmeter 10E, the present embodiment may be applied to the doppler ultrasonic flowmeter 50 or the doppler ultrasonic flowmeter 60.

While description has been made regarding the doppler ultrasonic flowmeter 10E including the channel distance automatic change/determination member 97, instead of the channel distance change/setting member 89, the doppler ultrasonic flowmeter 10E may include both the channel distance automatic change/determination member 97 and the channel distance change/setting member 89. The doppler ultrasonic flowmeter having such a configuration allows the user to select a desired selection mode from the two kinds of the selection modes, i.e., the manual selection according to the selection of the user, and the automatic selection. In this case, an arrangement may be made wherein a menu is prepared for the user, wherein in the event that the channel distance has not been changed according to the selection of the user, the system automatically changes the channel distance to a more suitable value for measurement.

Tenth Embodiment

Figure 24:
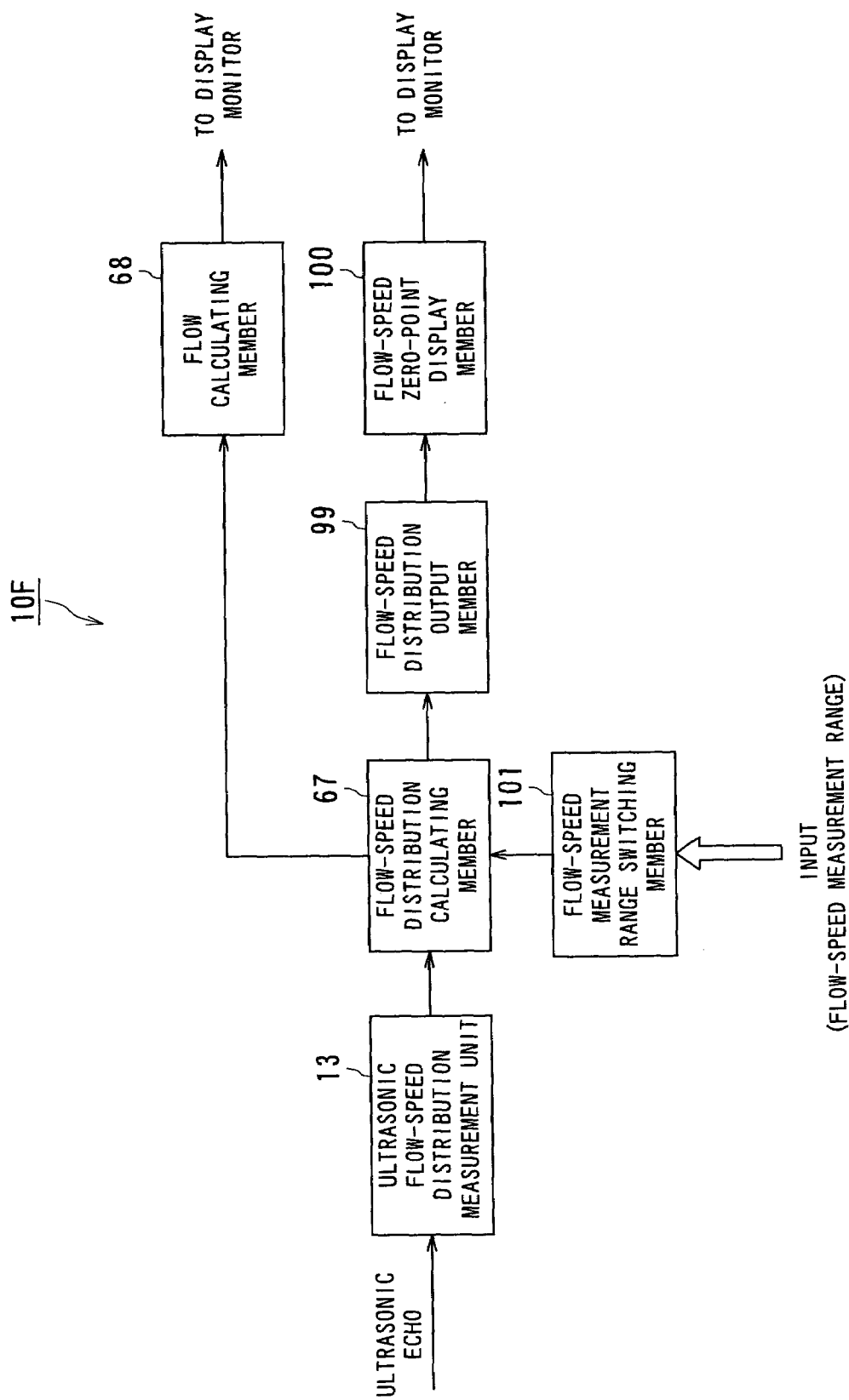
FIG. 24 is a functional block diagram of a doppler ultrasonic flowmeter according to a tenth embodiment of the present invention.

FIG. 24 is a functional block diagram of a doppler ultrasonic flowmeter 10F according to a tenth embodiment of the present invention.

The doppler ultrasonic flowmeter 10F shown in FIG. 24 has generally the same configuration as that of the doppler ultrasonic flowmeter 10 shown in FIG. 1, wherein the computer 14 reads out and executes a flow measurement PG 41G stored in the storage member 37, whereby a combination of the Udflow unit 13, i.e., a hardware component unit, and a flow measurement PG 41G, i.e., a software component, has the functions serving as the doppler ultrasonic flowmeter.

As shown in FIG. 24, the doppler ultrasonic flowmeter 10F includes: the Udflow unit 13; the flow-speed distribution calculating member 67; the flow calculating member 68; a flow-speed distribution output member 99 for outputting the relation between the flow-speed distribution of the fluid 12 to be measured and the distance in the direction of the measurement line ML in the form of an image; a flow-speed zero-point display member 100 for displaying the zero points which represents the flow speed of zero in the form of a continuous line; and a flow-speed measurement range switching member 101 for switching the measurement range (which will be referred to as "flow-speed measurement range" hereafter) of the flow-speed distribution measurement unit between a normal range mode and a double-range mode where the system displays the flow-speed distribution in a positive measurement range alone with a flow-speed measurement range twice that of the normal mode.

Note that the present embodiment has the same configuration wherein the Udflow unit 13 serving as the flow-speed data acquisition member 18 and the flow-speed distribution calculating member 67 form the flow-speed distribution measurement unit, and the Udflow unit 13, the flow-speed distribution calculating member 67, and the flow calculating member 68, form the flow measurement unit.

The flow-speed distribution output member 99 displays the relation between the flow-speed distribution data of the fluid 12 to be measured, which has been output from the flow-speed distribution calculating member 67, and the distance in the direction of the measurement line ML, on the display monitor 39. The flow-speed zero-point display member 100 superimposes a flow-speed zero line which represents the flow speed of zero, on the flow-speed distribution displayed on the display monitor 39.

The flow-speed measurement range switching member 101 allows the user to switch the measurement mode between the normal range mode and the double-range mode where the flow-speed distribution or the flow is not measured in the negative range, but is measured in the positive measurement range alone. This allows the system to make measurement without handling the information whether the measurement results belong to the positive measurement range or the negative range, and accordingly, the performance which has been used for handling such information become available, thereby increasing the performance for measurement of the flow speed, and thereby increasing the flow-speed measurement range to twice that of the normal range mode, at the time of flow measurement in the positive measurement range alone.

Figure 25:
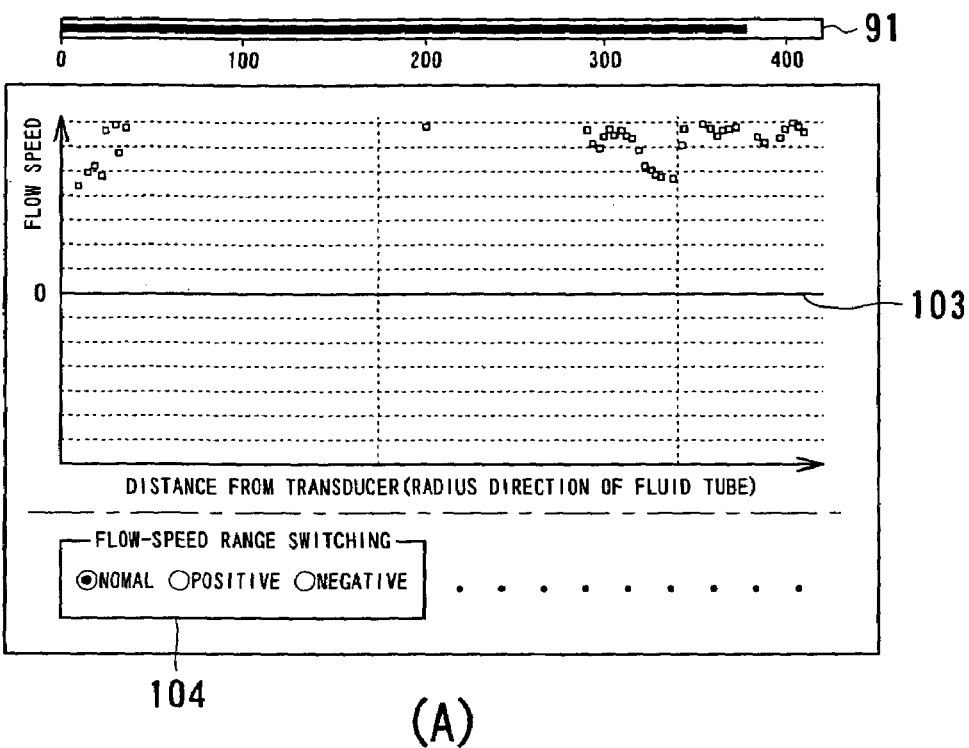
FIG. 25(A) and FIG. 25(B) are diagrams which show examples of screens displayed on a display monitor, respectively displaying the relation between the flow-speed distribution data of the fluid to be measured, which has been output from the flow-speed distribution output member, and the distance in the measurement line ML, with the doppler ultrasonic flowmeter according to the tenth embodiment of the present invention.
Figure 25:
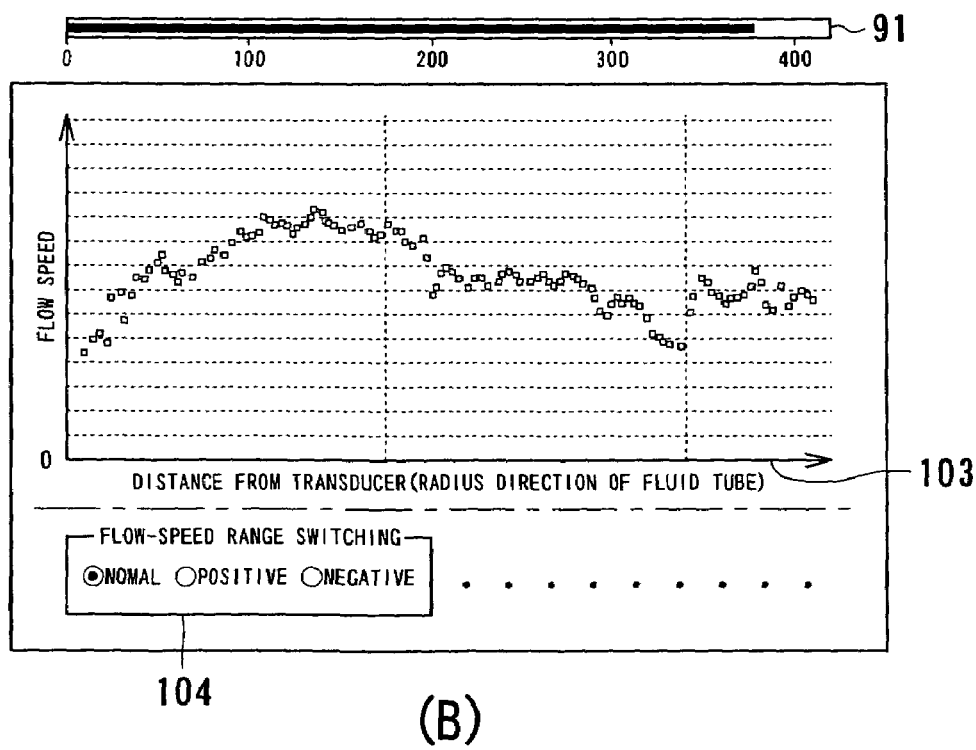

FIG. 25 shows examples of graphic images displayed on the display monitor 39 by the flow-speed distribution output member 99 of the doppler ultrasonic flowmeter 10E, which show the relations between the flow-speed distribution data of the fluid 12 to be measured, which has been output from the flow-speed distribution calculating member 67, and the distance in the direction of the measurement line ML.

Note that FIG. 25(A) shows the state where the flow-speed measurement range switching member 101 has not switched the measurement mode to the double-range mode for measuring the flow speed in the positive measurement range alone, i.e., the state in the normal range mode. On the other hand, FIG. 25(B) shows the state where the flow-speed measurement range switching member 101 has switched the measurement mode to the double-range mode for measuring the flow speed in the positive measurement range alone.

In FIG. 25(A), the flow-speed distribution concentrates on the upper portion (in the positive range of the flow speed) as to the flow-speed zero line 103, and a part of the points which represents the flow-speed distribution at the corresponding position of the tube 11 exhibits greater flow speed than the maximum flow speed which can be measured at the normal range mode. In this case, upon the user selecting (clicking) the a "positive" radio button of a flow-speed range switching GUI 104 so as to switch a "normal" radio button to the "positive" radio button, the flow-speed measurement range switching member 101 switches the measurement range to the double-measurement-range.

Upon switching of the flow-speed-measurement range to the double-measurement-range, the flow-speed zero line 103 matches the horizontal axis, and the flow-speed distribution is not displayed in the negative range, but is displayed in the positive range with a flow-speed measurement range twice that of the normal measurement range, as shown in FIG. 25(B). Note that FIG. 25(B) shows an example wherein the flow-speed distribution is displayed over all the positions of the tube 11 as a result of switching of the flow-speed measurement range to the double-measurement-range.

Figure 26:
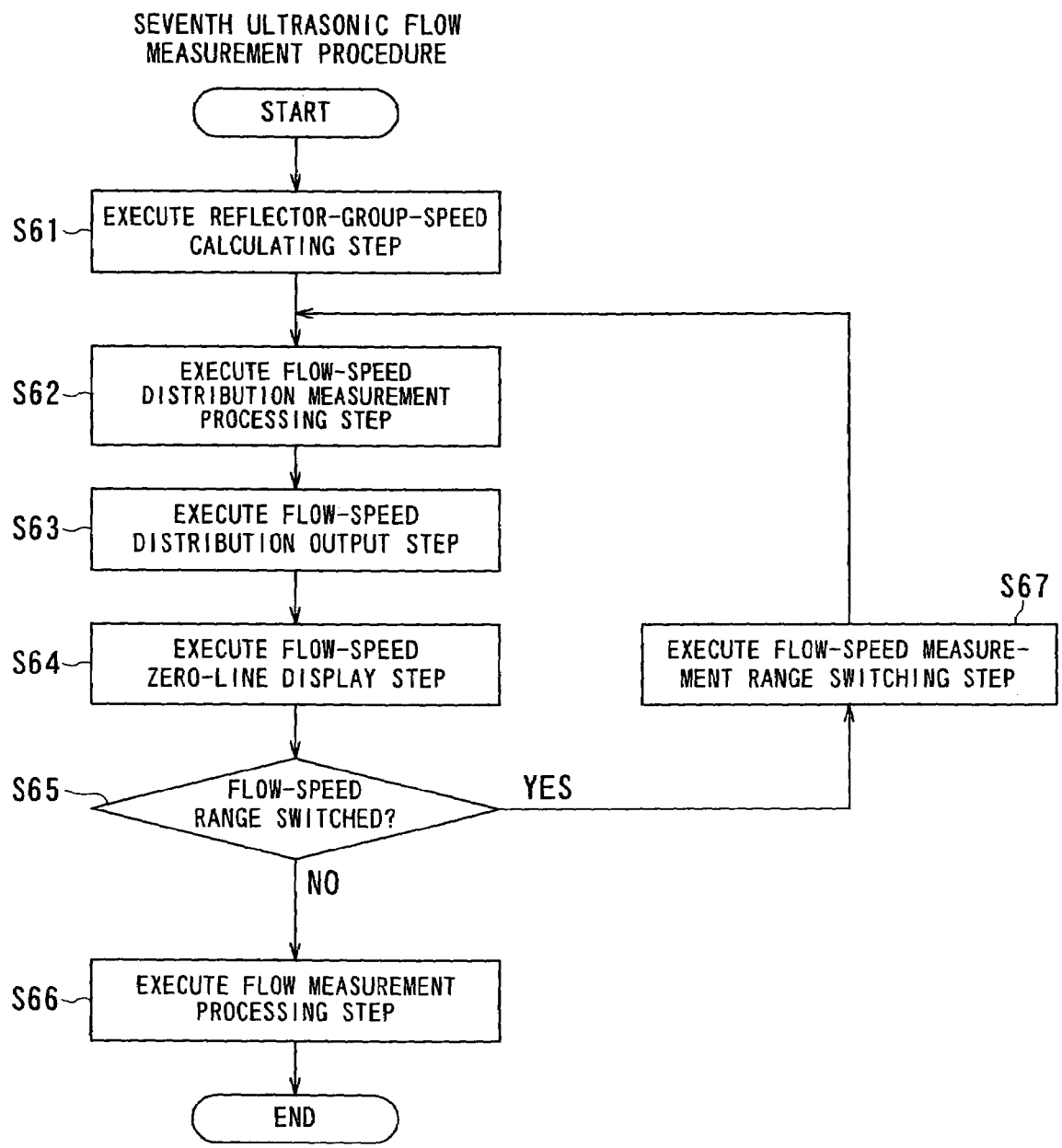
FIG. 26 is an explanatory diagram for making description step by step regarding the processing procedure of ultrasonic flow measurement with the doppler ultrasonic flowmeter according to the tenth embodiment of the present invention.

FIG. 26 is an explanatory diagram for making description step by step regarding the ultrasonic flow measurement procedure (which is denoted by "seventh ultrasonic flow measurement procedure" in FIG. 26), i.e., the ultrasonic flow measurement method employed for the doppler ultrasonic flowmeter 10F.

As shown in FIG. 26, the ultrasonic flow measurement procedure performed by the doppler ultrasonic flowmeter 10F comprises: a reflector-group-speed calculating step (Step S61); a flow-speed distribution measurement processing step (Step S62); a flow-speed distribution output step (Step S63) for outputting the relation between the flow-speed distribution of the fluid 12 to be measured and the distance in the direction of the measurement line ML in the form of an image on a screen; a flow-speed zero-line display step (Step S64) for superimposing the flow-speed zero line 103 on the flow-speed distribution displayed on the screen in the flow-speed distribution output step; a flow-speed measurement range switching determination step (Step S65) which allows the user to determine whether or not the flow-speed measurement range is switched; a flow measurement processing step (Step S66); and a flow-speed measurement range switching step (Step S67) for switching the measurement mode between the normal range mode and the double-range mode which allows the measurement of the positive flow speed with a flow-speed measurement range twice that of the normal range.

The reflector-group-speed calculating step (Step S61) has the same configuration as that of the reflector-group-speed calculating step (Step S1) shown in FIG. 8. Upon completion of the reflector-group-speed calculating step (Step S61), the flow proceeds to the flow-speed distribution measurement processing step (Step S62).

In the flow-speed distribution measurement processing step (step S62), the system performs the same processing as in the flow-speed distribution measurement processing step (step S2). Upon completion of the flow-speed distribution measurement processing step (Step S62), the flow proceeds to the flow-speed distribution output step (Step S63), where the flow-speed distribution output member 99 outputs the relation between the flow-speed distribution of the fluid 12 to be measured and the distance in the direction of the measurement line ML in the form of an image on the display monitor 39 as shown in FIG. 25.

Upon completion of the flow-speed distribution output step, the flow proceeds to the flow-speed zero-line display step (Step S64), where the flow-speed zero-point display member 100 superimposes the flow-speed zero line 103 on the flow-speed distribution displayed on the screen in the flow-speed distribution output step. Upon completion of the flow-speed zero-line display step (Step S64), the flow proceeds to the flow-speed measurement range switching determination step (Step S65), where the flow-speed measurement range switching member 101 displays a GUI on the display monitor 39, which allows the user to determine whether or not the flow-speed measurement range switching member 101 switches the flow-speed range.

The user determines whether or not the flow-speed measurement range switching member 101 switches the flow-speed range, through the GUI displayed on the display monitor 39 by operating the input member 38 of the computer 14. In the event that the user has given instructions to the flow-speed measurement range switching member 101 that the flow-speed range is not switched, through the input member 38 (in a case of "NO" in Step S65), the flow proceeds to the flow measurement processing step (Step S66). The flow measurement processing step (Step S66) has the same configuration as that of the flow measurement processing step (Step S6 and Step S7) shown in FIG. 8. Upon completion of Step S66, i.e., the flow measurement processing step, the ultrasonic flow measurement procedure ends.

On the other hand, in the event that the user has given instructions to the flow-speed measurement range switching member 101 that the flow-speed range is switched, through the input member 38 (in a case of "YES" in Step S65), the flow proceeds to the flow-speed measurement range switching step (Step S67). In the flow-speed measurement range switching step (Step S67), the flow-speed measurement range switching member 101 switches the flow-speed measurement range between the normal measurement range and the double-measurement-range for measuring the positive flow speed. Upon completion of the flow-speed measurement range switching step, the flow proceeds to Step S65. Then, the system performs the processing steps following Step S65.

As described above, the doppler ultrasonic flowmeter 10F according to the present embodiment, the flow measurement method using the doppler ultrasonic flowmeter 10F, and the flow measurement program employed for the doppler ultrasonic flowmeter 10F, allow the user to switch the flow-speed measurement range between the normal measurement range and the double-measurement-range, thereby enabling flow measurement in an extended flow-speed measurement range twice that of the normal measurement range, as necessary.

While description has been made regarding an arrangement wherein the doppler ultrasonic flowmeter 10F includes the flow-speed measurement range switching member 101 having a function for switching the flow-speed measurement range between the normal measurement range and the double-measurement-range, thereby enabling measurement of the positive flow speed in an extended flow-speed measurement range twice that of the normal measurement range, it is needless to say that an arrangement may be made wherein the doppler ultrasonic flowmeter 10F has a function for switching the flow-speed measurement range between the normal measurement range and the double-measurement-range, thereby enabling measurement of the negative flow speed in an extended flow-speed measurement range twice that of the normal measurement range. In this case, the user should select a "negative" radio button of the flow-speed range switching GUI 104 shown in FIG. 25.

Note that while description has been made regarding an arrangement wherein the present embodiment is applied to the doppler ultrasonic flowmeter 10 shown in FIG. 1, having a configuration wherein the computer 14 reads out and executes the flow measurement PG 41G stored in the storage member 37, whereby a combination of the Udflow unit 13, i.e., a hardware component unit, and the flow measurement PG 41G, i.e., a software component, has the functions serving as the doppler ultrasonic flowmeter 10F, the present embodiment may be applied to the doppler ultrasonic flowmeter 50 or the doppler ultrasonic flowmeter 60.

Eleventh Embodiment

Figure 27:
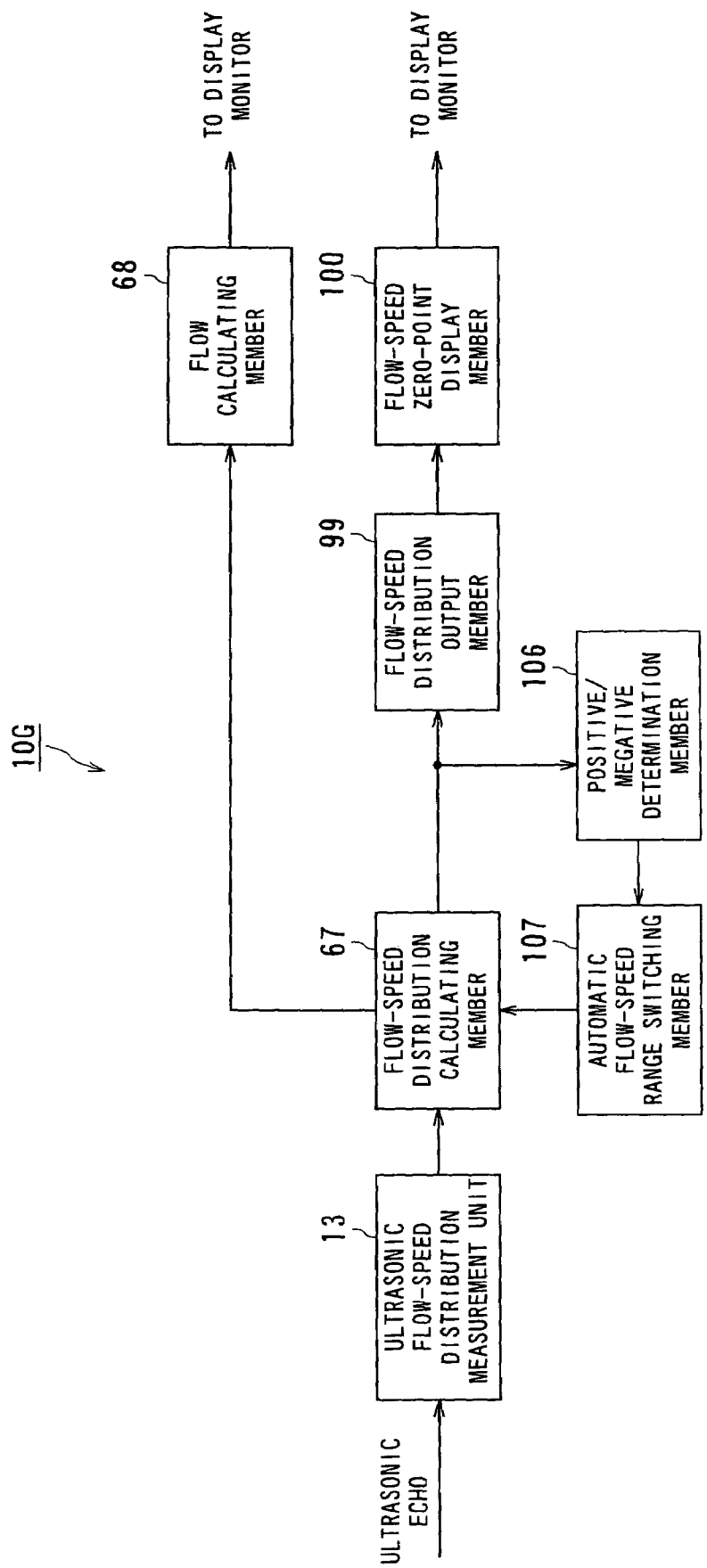
FIG. 27 is a functional block diagram of a doppler ultrasonic flowmeter according to an eleventh embodiment of the present invention.

FIG. 27 is a functional block diagram of a doppler ultrasonic flowmeter 10G according to an eleventh embodiment of the present invention.

The doppler ultrasonic flowmeter 10G shown in FIG. 27 has generally the same configuration as that of the doppler ultrasonic flowmeter 10 shown in FIG. 1, wherein the computer 14 reads out and executes a flow measurement PG 41H stored in the storage member 37, whereby a combination of the Udflow unit 13, i.e., a hardware component unit, and a flow measurement PG 41H, i.e., a software component, has the functions serving as the doppler ultrasonic flowmeter.

As shown in FIG. 27, the doppler ultrasonic flowmeter 10G has the same configuration as that of the ultrasonic flowmeter 10F shown in FIG. 24, except for a configuration including a positive/negative determination member 106 for determining whether or not the calculated flow-speed distribution of the fluid 12 to be measured contains any negative flow speed components, and an automatic flow-speed range switching member 107 for switching the flow-speed measurement range to the double-measurement-range mode which allows measurement of the positive flow speed with a flow-speed measurement range twice that of the normal measurement range mode in the event that determination has been made that the calculated flow-speed distribution contains no negative flow speed components, instead of the flow-speed measurement range switching member 107.

Note that the present embodiment has the same configuration wherein the Udflow unit 13 serving as the flow-speed data acquisition member 18 and the flow-speed distribution calculating member 67 form the flow-speed distribution measurement unit, and the Udflow unit 13, the flow-speed distribution calculating member 67, and the flow calculating member 68, form the flow measurement unit.

The positive/negative determination member 106 determines whether or not the flow-speed distribution of the fluid 12 to be measured, which has been calculated by the flow-speed distribution calculating member 67, contains any negative flow speed components. The automatic flow-speed range switching member 107 switches the flow-speed measurement range to twice the measurement range of the normal measurement range mode, for measuring the positive flow speed in the event that the positive/negative determination member 106 has determined that the calculated flow-speed distribution contains no negative flow speed components, without instructions from the user whether or not the flow-speed measurement range is switched.

Figure 28:
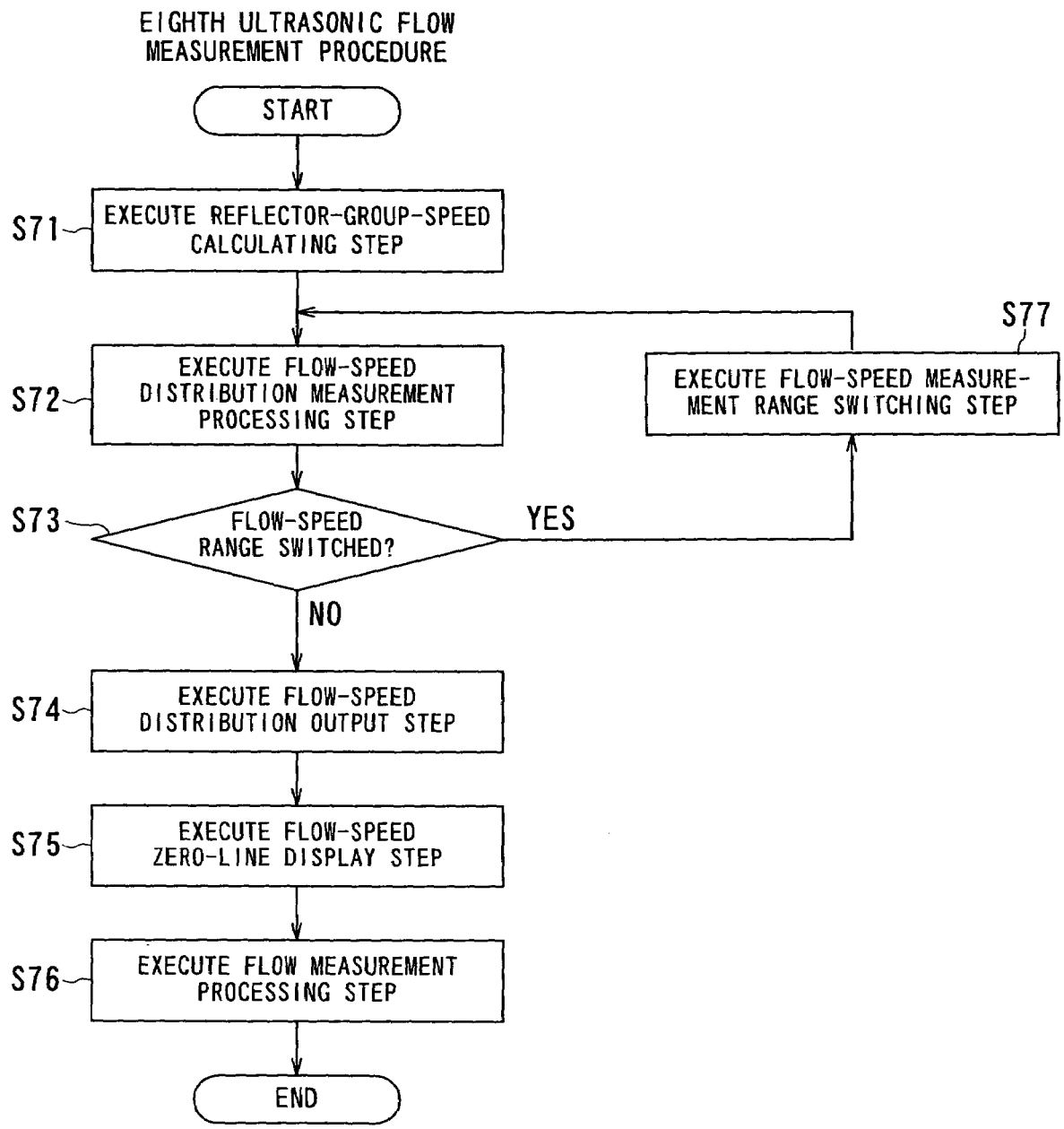
FIG. 28 is an explanatory diagram for making description step by step regarding the processing procedure of ultrasonic flow measurement with the doppler ultrasonic flowmeter according to the eleventh embodiment of the present invention.

FIG. 28 is an explanatory diagram for making description step by step regarding the ultrasonic flow measurement procedure (which is denoted by "eighth ultrasonic flow measurement procedure" in FIG. 28), i.e., the ultrasonic flow measurement method employed for the doppler ultrasonic flowmeter 10G.

As shown in FIG. 28, the ultrasonic flow measurement procedure performed by the doppler ultrasonic flowmeter 10G comprises: a reflector-group-speed calculating step (Step S71); a flow-speed distribution measurement processing step (Step S72); a flow-speed range switching determination step (Step S73 and Step S74) for determining whether or not the flow-speed measurement range is switched; a flow-speed distribution output step (Step S75); a flow-speed zero-line display step (Step S76); a flow measurement processing step (Step S77); and a flow-speed measurement range switching step (Step S78).

With the ultrasonic flow measurement procedure performed by the doppler ultrasonic flowmeter 10G, first, the flow proceeds to the reflector-group-speed calculating step (Step S71), and the flow-speed distribution measurement processing step (Step S72). Note that the reflector-group-speed calculating step (Step S71) and the flow-speed distribution measurement processing step (Step S72) have the same configurations as with the reflector-group-speed calculating step (Step S61) and the flow-speed distribution measurement processing step (Step S62) shown in FIG. 26, respectively.

Upon completion of the reflector-group-speed calculating step (Step S71) and the flow-speed distribution measurement processing step (Step S72), the flow proceeds to the flow-speed range switching determination step (Step S73), where the positive/negative determination member 106 determines whether or not the flow-speed measurement range is switched.

In the flow-speed range switching determination step (Step S73), the positive/negative determination member 106 determines whether or not the flow-speed distribution of the fluid 12 to be measured, which has been calculated by the flow-speed distribution calculating member 67, contains any negative flow speed components. In the event that determination has been made that the flow-speed distribution contains the negative flow speed components (in a case of "NO" in Step S73), the system does not switch the flow-speed measurement range, following which the flow proceeds to the flow-speed distribution output step (Step S74), the flow-speed zero-line display step (Step S75), and the flow measurement processing step (Step 76).

Note that the flow-speed distribution output step (Step S74), the flow-speed zero-line display step (Step S75), and the flow measurement processing step (Step S76), have the same configurations as with the flow-speed distribution output step (Step S63), the flow-speed zero-line display step (Step S64), and the flow measurement processing step (Step S66), shown in FIG. 26, respectively. Upon completion of the flow-speed distribution output step (Step S74), the flow-speed zero-line display step (Step S75), and the flow measurement processing step (Step S76), the ultrasonic flow measurement procedure performed by the doppler ultrasonic flowmeter 10G ends.

On the other hand, in the event that determination has been made that the flow-speed distribution does not contain the negative flow speed components in the flow-speed range switching determination step (Step S73), (in a case of "YES" in Step S73), the positive/negative determination member 106 requests the automatic flow-speed range switching member 107 to switch the flow-speed measurement range. Then, the flow proceeds to Step S77, i.e., the flow-speed measurement range switching step.

Note that Step S77, i.e., the flow-speed measurement range switching step has the same configuration as that of the flow-speed measurement range switching step (Step S67) shown in FIG. 26. In Step S77, i.e., the flow-speed measurement range switching step, the automatic flow-speed range switching member 107 switch the flow-speed measurement range between the normal measurement range and the double-measurement-range which allows the measurement of the positive flow speed in a flow-speed measurement range twice that of the normal measurement range mode. Upon completion of the flow-speed measurement range switching step (Step S77), the flow proceeds to Step S72. Then, the system performs the processing steps following the Step S72.

As described above, the doppler ultrasonic flowmeter 10G according to the present embodiment, the flow measurement method using the doppler ultrasonic flowmeter 10G, and the flow measurement program employed for the doppler ultrasonic flowmeter 10G, allow the user to switch the flow-speed measurement range between the normal measurement range and the double-measurement-range, thereby enabling flow measurement in an extended flow-speed measurement range twice that of the normal measurement range, as necessary.

While description has been made regarding an arrangement wherein the doppler ultrasonic flowmeter 10G includes the automatic flow-speed range switching member 107 having a function for switching the flow-speed measurement range between the normal measurement range and the double-measurement-range, thereby enabling measurement of the positive flow speed in an extended flow-speed measurement range twice that of the normal measurement range, it is needless to say that an arrangement may be made wherein the doppler ultrasonic flowmeter 10G has a function for switching the flow-speed measurement range between the normal measurement range and the double-measurement-range, thereby enabling measurement of the negative flow speed in an extended flow-speed measurement range twice that of the normal measurement range. In this case, an arrangement may be made wherein in the event that the positive/negative determination member 106 has determined that the flow-speed distribution contains no positive flow-speed components, the positive/negative determination member 106 requests the automatic flow-speed range switching member 107 to switch the flow-speed measurement range to twice the flow-speed range of the normal measurement range mode, for measuring the negative flow, thereby enabling measurement of a backward flow in a flow-speed measurement range twice that of the normal measurement range mode.

Note that while description has been made regarding an arrangement wherein the present embodiment is applied to the doppler ultrasonic flowmeter 10 shown in FIG. 1, having a configuration wherein the computer 14 reads out and executes the flow measurement PG 41H stored in the storage member 37, whereby a combination of the Udflow unit 13, i.e., a hardware component unit, and the flow measurement PG 41H, i.e., a software component, has the functions serving as the doppler ultrasonic flowmeter 10G, the present embodiment may be applied to the doppler ultrasonic flowmeter 50 or the doppler ultrasonic flowmeter 60.

While description has been made regarding an arrangement wherein the doppler ultrasonic flowmeter 10G includes the automatic flow-speed range switching member 107, instead of the flow-speed measurement range switching member 101, an arrangement may be made wherein the doppler ultrasonic flowmeter 10G includes both the automatic flow-speed range switching member 107 and the flow-speed measurement range switching member 101. The doppler ultrasonic flowmeter 10G having such a configuration allows the user to switch the flow-speed measurement range through manual switching according to a request from the user and automatic switching.

Furthermore, the doppler ultrasonic flowmeter 10G including both the flow-speed measurement range switching member 101 and the automatic flow-speed range switching member 107 allows the user to manually switch the flow-speed measurement range if the automatic flow-speed range switching member 107 makes undesirable switching of the flow-speed measurement range, thereby improving use of ease as compared with the doppler ultrasonic flowmeter 10G including the automatic flow-speed range switching member 107 alone.

Note that the doppler ultrasonic flowmeter according to any one of the embodiments described above according to the present invention has a configuration wherein the flow-speed distribution of the fluid 12 to be measured is obtained beforehand for obtaining the flow, accordingly, the doppler ultrasonic flowmeter according to the present invention has the functions serving as a flow-speed distribution meter as well as a flowmeter. Furthermore, with the doppler ultrasonic flowmeter according to the present invention, an arrangement may be made wherein the measurement results of the flow-speed distribution and the flow are displayed on a single screen as shown in FIG. 9, or an arrangement may be made wherein the measurement results of the flow-speed distribution and the flow are displayed on separate screens.

On the other hand, the flow measurement PG 41 employed for the doppler ultrasonic flowmeter 10 according to the present invention is not restricted to a single program, rather, an arrangement may be made wherein separate programs form the flow measurement PG 41 as long as the computer 14 can execute all the procedures of the flow measurement PG 41.

Furthermore, an arrangement may be made wherein the flow measurement program 41 or the like is stored in a recording medium for being distributed to the users. Note that the "recording medium" used here means a medium for storing an intangible program, and examples thereof include: a flexible disk; a hard disk; a CD-ROM; an MO (magnet-optical disk); a DVD-ROM; and a PD; and so forth.

Furthermore, the program such as the flow measurement PG 41 or the like stored in the storage member 37 of the computer 14 may be transmitted/received to/from other computers electrically connected to the I/F member 40 through an electric communication line. That is to say, a desired program can be transmitted to the other computers from the computer 14. Conversely, a desired program can be preinstalled or downloaded to the computer 14 from the other computer storing the desired program.

INDUSTRIAL APPLICABILITY

The present invention provides a doppler ultrasonic flowmeter, a flow measurement method using the doppler ultrasonic flowmeter, and a flow measurement program employed for the doppler ultrasonic flowmeter, having the advantage of enabling more correct measurement of the flow-speed distribution and more correct measurement of the flow even if the measured flow-speed distribution exhibits unignorable irregularities.

Furthermore, the present invention provides a doppler ultrasonic flowmeter, a flow measurement method using the doppler ultrasonic flowmeter, and a flow measurement program employed for the doppler ultrasonic flowmeter, having the advantage of automatically calculating the optimum value used for adjustment of measurement, which depends upon the properties of the object to be measured.

Furthermore, the present invention provides a doppler ultrasonic flowmeter, a flow measurement method using the doppler ultrasonic flowmeter, and a flow measurement program employed for the doppler ultrasonic flowmeter, having the advantage of extending the measurement range without extending the performance of the hardware component.

Furthermore, the present invention provides a doppler ultrasonic flowmeter, a flow measurement method using the doppler ultrasonic flowmeter, and a flow measurement program employed for the doppler ultrasonic flowmeter, having the advantage of extending the flow-speed measurement range in the event that determination has been made that the flow-speed distribution contains no negative flow-speed components, as well as determining whether or not the flow-speed distribution contains any negative flow-speed components.

[Definition of Term]

The "flow measurement unit" used in this specification is unit for making calculation as represented by the following Expression.

[Expression 2]

$$m(t) = \rho \int v(x, t) dA \quad (1)$$

wherein ρ represents the density of the fluid to be measured, v(x, t) represents the velocity component (x direction) at the point in time t, and A represents the cross-sectional area through which the fluid to be measured passes (cross-sectional area of the tube).

Furthermore, the flow m(t) which flows within the fluid tube at the point in time t is represented by the following Expression by transforming the Expression (1) described above.

[Expression 3]

$$m(t) = \rho \int \int vx(r, \theta, t) r \, dr \, d\theta \quad (2)$$

wherein v(r, θ, t) represents the velocity component at the point in time t, with a distance of r and an angle of θ, with the center of the cross-section of the tube as the center of the polar coordinate system.

The invention claimed is:

1. A doppler ultrasonic flowmeter comprising:
an ultrasonic transmission member for casting ultrasonic pulses with a predetermined frequency onto the fluid within a fluid tube, which is to be measured, along a measurement line from an ultrasonic transducer;
a flow-speed distribution measurement unit for receiving ultrasonic echoes reflected from the measurement region due to ultrasonic pulses cast onto the fluid to be measured so as to measure the flow-speed distribution of the fluid to be measured in the measurement region;
a flow measurement unit for measuring the flow of the fluid to be measured in the measurement region based upon the flow-speed distribution of the fluid to be measured; and
a transducer position adjusting mechanism for adjusting the relative position of a pair of ultrasonic transducers serving as the ultrasonic transmission member, i.e., a first transducer and a second transducer, which are disposed away one from another along the axial direction of a fluid tube,
wherein said transducer position adjusting mechanism has a configuration for adjusting the position of the pair of transducers while maintaining the positional relation thereof such that the ultrasonic pulse beam cast from the first transducer and the ultrasonic pulse beam cast from the second transducer are orthogonal one to another in the measurement region within the fluid tube.

2. A doppler ultrasonic flowmeter according to claim 1, further comprising:
a first reflected-wave receiver and a second reflected-wave receiver for receiving ultrasonic echoes, i.e., the reflected waves from the measurement region of the fluid tube due to ultrasonic pulses cast from the first transducer and the second transducer;
a velocity-vector calculating member for calculating the velocity vectors in the direction of the ultrasonic measurement lines of the first reflected-wave receiver and the second reflected-wave receiver based upon the magnitude of ultrasonic echoes received by the first reflected-wave receiver and the second reflected-wave receiver, respectively; and
a flow-speed vector calculating member for calculating the flow-speed vector of the fluid to be measured, by calculating the vector sum of the velocity vectors calculated by the velocity vector calculating member,
wherein said flow-speed distribution measurement unit calculates flow-speed distribution based upon the flow-speed vectors, and
wherein said flow measurement unit computes the flow of the fluid to be measured, based upon the flow-speed distribution.

3. An ultrasonic flow measurement method comprising:
a reflector-group-speed calculating step for receiving ultrasonic echoes due to
ultrasonic pulses cast onto the fluid to be measured, so as to calculate the speed of each of a number of reflector groups contained in the fluid to be measured;
a flow-speed distribution measurement processing step for measuring the flow-speed distribution of the fluid to be measured, based upon the flow-speed distribution data of the reflector groups obtained in the reflector-group-speed calculating step; and
a flow measurement processing step for measuring the flow by further performing computation processing for the flow-speed distribution data of the fluid to be measured,
wherein said flow-speed distribution measurement processing step comprises:
a flow-speed distribution calculating step for calculating the flow-speed distribution data of the fluid to be measured, and the center position data of the fluid tube, by performing computation processing for the flow-speed distribution of the reflectors;
a flow-speed distribution data output step for outputting the flow-speed distribution data and center position data thus obtained in the flow-speed distribution calculating step so as to be displayed on display; and
an area determination step which allows the user to set a division area where the speed of the reflector groups is calculated in the flow-speed distribution calculating step; the area of the fluid tube being divided at the center position into two division areas.

4. An ultrasonic flow measurement method comprising:
a reflector-group-speed calculating step for receiving ultrasonic echoes due to ultrasonic pulses cast onto the fluid to be measured, so as to calculate the speed of each of a number of reflector groups contained in the fluid to be measured;
a flow-speed distribution measurement processing step for measuring the flow-speed distribution of the fluid to be measured, based upon the flow-speed distribution data of the reflector groups obtained in the reflector-group-speed calculating step; and
a flow measurement processing step for measuring the flow by further performing computation processing for the flow-speed distribution data of the fluid to be measured,
wherein said flow-speed distribution measurement processing step comprises:
a flow-speed distribution calculating step for calculating the flow-speed distribution data of the fluid to be measured, and the center position data of the fluid tube, by performing computation processing for the flow-speed distribution of the reflectors;
an automatic area selecting step for automatically selecting a division area where the flow-speed distribution is calculated using the reflector groups; the area of the fluid tube being divided at the center position into two division areas; and a flow-speed distribution data output step for outputting the flow-speed distribution data and the center position data obtained in the flow-speed distribution calculating step and the automatic area selecting step, so as to be displayed on display.

5. An ultrasonic flow measurement method comprising:

a reflector-group-speed calculating step for receiving ultrasonic echoes due to ultrasonic pulses cast onto the fluid to be measured, so as to calculate the speed of each of a number of reflector groups contained in the fluid to be measured;

a flow-speed distribution measurement processing step for measuring the flow-speed distribution of the fluid to be measured, based upon the flow-speed distribution data of the reflector groups obtained in the reflector-group-speed calculating step;

an optimum-value setting step for calculating the optimum values of the basic frequency $f_0$, the pulse repetition frequency $f_{PRF}$, and the incident angle $\alpha$; and a flow measurement processing step for measuring the flow by further performing computation processing for the flow-speed distribution data of the fluid to be measured, wherein said reflector-group-speed calculating step comprises:

an initial value acquisition step for receiving the initial values of the basic frequency $f_0$, the pulse repetition frequency $f_{PRF}$, the incident angle $\alpha$, at the start of measurement; and a reflector-group-speed calculating step for receiving ultrasonic echoes due to ultrasonic pulses cast onto the fluid to be measured, so as to calculate the speed of each of the number of reflectors contained in the fluid to be measured, and wherein said optimum-value setting step includes an emission frequency reset step for resetting the emission frequency to an emission frequency $f_1$ so as to satisfy the following expressions: $F_0 \geq 4V_0 \cdot \sin \alpha$; and $f_{PRF} \leq Cw/2Di$.

6. An ultrasonic flow measurement method comprising:

a reflector-group-speed calculating step for receiving ultrasonic echoes due to ultrasonic pulses cast onto the fluid to be measured, so as to calculate the speed of each of a number of reflector groups contained in the fluid to be measured;

a flow-speed distribution measurement processing step for measuring the flow-speed distribution of the fluid to be measured, based upon the flow-speed distribution data of the reflector groups obtained in the reflector-group-speed calculating step;

an optimum-value setting step for calculating the optimum values of the basic frequency $f_0$, the pulse repetition frequency $f_{PRF}$, and the incident angle $\alpha$; and a flow measurement processing step for measuring the flow by further performing computation processing for the flow-speed distribution data of the fluid to be measured, wherein said reflector-group-speed calculating step comprises:

an initial value acquisition step for receiving the initial values of the basic frequency $f_0$, the pulse repetition frequency $f_{PRF}$, the incident angle $\alpha$, at the start of measurement; and a reflector-group-speed calculating step for receiving ultrasonic echoes due to ultrasonic pulses cast onto the fluid to be measured, so as to calculate the speed of each of the number of reflectors contained in the fluid to be measured, wherein said optimum-value setting step includes an incident angle reset step for resetting the incident angle to $\alpha 1$ so as to satisfy the following expressions: $F_0 \geq 4V_0 \cdot \sin \alpha$; and $f_{PRF} \leq Cw/2Di$.

7. An ultrasonic flow measurement method comprising:

a reflector-group-speed calculating step for receiving ultrasonic echoes due to ultrasonic pulses cast onto the fluid to be measured, so as to calculate the speed of each of a number of reflector groups contained in the fluid to be measured;

a flow-speed distribution measurement processing step for measuring the flow-speed distribution of the fluid to be measured, based upon the flow-speed distribution data of the reflector groups obtained in the reflector-group-speed calculating step;

a channel distance computing step for computing the minimum channel distance based upon the frequency of the ultrasonic pulses and the speed thereof;

a measurement range display steps for displaying a GUI which allows the user to determine whether or not the channel distance is set to a value obtained by multiplying the minimum channel distance by an integer, thereby allowing the user to set the measurement region to a value obtained by multiplying the minimum measurement region by an integer;

a channel distance changing step for changing the channel distance to a value obtained by multiplying the minimum channel distance by an integer, according to instructions of the user; and a flow measurement processing step for measuring the flow by further performing computation processing for the flow-speed distribution data of the fluid to be measured.

8. An ultrasonic flow measurement method comprising:

a reflector-group-speed calculating step for receiving ultrasonic echoes due to ultrasonic pulses cast onto the fluid to be measured, so as to calculate the speed of each of a number of reflector groups contained in the fluid to be measured;

a flow-speed distribution measurement processing step for measuring the flow-speed distribution of the fluid to be measured, based upon the flow-speed distribution data of the reflector groups obtained in the reflector-group-speed calculating step;

a channel distance computing step for computing the minimum channel distance based upon the frequency of the ultrasonic pulses and the speed thereof;

a measurement range calculating step for calculating the measurement range based upon the minimum channel distance thus computed;

a channel distance changing step having a function for determining whether or not the channel distance is to be set to a value obtained by multiplying the minimum channel distance by an integer, thereby allowing the system to automatically change the channel distance; and a flow measurement processing step for measuring the flow by further performing computation processing for the flow-speed distribution data of the fluid to be measured.

9. An ultrasonic flow measurement method comprising:

a reflector-group-speed calculating step for receiving ultrasonic echoes due to ultrasonic pulses cast onto the fluid to be measured, so as to calculate the speed of each of a number of reflector groups contained in the fluid to be measured;

a flow-speed distribution measurement processing step for measuring the flow-speed distribution of the fluid to be measured, based upon the flow-speed distribution data of the reflector groups obtained in the reflector-group-speed calculating step;

a flow-speed distribution output step for outputting the relation between the flow-speed distribution of the fluid to be measured and the distance in the direction of the measurement line ML, in the form of an image on a screen;

a flow-speed zero-line display step for superimposing a fluid-speed zero line on the flow-speed distribution output in the form of an image on a screen in the flow-speed distribution output step;

a flow-speed measurement range switching determination step which allows the user to determine whether or not the flow-speed measurement range is switched;

a flow-speed measurement range switching step for switching the flow-speed measurement range to twice that of the normal measurement range, for measuring the positive flow speed according to the instructions of the user; and a flow measurement processing step for measuring the flow by further performing computation processing for the flow-speed distribution data of the fluid to be measured.

10. An ultrasonic flow measurement method comprising:

a reflector-group-speed calculating step for receiving ultrasonic echoes due to ultrasonic pulses cast onto the fluid to be measured, so as to calculate the speed of each of a number of reflector groups contained in the fluid to be measured;

a flow-speed distribution measurement processing step for measuring the flow-speed distribution of the fluid to be measured, based upon the flow-speed distribution data of the reflector groups obtained in the reflector-group-speed calculating step;

a flow-speed range switching determination step which allows the user to determine whether or not the flow-speed measurement range is switched;

a flow-speed distribution output step for outputting the relation between the flow-speed distribution of the fluid to be measured, and the distance in the direction of the measurement line ML, in the form of an image on a screen;

a flow-speed zero-line display step for superimposing a flow-speed zero line on the flow-speed distribution output in the form of an image on a screen in the flow-speed distribution output step;

a flow-speed measurement range switching step for switching the flow-speed measurement range to twice that of the normal measurement mode according to the instructions of the user for measuring the positive flow speed; and a flow measurement processing step for measuring the flow by further performing computation processing for the flow-speed distribution data of the fluid to be measured.

11. A computer readable medium having instructions encoded therein that when executed by a processor in an ultrasonic flowmeter perform steps comprising:

a reflector-group-speed calculating step for receiving ultrasonic echoes due to ultrasonic pulses cast onto the fluid to be measured, so as to calculate the speed of each of a number of reflector groups contained in the fluid to be measured;

a flow-speed distribution measurement processing step for measuring the flow-speed distribution of the fluid to be measured, based upon the flow-speed distribution data of the reflector groups obtained in the reflector-group-speed calculating step;

a flow measurement processing step for measuring the flow by further performing computation processing for the flow-speed distribution data of the fluid to be measured, wherein said flow-speed distribution measurement processing step comprises:

a flow-speed distribution calculating step for calculating the flow-speed distribution data of the fluid to be measured, and the center position data of the fluid tube, by performing computation processing for the flow-speed distribution of the reflectors;

a flow-speed distribution data output step for outputting the flow-speed distribution data and center position data thus obtained in the flow-speed distribution calculating step so as to be displayed on display; and an area determination step which allows the user to set a division area where the speed of the reflector groups is calculated in the flow-speed distribution calculating step; the area of the fluid tube being divided at the center position into two division areas, and said reflector-group-speed calculating step, said flow-speed distribution measurement processing step, and said flow measurement processing step being executed by the processor.

12. A computer readable medium having instructions encoded therein that when executed by a processor in an ultrasonic flowmeter perform steps comprising:

a reflector-group-speed calculating step for receiving ultrasonic echoes due to ultrasonic pulses cast onto the fluid to be measured, so as to calculate the speed of each of a number of reflector groups contained in the fluid to be measured;

a flow-speed distribution measurement processing step for measuring the flow-speed distribution of the fluid to be measured, based upon the flow-speed distribution data of the reflector groups obtained in the reflector-group-speed calculating step; and a flow measurement processing step for measuring the flow by further performing computation processing for the flow-speed distribution data of the fluid to be measured, wherein said flow-speed distribution measurement processing step comprises:

a flow-speed distribution calculating step for calculating the flow-speed distribution data of the fluid to be measured, and the center position data of the fluid tube, by performing computation processing for the flow-speed distribution of the reflectors;

an automatic area selecting step for automatically selecting a division area where the flow-speed distribution is calculated using the reflector groups; the area of the fluid tube being divided at the center position into two division areas; and a flow-speed distribution data output step for outputting the flow-speed distribution data and the center position data obtained in the flow-speed distribution calculating step and the automatic area selecting step, so as to be displayed on display, and said reflector-group-speed calculating step, said flow-speed distribution measurement processing step, and said flow measurement processing step being executed by the processor.

13. A computer readable medium having instructions encoded therein that when executed by a processor in an ultrasonic flowmeter perform steps comprising:

a reflector-group-speed calculating step for receiving ultrasonic echoes due to ultrasonic pulses cast onto the fluid to be measured, so as to calculate the speed of each of a number of reflector groups contained in the fluid to be measured;

a flow-speed distribution measurement processing step for measuring the flow-speed distribution of the fluid to be measured, based upon the flow-speed distribution data of the reflector groups obtained in the reflector-group-speed calculating step;

an optimum-value setting step for calculating the optimum values of the basic frequency $f_0$, the pulse repetition frequency $f_{PRF}$, and the incident angle $\alpha$; and a flow measurement processing step for measuring the flow by further performing computation processing for the flow-speed distribution data of the fluid to be measured, wherein said reflector-group-speed calculating step comprises:

an initial value acquisition step for receiving the initial values of the basic frequency $f_0$, the pulse repetition frequency $f_{PRF}$, the incident angle $\alpha$, at the start of measurement; and a reflector-group-speed calculating step for receiving ultrasonic echoes due to ultrasonic pulses cast onto the fluid to be measured, so as to calculate the speed of each of the number of reflectors contained in the fluid to be measured, and wherein said optimum-value setting step includes an emission frequency reset step for resetting the emission frequency to an emission frequency $f_1$ so as to satisfy the following expressions: $F_0 \geq 4V_0 \cdot \sin \alpha$; and $f_{PRF} \leq Cw/2Di$, and said reflector-group-speed calculating step, said flow-speed distribution measurement processing step, said optimum-value setting step, and said flow measurement processing step being executed by the processor.

14. A computer readable medium having instructions encoded therein that when executed by a processor in an ultrasonic flowmeter perform steps comprising:

a reflector-group-speed calculating step for receiving ultrasonic echoes due to ultrasonic pulses cast onto the fluid to be measured, so as to calculate the speed of each of a number of reflector groups contained in the fluid to be measured;

a flow-speed distribution measurement processing step for measuring the flow-speed distribution of the fluid to be measured, based upon the flow-speed distribution data of the reflector groups obtained in the reflector-group-speed calculating step;

an optimum-value setting step for calculating the optimum values of the basic frequency $f_0$, the pulse repetition frequency $f_{PRF}$, and the incident angle $\alpha$; and a flow measurement processing step for measuring the flow by further performing computation processing for the flow-speed distribution data of the fluid to be measured, wherein said reflector-group-speed calculating step comprises:

an initial value acquisition step for receiving the initial values of the basic frequency $f_0$, the pulse repetition frequency $f_{PRF}$, the incident angle $\alpha$, at the start of measurement; and a reflector-group-speed calculating step for receiving ultrasonic echoes due to ultrasonic pulses cast onto the fluid to be measured, so as to calculate the speed of each of the number of reflectors contained in the fluid to be measured, and wherein said optimum-value setting step includes an incident angle reset step for resetting the incident angle to $\alpha 1$ so as to satisfy the following expressions: $F_0 \geq 4V_0 \cdot \sin \alpha$; and $f_{PRF} Cw/2Di$, and said reflector-group-speed calculating step, said flow-speed distribution measurement processing step, said optimum-value setting step, and said flow measurement processing step being executed by the processor.

15. A computer readable medium having instructions encoded therein that when executed by a processor in an ultrasonic flowmeter perform steps comprising:

a reflector-group-speed calculating step for receiving ultrasonic echoes due to ultrasonic pulses cast onto the fluid to be measured, so as to calculate the speed of each of a number of reflector groups contained in the fluid to be measured;

a flow-speed distribution measurement processing step for measuring the flow-speed distribution of the fluid to be measured, based upon the flow-speed distribution data of the reflector groups obtained in the reflector-group-speed calculating step;

a channel distance computing step for computing the minimum channel distance based upon the frequency of the ultrasonic pulses and the speed thereof;

a measurement range display step for displaying a GUI which allows the user to determine whether or not the channel distance is set to a value obtained by multiplying the minimum channel distance by an integer, thereby allowing the user to set the measurement region to a value obtained by multiplying the minimum measurement region by an integer;

a channel distance changing step for changing the channel distance to a value obtained by multiplying the minimum channel distance by an integer, according to instructions of the user; and a flow measurement processing step for measuring the flow by further performing computation processing for the flow-speed distribution data of the fluid to be measured, said respective steps being executed by the processor.

16. A computer readable medium having instructions encoded therein that when executed by a processor in an ultrasonic flowmeter perform steps comprising:

a reflector-group-speed calculating step for receiving ultrasonic echoes due to ultrasonic pulses cast onto the fluid to be measured, so as to calculate the speed of each of a number of reflector groups contained in the fluid to be measured;

a flow-speed distribution measurement processing step for measuring the flow-speed distribution of the fluid to be measured, based upon the flow-speed distribution data of the reflector groups obtained in the reflector-group-speed calculating step;

a channel distance computing step for computing the minimum channel distance based upon the frequency of the ultrasonic pulses and the speed thereof;

a measurement range calculating step for calculating the measurement range based upon the minimum channel distance thus computed;

a channel distance changing step having a function for determining whether or not the channel distance is to be set to a value obtained by multiplying the minimum channel distance by an integer, thereby allowing the system to automatically change the channel distance; and a flow measurement processing step for measuring the flow by further performing computation processing for the flow-speed distribution data of the fluid to be measured, said respective steps being executed by the processor.

17. A computer readable medium having instructions encoded therein that when executed by a processor in an ultrasonic flowmeter perform steps comprising:

a reflector-group-speed calculating step for receiving ultrasonic echoes due to ultrasonic pulses cast onto the fluid to be measured, so as to calculate the speed of each of a number of reflector groups contained in the fluid to be measured;

a flow-speed distribution measurement processing step for measuring the flow-speed distribution of the fluid to be measured, based upon the flow-speed distribution data of the reflector groups obtained in the reflector-group-speed calculating step;

a flow-speed distribution output step for outputting the relation between the flow-speed distribution of the fluid to be measured and the distance in the direction of the measurement line ML, in the form of an image on a screen;

a flow-speed zero-line display step for superimposing a fluid-speed zero line on the flow-speed distribution output in the form of an image on a screen in the flow-speed distribution output step;

a flow-speed measurement range switching determination step which allows the user to determine whether or not the flow-speed measurement range is switched;

a flow-speed measurement range switching step for switching the flow-speed measurement range to twice that of the normal measurement range, for measuring the positive flow speed according to the instructions of the user; and a flow measurement processing step for measuring the flow by further performing computation processing for the flow-speed distribution data of the fluid to be measured, said respective steps being executed by the processor.

18. A computer readable medium having instructions encoded therein that when executed by a processor in an ultrasonic flowmeter perform steps comprising:

a reflector-group-speed calculating step for receiving ultrasonic echoes due to ultrasonic pulses cast onto the fluid to be measured, so as to calculate the speed of each of a number of reflector groups contained in the fluid to be measured;

a flow-speed distribution measurement processing step for measuring the flow-speed distribution of the fluid to be measured, based upon the flow-speed distribution data of the reflector groups obtained in the reflector-group-speed calculating step;

a flow-speed range switching determination step which allows the user to determine whether or not the flow-speed measurement range is switched;

a flow-speed distribution output step for outputting the relation between the flow-speed distribution of the fluid to be measured, and the distance in the direction of the measurement line ML, in the form of an image on a screen;

a flow-speed zero-line display step for superimposing a flow-speed zero line on the flow-speed distribution output in the form of an image on a screen in the flow-speed distribution output step;

a flow-speed measurement range switching step for switching the flow-speed measurement range to twice that of the normal measurement mode according to the instructions of the user for measuring the positive flow speed; and a flow measurement processing step for measuring the flow by further performing computation processing for the flow-speed distribution data of the fluid to be measured, said respective steps being executed by the processor.

* * * * *